(12) United States Patent
Ishii

(10) Patent No.: US 7,801,535 B2
(45) Date of Patent: *Sep. 21, 2010

(54) POSITIONING SYSTEM AND POSITIONING METHOD IN MOBILE COMMUNICATION NETWORK

(75) Inventor: Kenichi Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/258,014

(22) Filed: Oct. 24, 2008

(65) Prior Publication Data

US 2009/0082035 A1 Mar. 26, 2009

Related U.S. Application Data

(62) Division of application No. 10/533,548, filed as application No. PCT/JP2004/004892 on Apr. 5, 2004, now Pat. No. 7,444,155.

(30) Foreign Application Priority Data

Apr. 3, 2003 (JP) ............................. 2003-100075

(51) Int. Cl.
*H04W 24/00* (2009.01)
(52) U.S. Cl. ................................. 455/456.1; 455/456.2
(58) Field of Classification Search .... 455/456.1–456.6
See application file for complete search history.

(56) References Cited

U.S. PATENT DOCUMENTS 7,076,257 B2 * 7/2006 Kall ........................ 455/456.1

2002/0138650 A1 9/2002 Yamamoto et al.

FOREIGN PATENT DOCUMENTS

| CN | 1402950 | 3/2003 |
|---|---|---|
| EP | 1 220 510 | 7/2002 |
| EP | 1 227 694 | 7/2002 |
| JP | 2002-199434 | 7/2002 |

(Continued)

OTHER PUBLICATIONS

Chinese Patent Office issued a Chinese Office Action dated Jul. 10, 2009, Application No. 200480014418.

(Continued)

*Primary Examiner*—Lester Kincaid
*Assistant Examiner*—Steven Lim
(74) *Attorney, Agent, or Firm*—Young & Thompson

(57) ABSTRACT

There is provided a positioning system which generates an appropriate response according to a positioning accuracy request class from a client device. A client device 101 specifies the positioning accuracy and the request class thereof that it requests to transmit a positioning request of a mobile station 103 to a server device 102. The server device 102 checks the positioning accuracy requested by the client device 101, and, if positioning results which satisfy the requested accuracy exist, responds the positioning results. If the positioning results which satisfy the requested accuracy do not exist, the server device 102 checks the accuracy request class, selects the positioning results with the highest positioning accuracy to respond to the client device 101 in the case of a second class ("Best Effort"), and notifies an error to the client device 101 in the case of a first class ("Assured").

20 Claims, 26 Drawing Sheets

FOREIGN PATENT DOCUMENTS

| | | |
|---|---|---|
| JP | 2003-21674 | 1/2003 |
| WO | 00/27143 | 5/2000 |
| WO | WO 01/41468 | 6/2001 |
| WO | WO 01/52569 | 7/2001 |
| WO | 02/096130 | 11/2002 |

OTHER PUBLICATIONS

European Patent Office issued an European Search Report dated Mar. 9, 2010, Application No. 04725797.7.

* cited by examiner

FIG. 10

| i | j | Positioning result selection processing | Number |
|---|---|---|---|
| 1 | 1 | Select positioning results which satisfy both request accuracy and request freshness. | 5-1 |
|   | 2 | Select positioning results which satisfy request accuracy. | 5-2 |
|   | 3 | Select positioning results which are as close to request freshness as possible among positioning results which satisfy request accuracy. | 5-3 |
| 2 | 1 | Select positioning results which satisfy request freshness. | 5-4 |
|   | 2 | No selection conditions. Select arbitrary positioning results. | 5-5 |
|   | 3 | Select positioning results which are as close to request freshness as possible. | 5-6 |
| 3 | 1 | Select positioning results which are as close to request freshness as possible among positioning results which satisfy request freshness. | 5-7 |
|   | 2 | Select positioning results which are as close to request accuracy as possible. | 5-8 |
|   | 3 | Select positioning results which are as close to request accuracy and request freshness as possible. | 5-9 |

POSITIONING SYSTEM AND POSITIONING METHOD IN MOBILE COMMUNICATION NETWORK

TECHNICAL FIELD

The present invention relates to a mobile communication network and, more particularly, to a positioning system having a positioning function which provides geographical position information of a mobile terminal, and a positioning method.

BACKGROUND ART

For the purpose of more adequately describing a technological level for the present invention at the present time, all descriptions of the patents, patent applications, patent gazettes, scientific papers, and the like which are quoted or identified in the present application will be incorporated by reference herein.

In a mobile communication network, a positioning function which provides position information of a mobile station is an important function enabling a variety of position information services. The 3 GPP (Third Generation Partnership Program) which defines a global standard of the mobile communication network sets the specifications of a position information service function and a positioning function. These are disclosed in 3GPP Technical Specification 23.271 v.5.4.0, "Functional stage 2 description of LCS," in September, 2002 (hereinafter, referred to as Literature 1), and 3GPP Technical Specification 25.305 v.5.4.0, "Stage 2 functional specification of User Equipment (UE) positioning in UTRAN," in March, 2002 (hereinafter, referred to as Literature 2). The Literature 1 stipulates a procedure by which a client device outside the network obtains position information of a mobile station from the mobile communication network. On the other hand, the Literature 2 stipulates a procedure for obtaining a geographical position of a mobile station inside the mobile communication network.

Concerning position information showing the geographical position of a mobile unit, the value of the position information is determined by two information of accuracy information and freshness information. The accuracy information is the information which shows the correctness of the position information, and the higher the accuracy, the higher the probability of existence of a mobile station at the point indicated by the position information is. There is considered an example in which the range of existence of a mobile station at a certain probability (e.g., 95%, and the like) is shown in circle, and a central point of the circle is defined as position information, with a diameter thereof defined as accuracy information. The freshness information is the information which shows the newness of the position information, and the higher the freshness, the higher the probability of existence of the mobile station at the point indicated by the position information is.

In the 3GPP position information service described in the Literature 1 and the Literature 2, an external client may specify positioning accuracy that it requests. However, as a result of positioning processing inside the network, the operation of a positioning system when position information satisfying the requested positioning accuracy is not obtained is not defined, and thus there is considered an instance in which an error is notified to the external client, or there is considered an instance in which position information with the accuracy which is closest to the requested positioning accuracy is notified. Both of the aforementioned possibilities are described in chapter 7.3.1 of the Literature 2, which is supposed to be implementation or an operator matter.

In an actual position information service, it is believed that how to behave when positioning accuracy that one requests is not satisfied depends on the position information provided by an external client. For example, it is believed that a position information service, such as human navigation which acts as a guide for pedestrians requires positioning accuracy of about 10 m to several tens of meters. However, as a result of positioning processing on the operator side, even if position information with positioning accuracy of several kilometers order is notified when request positioning accuracy is not satisfied, it is useless information for the service in the external client, it being presumably questionable that the external client and users have to sacrifice for such information.

While request freshness of the position information is not regulated in the current 3GPP standard, it is expected that, upon standardization of the request freshness, the processing when position information of the requested freshness is not obtained arouses a problem in the same way as the positioning accuracy.

In the aforementioned circumstances, it was desired to realize a positioning system which selects and responds appropriate positioning results as requested by the client in the positioning processing, and particularly to realize a positioning system carrying out the processing based on the positioning accuracy and the positioning freshness requested by the client.

DISCLOSURE OF THE INVENTION

Accordingly, an object of the present invention is to provide a positioning system in a mobile communication network free from the aforementioned problems.

Another object of the present invention is to provide a positioning system which selects and responds appropriate positioning results as requested by a client in positioning processing.

Still another object of the present invention is to provide a positioning system which carries out positioning processing based on positioning accuracy and positioning freshness requested by a client.

Yet another object of the present invention is to provide a positioning method in a mobile communication network free from the aforementioned problems.

A further object of the present invention is to provide a positioning method of selecting and responding appropriate positioning results as requested by a client in positioning processing.

A still further object of the present invention is to provide a positioning method of carrying out positioning processing based on positioning accuracy and positioning freshness requested by a client.

An yet further object of the present invention is to provide a positioning server device in a mobile communication network free from the aforementioned problems.

A first object of the present invention is to provide a positioning server device which selects and responds appropriate positioning results as requested by a client in positioning processing.

A second object of the present invention is to provide a positioning server device which carries out positioning processing based on positioning accuracy and positioning freshness requested by a client.

A third object of the present invention is to provide a program which executes a positioning method in a mobile communication network free from the aforementioned problems.

A fourth object of the present invention is to provide a program which executes a positioning method of selecting and responding appropriate positioning results as requested by a client in positioning processing.

A fifth object of the present invention is to provide a program which executes a positioning method of carrying out positioning processing based on positioning accuracy and positioning freshness requested by a client.

In order to solve the aforementioned problems, the positioning system in the mobile communication network of the present invention introduces positioning accuracy request class information and/or positioning freshness request class information to generate a response of position information to an external client with respect to a positioning request from this external client, based on the request class information. It is likely that the external client device transmits the request class information to the positioning system together with the positioning request, or holds it inside the positioning system in advance.

The request accuracy request class information includes a first class requiring to respond positioning results which do not fail to satisfy the requested accuracy, and a second class requiring to reply the positioning results of the positioning accuracy which is closest to the requested accuracy in the case where the positioning results which satisfy the requested accuracy do not exist.

Request freshness request class information includes a third class requiring to respond positioning results which do not fail to satisfy the requested freshness, and a fourth class requiring to reply the positioning results of the positioning freshness which is closest to the requested freshness in the case where the positioning results which satisfy the requested freshness do not exist.

In addition, if a plurality of positioning results which satisfy conditions of the requested accuracy and freshness exist, the positioning system introduces priority information which determines to prioritize either accuracy or freshness to select the positioning results using this priority information.

In another addition, it is possible to generate the response to the positioning request in a positioning response generation function unit included in a node device in the mobile communication network. This node device embraces all devices located in any one of nodes in the communication network, and its typical example includes a server, a gateway, and the like, but is not particularly limited to these.

Furthermore, a positioning target embraces everything that could be a positioning target, and its typical example includes a mobile unit station, a mobile unit terminal, and the like, but is not necessarily limited to these.

In addition, a function unit could do with a unit having the ability to perform some specific function, and may be achieved in all forms including hardware, software, and firmware. Note that the term, "means," as used in the specification and the drawings of the present application, is equivalent to the term, "function unit" in the present application.

In another addition, an external client could do with anything that can perform a positioning request, except for a node device including a positioning response generation function unit, and is not particularly limited.

Moreover, in the present application, the positioning server device in the mobile communication network could do with anything that can provide a positioning response service as the external client requests, and is not particularly limited.

Also, this positioning server device may be located in any one of positions on the mobile communication network, and is not limited to a specific node, terminal, or the like.

Furthermore, the term, "class," as used in the present application, is substantially equivalent to "level," and for example, "first to fourth classes" may be alternatively expressed as "first to fourth levels." And, "class information" may be alternatively expressed as "level information."

It is a first advantage of the present invention that the client device may select whether to receive only positioning results which satisfy the positioning accuracy that it requests in the positioning processing, or positioning results which are as close to the positioning accuracy that it requests as possible, even if there are no positioning results which satisfy the positioning accuracy that it requests.

It is a second advantage of the present invention that the client device may select whether to receive only positioning results which satisfy the positioning freshness that it requests in the positioning processing, or positioning results which are as close to the positioning freshness that it requests as possible, even if there are no positioning results which satisfy the positioning freshness that it requests.

According to a first aspect of the present invention, there is provided a positioning system in a mobile communication network which responds position information which is a positioning target to a positioning request from an external client device, the positioning system in the mobile communication network comprising: at least one node device including a positioning response generation function unit which generates the response of the position information to said external client device based on request accuracy information and request accuracy request class information.

Said request accuracy request class information can be configured to comprise at least a first class which indicates to request said node device to respond position information which does not fail to satisfy the positioning accuracy requested by said external client device to said external client device.

Here, said first class indicates to request said node device to respond an error to said external client device, if the position information which satisfies the positioning accuracy requested by said external client device does not exist.

Moreover, if the position information does not satisfy the positioning accuracy requested by said external client device, said request accuracy request class information can be configured to comprise at least a second class which indicates to request said node device to respond the position information which is closest to said requested positioning accuracy to said external client device.

Said second class indicates to request said node device to respond an error to said external client device, if position information that can be responded does not exist.

Said request accuracy request class information can be configured to comprise both of the first class which indicates to request said node device to respond the position information which does not fail to satisfy the positioning accuracy requested by said external client device to said external client device, and the second class which indicates to request said node device to respond the position information which is closest to said requested positioning accuracy to said external client device, if the position information does not satisfy the positioning accuracy requested by said external client device.

In addition, said positioning system can be configured to further comprise a holding function unit for retaining said request accuracy request class information.

Also, said positioning system can be configured to further comprise a receiving function unit for receiving said request accuracy request class information transmitted by said external client device together with the positioning request.

If said external client transmits said request accuracy request class information together with the positioning request, said positioning response generation function unit uses the request class information thereof to generate a response of said position information, whereas if said external client does not transmit said request accuracy request class information together with the positioning request, said positioning response generation function unit can be configured to use request accuracy request class information held inside said positioning system in said mobile communication network to generate the response of said position information.

Furthermore, according to a second aspect of the present invention, there is provided a positioning system in a mobile communication network which responds position information which is a positioning target to a positioning request from an external client device, the positioning system in the mobile communication network comprising: at least one node device including a positioning response generation function unit which generates the response of the position information to said external client device based on request freshness information and request freshness request class information.

Said request freshness request class information can be configured to comprise at least a first class which indicates to request said node device to respond position information which does not fail to satisfy positioning freshness requested by said external client device to said external client device.

Said first class can be configured to indicate requesting said node device to respond an error to said external client device, if the position information which satisfies the positioning freshness requested by said external client device does not exist.

If the position information does not satisfy the positioning freshness requested by said external client device, said request accuracy request class information can be configured to comprise at least a second class which indicates to request said node device to respond the position information which is closest to said requested positioning freshness to said external client device.

Said second class can be configured to indicate requesting said node device to respond an error to said external client device, if position information that can be responded does not exist.

Said request freshness request class information can be configured to comprise both of the first class which indicates to request said node device to respond the position information which does not fail to satisfy the positioning freshness requested by said external client device, and the second class which indicates to request said node device to respond the position information which is closest to said requested positioning freshness to said external client device, if the position information does not satisfy the positioning freshness requested by said external client device.

Said positioning system can be configured to further comprise a holding function unit for retaining said request freshness request class information.

Said positioning system can be configured to further comprise a receiving function unit for receiving said request freshness request class information transmitted by said external client together with the positioning request.

If said external client has transmitted said request freshness request class information together with the positioning request, said positioning response generation function unit uses the request class information thereof to generate a response of said position information, whereas if said external client has not transmitted said request freshness request class information together with the positioning request, said positioning response generation function unit can be configured to use request freshness request class information held inside said positioning system in said mobile communication network to generate the response of said position information.

Furthermore, according to a third aspect of the present invention, there is provided a positioning system in a mobile communication network which responds position information which is a positioning target to a positioning request from an external client device, the positioning system in the mobile communication network comprising: at least one node device including a positioning response generation function unit which generates the response of the position information to said external client device based on request accuracy information and request accuracy request class information, and request freshness information and request freshness request class information.

Said request accuracy request class information can be configured to comprise at least a first class which indicates to request said node device to respond position information which does not fail to satisfy the positioning accuracy requested by said external client device to said external client device.

Said first class can be configured to indicate requesting said node device to respond an error to said external client device, if the position information which satisfies the positioning accuracy requested by said external client device does not exist.

If the position information does not satisfy the positioning accuracy requested by said external client device, said request accuracy request class information can be configured to comprise at least a second class which indicates to request said node device to respond the position information which is closest to said requested positioning accuracy to said external client device.

Said second class can be configured to indicate requesting said node device to respond an error to said external client device, if position information that can be responded does not exist.

Said request accuracy request class information can be configured to comprise both of the first class which indicates to request said node device to respond the position information which does not fail to satisfy the positioning accuracy requested by said external client device, and the second class which indicates to request said node device to respond the position information which is closest to said requested positioning accuracy to said external client device, if the position information does not satisfy the positioning accuracy requested by said external client device.

Said positioning system can be configured to further comprise a holding function unit for retaining said request accuracy request class information.

Said positioning system can be configured to further comprise a receiving function unit for receiving said request accuracy request class in formation transmitted by said external client device together with the positioning request.

If said external client transmits said request accuracy request class information together with the positioning request, said positioning response generation function unit uses the request class information thereof to generate the response of said position information, whereas if said external client does not transmit said request accuracy request class information together with the positioning request, said positioning response generation function unit can be configured to use request accuracy request class information held inside said positioning system in said mobile communication network to generate the response of said position information.

Said request freshness request class information can be configured to comprise at least a third class which indicates to request said node device to respond position information which does not fail to satisfy the positioning freshness requested by said external client device to said external client device.

Said third class can be configured to indicate requesting said node device to respond an error to said external client device, if the position information which satisfies the positioning freshness requested by said external client device does not exist.

If the position information does not satisfy the positioning freshness requested by said external client device, said request accuracy request class information can be configured to indicate requesting said node device to respond the position information which is closest to said requested positioning freshness to said external client device.

Said fourth class can be configured to indicate requesting said node device to respond an error to said external client device, if position information that can be responded does not exist.

Said request freshness request class information can be configured to comprise both of the third class which indicates to request said node device to respond the position information which does not fail to satisfy the positioning freshness requested by said external client device, and the fourth class which indicates to request said node device to respond the position information which is closest to said requested positioning freshness to said external client device, if the position information does not satisfy the positioning freshness requested by said external client device.

Said positioning system can be configured to further comprise a holding function unit for retaining said request freshness request class information.

Said positioning system can be configured to further comprise a receiving function unit for receiving said request freshness request class information transmitted by said external client together with the positioning request.

If said external client has transmitted said request freshness request class information together with the positioning request, said positioning response generation function unit uses the request class information thereof to generate a response of said position information, whereas if said external client has not transmitted said request freshness request class information together with the positioning request said positioning response generation function unit can be configured to use request freshness request class information held inside said positioning system in said mobile communication network to generate the response of said position information.

If position information does not satisfy the positioning accuracy requested by said external client device, said request accuracy request class information is set to the second class which indicates to request said node device to respond the position information which is closest to said requested positioning accuracy to said external client device. If the position information does not satisfy the positioning freshness requested by said external client device, said request freshness request class information is set to the fourth class which indicates to request said node device to respond the position information which is closest to said requested positioning freshness to said external client device. If position information which satisfies both the positioning accuracy and the positioning freshness requested by said external client device does not exist, said node device can be configured to respond the position information with the highest positioning accuracy to said external client device.

If the position information does not satisfy the positioning accuracy requested by said external client device, said request accuracy request class information is set to the second class which indicates to request said node device to respond the position information which is closest to said requested positioning accuracy to said external client device. If the position information does not satisfy the positioning freshness requested by said external client device, said request freshness request class information is set to the fourth class which indicates to request said node device to respond the position information which is closest to said requested positioning freshness to said external client device. If the position information which satisfies both the positioning accuracy and the positioning freshness requested by said external client device does not exist, said node device can be configured to respond the position information with the newest positioning freshness to said external client device.

If the position information does not satisfy the positioning accuracy requested by said external client device, said request accuracy request class information is set to the second class which indicates to request said node device to respond the position information which is closest to said requested positioning accuracy to said external client device. If the position information does not satisfy the positioning freshness requested by said external client device, said request freshness request class information is set to the fourth class which indicates to request said node device to respond the position information which is closest to said requested positioning freshness to said external client device. If the position information which satisfies both the positioning accuracy and the positioning freshness requested by said external client device does not exist, said node device can be configured to respond the position information based on priority information showing whether the freshness or the accuracy is prioritized to said external client device.

When said positioning system in said mobile communication network is set in such a way that said priority information gives a high priority to the accuracy, said node device can be configured to respond the position information with the highest accuracy to said external client device.

When said positioning system in said mobile communication network is set in such a way that said priority information gives a high priority to the freshness, said node device can be configured to respond the position information with the newest freshness to said external client device.

Furthermore, according to a fourth aspect of the present invention, there is provided a positioning method in a mobile communication network which responds position information which is a positioning target to a positioning request from an external client device, wherein the response of the position information to said external client device is generated based on request accuracy information and request accuracy request class information.

Another furthermore, according to a fifth aspect of the present invention, there is provided a positioning method in a mobile communication network which responds position information which is a positioning target to a positioning request from an external client device, wherein the response of the position information to said external client device is generated based on request freshness information and request freshness request class information.

Still Furthermore, according to a sixth aspect of the present invention, there is provided a positioning method in a mobile communication network which responds position information which is a positioning target to a positioning request from an external client device, wherein the response of the position information to said external client device is generated based on request accuracy information and request accuracy request class information, and request freshness information and request freshness request class information.

Yet furthermore, according to a seventh aspect of the present invention, there is provided a positioning server device in a mobile communication network which responds position information which is a positioning target to a positioning request from an external client device, the positioning server device in the mobile communication network comprising: a positioning response generation function unit which generates the response of the position information to said external client device based on request accuracy information and request accuracy request class information.

Said request accuracy request class information can be configured to comprise a first class which indicates to request said positioning server device to respond position information which does not fail to satisfy positioning accuracy requested by said external client device, and a second class which indicates to request said positioning server device to respond the position information which is closest to said requested positioning accuracy to said external client device, if the position information does not satisfy the positioning accuracy requested by said external client device.

Said positioning server device can be configured to further comprise a storage function unit which stores said request accuracy request class information for each said external client device.

Said positioning server device can be configured to further comprise a receiving function unit which receives said request accuracy request class information transmitted by said external client device together with the positioning request.

Said positioning server device can be configured to further comprise the storage function unit which stores said request accuracy request class information for each said external client device, the receiving function unit which receives said request accuracy request class information transmitted by said external client device together with the positioning request, and a merge function unit which, if said receiving function unit has received said request accuracy request class information transmitted by said external client together with the positioning request, selects said received request class information, and which, if said receiving function unit has not received said request accuracy request class information, selects said request accuracy request class information already stored in said storage function unit.

Furthermore, according to an eighth aspect of the present invention, there is provided a positioning server device in a mobile communication network which responds position information which is a positioning target to a positioning request from an external client device, the positioning server device in the mobile communication network comprising: a positioning response generation function unit which generates the response of the position information to said external client device based on request freshness information and request freshness request class information.

Said request freshness request class information can be configured to comprise a first class which indicates to request said positioning server device to respond position information which does not fail to satisfy positioning freshness requested by said external client device to said external client device, and a second class which indicates to request said positioning server device to respond the position information which is closest to said requested positioning freshness to said external client device, if the position information does not satisfy the positioning freshness requested by said external client device.

Said positioning server device can be configured to further comprise a storage function unit which stores said request freshness request class information for each said external client device.

Said positioning server device can be configured to further comprise a receiving function unit which receives said request freshness request class information transmitted by said external client device together with the positioning request.

Said positioning server device can be configured to further comprise the storage function unit which stores said request freshness request class information for each said external client device, the receiving function unit which receives said request freshness request class information transmitted by said external client device together with the positioning request, and a merge function unit which, if said receiving function unit has received said request freshness request class information transmitted by said external client together with the positioning request, selects said received request class information, and which, if said receiving function unit has not received said request freshness request class information, selects the request freshness request class information already stored in said storage function unit.

Furthermore, according to a ninth aspect of the present invention, there is provided a program executed by a positioning server device in a mobile communication network which responds position information which is a positioning target to a positioning request from an external client device, the program comprising: a positioning response generation process of generating the response of the position information to said external client device based on request accuracy information and request accuracy request class information.

Another furthermore, according to a tenth aspect of the present invention, there is provided a program executed by a positioning server device in a mobile communication network which responds position information which is a positioning target to a positioning request from an external client device, the program comprising: a positioning response generation process of generating the response of the position information to said external client device based on request freshness information and request freshness request class information.

BRIEF DESCRIPTION OF THE DRAWINGS

FIG. 10 is a flowchart of a table in which the content of positioning result selection processing is defined for the case of selecting positioning results based on both of positioning accuracy and positioning freshness.

BEST MODE FOR CARRYING OUT THE INVENTION

First Embodiment of the Present Invention

Figure 1:
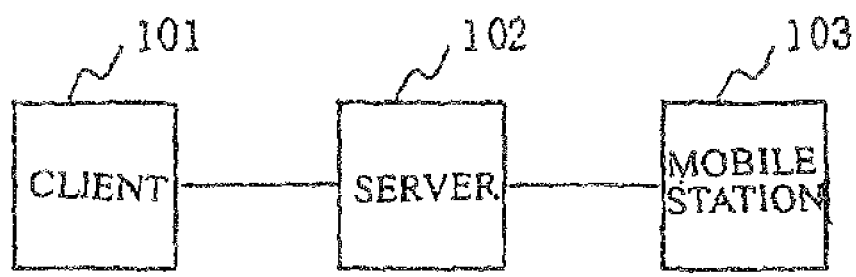
FIG. 1 is a configuration diagram of a mobile communication network according to a first embodiment of the present invention.

Referring to FIG. 1, a positioning system in a mobile communication network according to a first embodiment of the present invention is configured and includes one or more mobile stations 103 which are positioning targets, one or more client devices 101 which requests positioning of the mobile stations 103, and one or more server devices 102 which lie between the client devices 101 and the mobile stations 103 to respond position information of the mobile stations 103 which are positioning targets to positioning requests from the client devices 101. Note that an actual positioning system includes devices for communication between the mobile stations 103 and the server devices 102, and devices for measurement of the positions of the mobile stations 103, of which figures are, however, not shown. Incidentally, the mobile stations 103 can be comprised of mobile terminals.

Figure 2:
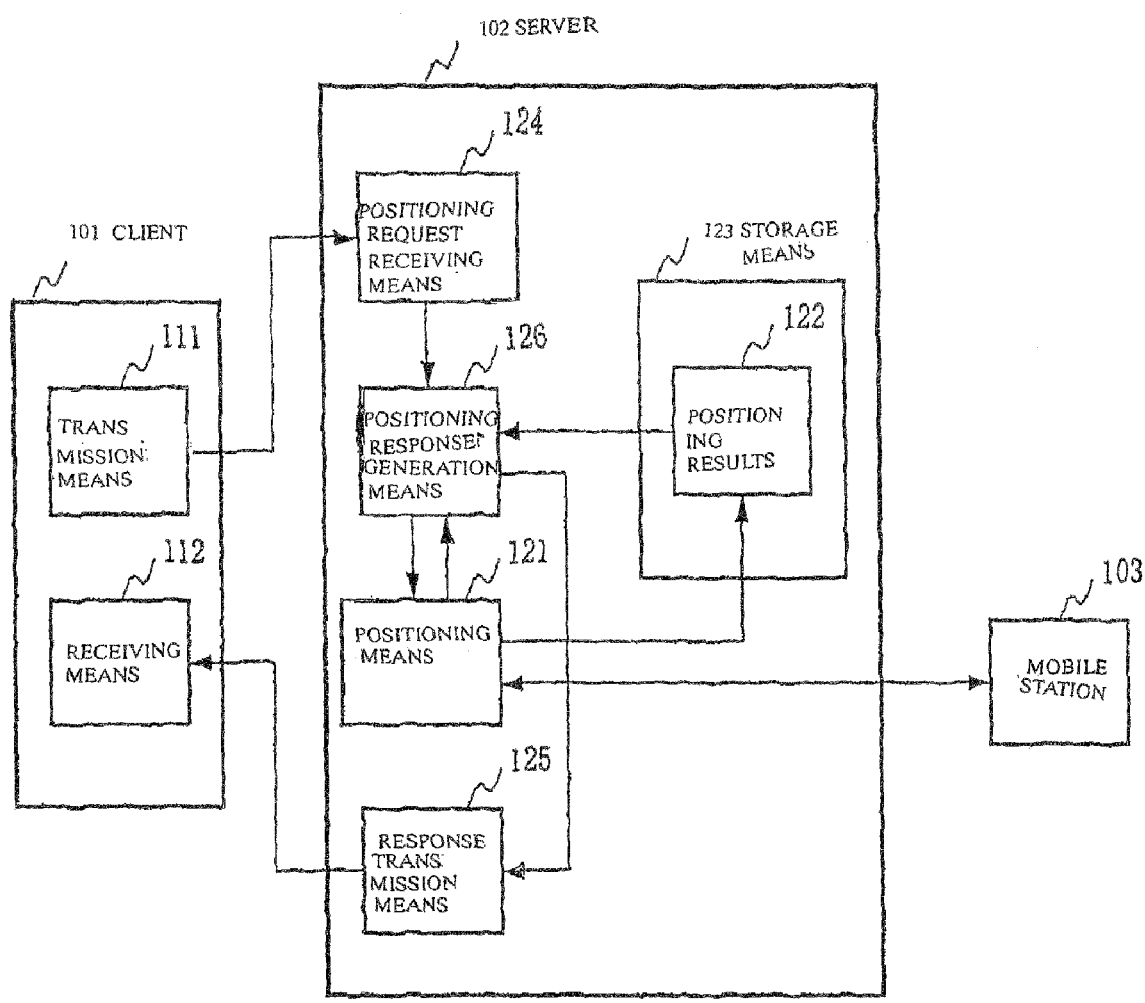
FIG. 2 is a block diagram showing a configuration of each node in a mobile communication network according to a first embodiment of the present invention.

Referring to FIG. 2, the client device 101 has a transmission function unit 111 which transmits a positioning request to the server device 102, and a receiving function unit 112 which receives a response to the transmitted positioning request from the server device 102. The server device 102 has a positioning function unit 121 which measures the position of the mobile station 103, a storage function unit 123 which stores positioning results 122 in the past of the mobile station 103 subjected to measurement, a positioning request receiving function unit 124 which receives the positioning request from the client device 101, a response transmission function unit 125 which transmits the response to the positioning request to the client device 101, and a positioning response generation function unit 126 which generates the response to the positioning request received by the positioning request receiving function unit 124.

A positioning request message transmitted from the transmission function unit 111 of the client device 101 contains a terminal identifier for identifying the mobile station 103 which is a positioning target, such as a telephone number and a terminal ID, request positioning accuracy information, positioning accuracy request class information, request positioning freshness information, positioning freshness request class information, a positioning type showing whether positions measured in the past may be used for a response, a client identifier which uniquely identifies its own client device 101, and other necessary information.

The positioning accuracy request class information is the information which shows the degree of request of the positioning accuracy specified in the request positioning accuracy information. In the present embodiment, there are two types of first class ("Assured") which notifies positioning results which do not fail to satisfy the requested positioning accuracy, and which requests to notify an error, if the positioning results which satisfy the request do not exist, and second class ("Best effort") which requests to notify the positioning results which are closest to the requested positioning accuracy, if the requested positioning accuracy is not satisfied. Note that the positioning accuracy request class information has only the first class ("Assured"), and if the positioning accuracy request class information is not specified, a method of interpreting as meaning that the second class ("Best effort") has been specified may be considered.

Similarly, the positioning freshness request class information is the information which shows the degree of request of the positioning freshness specified in the request positioning freshness information. In the present embodiment, there are two types of third class ("Assured") which notifies positioning results which do not fail to satisfy the requested positioning freshness, and which requests to notify an error, if the positioning results which satisfy the request do not exist, and fourth class ("Best effort") which requests to notify the positioning results which are closest to the requested positioning freshness, if the requested positioning freshness is not satisfied. Note that the positioning freshness request class information has only the third class ("Assured"), and that if the positioning freshness request class information is not specified, a method of interpreting as meaning that the fourth class ("Best effort") has been specified may be considered.

The positioning function unit 121 of the server device 102 measures the position of the mobile station 103 in one or more positioning systems with different positioning accuracy, and notifies the positioning results to the positioning response generation function unit 126, as well as stores them in the storage function unit 123. Individual positioning results stored in the storage function unit 123 contain each information of a terminal identifier of the mobile station 103 having come into a positioning target, the position of the mobile station 103 subjected to measurement, positioning time of day, and positioning accuracy. The positioning response generation function unit 126 analyzes the positioning request received by the positioning request receiving function unit 124, and, in the case of a positioning type which approves any past positions, utilizes available past positioning results as long as they are stored in the storage function unit 123 to generate a response. If the available past positioning results do not exist, the positioning response generation function unit 126 activates positioning with the positioning unit 121 to generate a response from the positioning results. In addition, when a positioning request is in a positioning type not using the past positions, the positioning response generation function unit 126 activates the positioning with the positioning unit 121 to generate a response from the positioning results. In each case, the positioning response generation function unit 126 generates a response in accordance with the request positioning accuracy information, the positioning accuracy request class information, the request positioning freshness information, and the positioning freshness request class information which are specified in the positioning request. The generated response is sent to the client device 101 which is a positioning request source through the response transmission function unit 125.

Response processing of the server device 102 to the positioning request from the client device 101 provides a wide variety of processing depending on a request condition from the client device 101 and the ability of the server device 102. Hereinafter, the operation of the present embodiment will be described for an embodiment in which to generate a response based on the positioning accuracy, an embodiment in which to generate a response based on the positioning freshness, and an embodiment in which to generate a response based on the positioning accuracy and the positioning freshness, with a focus on processing relating to a request class.

(1) Embodiment in which to Generate a Response Based on the Positioning Accuracy The server device 102 ensures that the positioning request from the client device 101 may respond the past positioning results through the positioning response generation function unit 126, checks to see that the past positioning results of the mobile station 103 which is a positioning target are held in the storage function unit 123, if the past positioning results are acceptable, and determines whether positioning results which satisfy the request condition from the client device 101 exist in the past positioning results, if the past results are held.

Figure 3:
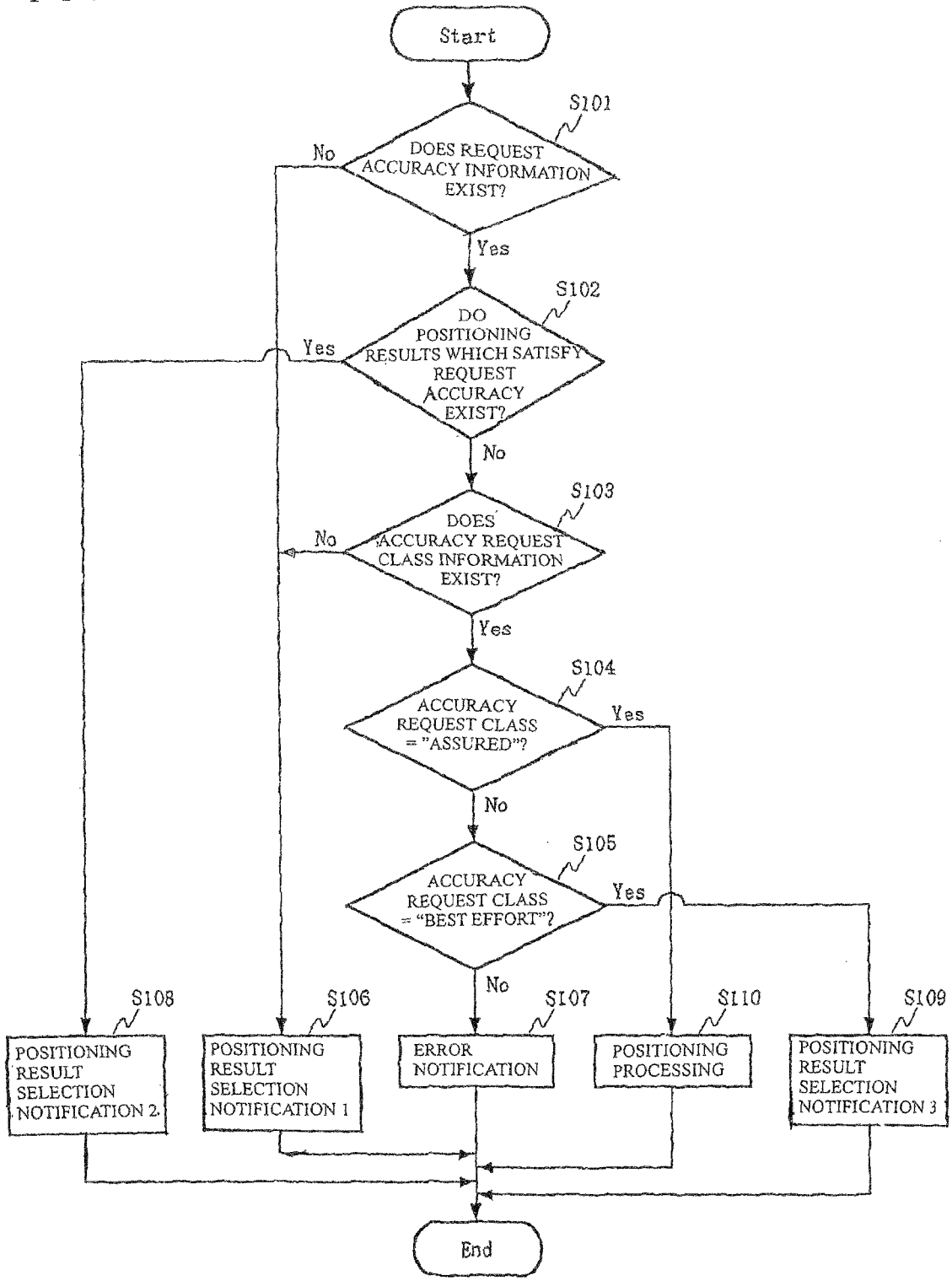
FIG. 3 is a flowchart showing a processing flow for the case of using past positioning results to select positioning results based on positioning accuracy.

On the existence of the past positioning results of the mobile station 103 which is a positioning target, a processing example in which to generate a response based on the positioning accuracy is shown in FIG. 3. The server device 102 first ensures that the request accuracy information exists in the positioning request from the client device 101 through the positioning response generation function unit 126 (Step S101). If the request accuracy information does not exist (No in Step S100), the server device 102 selects the past positioning results of the mobile station 103 stored in the storage function unit 123, and responds to the client device 101 through the response transmission function unit 125 (Step S106). It is considered that a method of selecting the positioning results in Step S106 includes a method of selecting the positioning results with the highest accuracy, and a method of selecting the most up-to-date positioning results.

If the request accuracy information exists (Yes in Step S101), the server device 102 ensures that positioning results which are capable of satisfying the request accuracy information exist in the past positioning results through the positioning response generation function unit 126 (Step S102). If the positioning results which satisfy the request accuracy information exist (Yes in Step S102), the server device 102 selects the positioning results which satisfy the request accuracy information from the past positioning results, and responds to the client device 101 through the response transmission function unit 125 (Step S108). It is considered that a method of selecting the positioning results in Step S108 includes a method of selecting the positioning results with the highest accuracy, and a method of selecting the most up-to-date positioning results, from the positioning results which satisfy the request accuracy information.

If the positioning results which satisfy the request accuracy information do not exist (No in Step S102), the server device 102 ensures that the accuracy request class information exists through the positioning response generation function unit 126 (Step S103). If the accuracy request class information does not exist (No in Step S103), the server device 102 selects positioning results to be responded from the past positioning results to respond to the client device 101 (Step S106). It is considered that a method of selecting the positioning results in Step S106 includes a method of selecting the positioning results with the highest accuracy, and a method of selecting the most up-to-date positioning results.

If the accuracy request class information exists (Yes in Step S103), the server device 102 checks the accuracy request class (Step S104). If the accuracy request class is the first class ("Assured"), (Yes, in Step S104), the server device 102 activates positioning processing of the positioning function unit 121 in order to obtain the positioning results through the positioning response generation function unit 126 (Step S110). The positioning function unit 121 measures the position of the mobile station 103 which is a positioning target, and notifies the results to the positioning response generation function unit 126, as well as stores them in the storage function unit 123 to utilize for later positioning requests to the same mobile stations 103. Note that positioning of the mobile station 103 is carried out using one or more positioning systems. If the positioning is carried out using a plurality of positioning systems, a plurality of positioning results may be obtained.

If the accuracy request class is not the first class ("Assured"), (No in Step S104), the server device 102 ensures that the accuracy request class is the second class ("Best Effort"), (Step S105). If the accuracy request class is the second class ("Best Effort"), (Yes in Step S105), the server device 102 selects the positioning results with the highest positioning accuracy from the past positioning results through the positioning response generation function unit 126, and responds to the client device 101 through the response transmission function unit 125 (Step S109).

If the accuracy request class is not even the second class ("Best Effort"), (No in Step S105), the positioning response generation function unit 126 notifies an error to the client device 101 through the response transmission function unit 125 (Step S107).

Here, if the accuracy request class information does not exist (No in Step S103), or the accuracy request class is not the first class ("Assured"), (No in Step S104), there is considered such an embodiment as that the accuracy request class is determined as being the second class ("Best Effort"), and the positioning results with the highest positioning accuracy are selected from the past positioning results to carry out processing of responding to the client device 101 (Step S109).

If the processing shown in FIG. 3 has resulted in transmission of the past positioning results to the client device 101, the server device 102 transmits the selected past positioning results to the client device 101 to complete the processing. If the processing shown in FIG. 3 has resulted in notification of an error to the client device 101, the server device 102 notifies the error to the client device 101 to complete the processing.

On the other hand, the processing shown in FIG. 3 has resulted in execution of positioning processing, the server device 102 carries out positioning processing for obtaining the position of the mobile station 103 which is a positioning target. If this positioning processing has resulted in failure to obtain the position of the mobile station 103 by the failure of the positioning processing, the server device 102 notifies an error to the client device 101 through the response transmission function unit 125. And, if the positioning processing has resulted in success in positioning of the mobile station 103 which is a positioning target to obtain the positioning results of the mobile station 103, the server device 102 determines whether the obtained positioning results satisfy the request condition of the client device 101 through the positioning response generation function unit 126.

Figure 4:
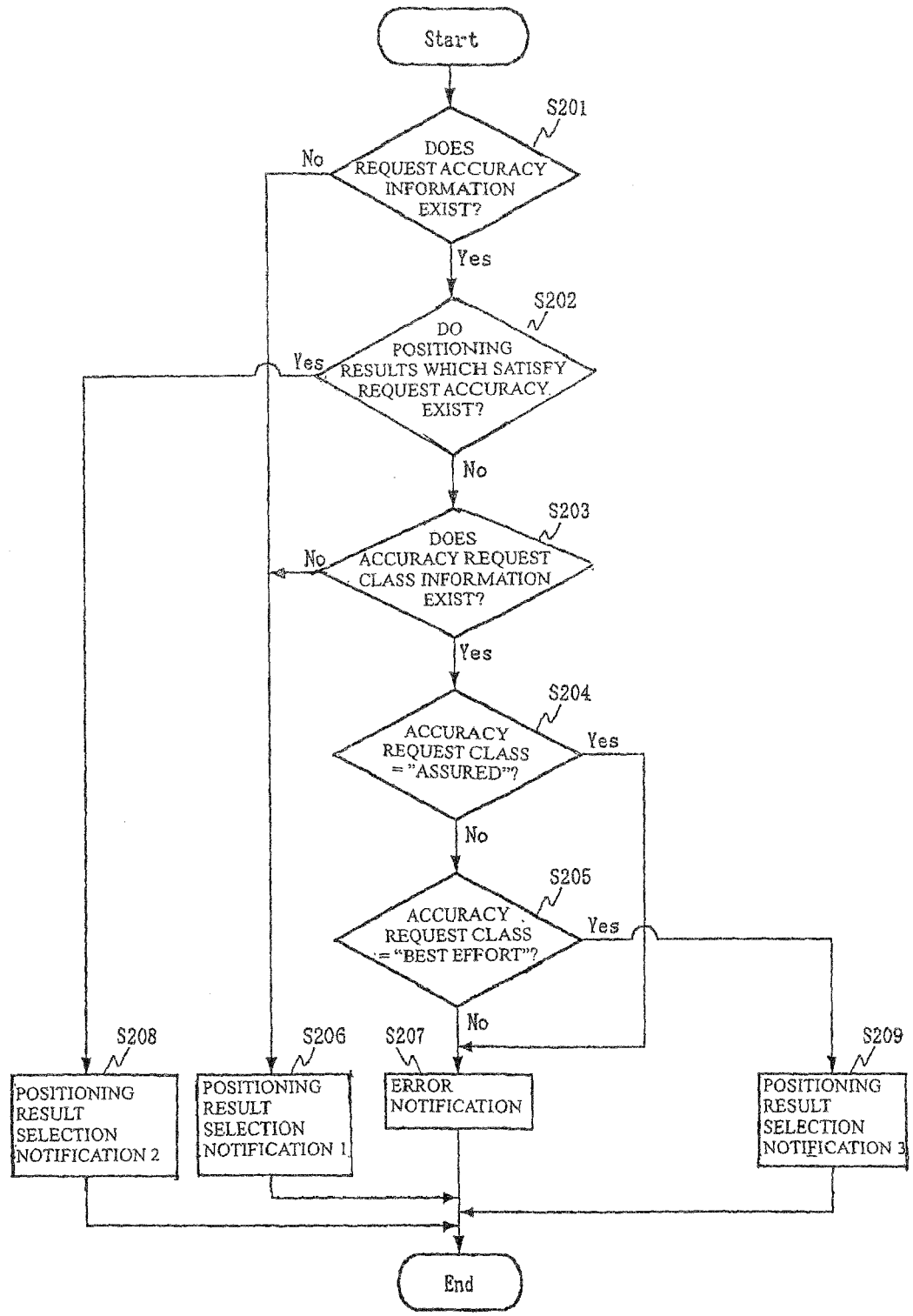
FIG. 4 is a flowchart showing a processing flow for the case of using positioning results obtained by newly measuring a position to select positioning results based on positioning accuracy.

FIG. 4 shows an example of the flow of processing for determining whether positioning results obtained in new positioning processing satisfy the request condition of the client device 101, and selecting the positioning results based on the positioning accuracy. Although this flow is almost the same as that of the processing of FIG. 3, it differs in detail in that selection targets are not the past positioning results, but the new positioning results obtained this time, and in that if the accuracy request class is the first class, and accuracy positioning results which satisfy the request accuracy are not obtained, an error is notified to the client device 101. Hereinafter, the operation will be described along the flow of FIG. 4.

The server device 102 first ensures that the request accuracy information exists in the positioning request from the client device 101 through the positioning response generation function unit 126 (Step S201). If the request accuracy information does not exist (No in Step S201), the server device 102 selects the positioning results from the positioning results obtained this time, and responds to the client device 101 through the response transmission function unit 125 (Step S206). It is considered that a method of selecting the positioning results in Step S206 includes a method of selecting the positioning results with the highest accuracy, and a method of selecting the most up-to-date positioning results.

If the request accuracy information exists (Yes in Step S201), the server device 102 ensures that positioning results which are capable of satisfying the request accuracy information exist through the positioning response generation function unit 126 (Step S202). If the positioning results which satisfy the request accuracy information exist (Yes in Step S202), the server device 102 selects the positioning results which satisfy the request accuracy information, and responds to the client device 101 through the response transmission function unit 125 (Step 208). It is considered that a method of selecting the positioning results in Step S208 includes a method of selecting the positioning results with the highest accuracy, and a method of selecting the most up-to-date positioning results, from the positioning results which satisfy the request accuracy information.

If the positioning results which satisfy the request accuracy information do not exist (No in Step S202), the server device 102 ensures that the accuracy request class information exists through the positioning response generation function unit 126 (Step S203). If the accuracy request class information does not exist (No in Step S203), the server device 102 selects the positioning results, and responds to the client device 101 through the response transmission function unit 125 (Step S206). It is considered that a method of selecting the positioning results in Step S206 includes a method of selecting the positioning results with the highest accuracy, and a method of selecting the most up-to-date positioning results.

If the accuracy request class information exists (Yes in Step S203), the server device 102 checks the accuracy request class through the positioning response generation function unit 126 (Step 204). If the accuracy request class is the first class ("Assured"), (Yes in Step S204), the positioning response generation function unit 126 notifies an error to the client device 101 through the response transmission function unit 125 (Step 207).

If the accuracy request class is not the first class ("Assured"), (No in Step S204), the server device 102 ensures that the accuracy request class is the second class ("Best Effort"), (Step S205). If the accuracy request class is the second class ("Best Effort"), (Yes in Step S205), the server device 102 selects the positioning results with the highest positioning accuracy through the positioning response generation function unit 126, and responds to the client device 101 through the response transmission function unit 125 (Step 209).

If the accuracy request class is not even the second class ("Best Effort"), (No in Step S205), the server device 102 notifies an error to the client device 101 through the response transmission function unit 125 (Step 207).

Here, if the accuracy request class information does not exist (No in Step S203), or the accuracy request class is not the first class ("Assured"), (No in Step S204), there is considered such an embodiment as that the accuracy request class is determined as being the second class ("Best Effort"), and the positioning results with the highest positioning accuracy are selected to carry out the processing of responding to the client device 101 (Step S209).

The above operation is the operation when the positioning request from the client device 101 may respond the past positioning results. However, if the positioning request does not desire to respond the past positioning results, the server device 102 carries out no processing of FIG. 3, and rapidly activates the positioning processing of the positioning function unit 121 from the positioning response generation function unit 126. And, if this positioning processing has resulted in failure to obtain the position of the mobile station 103 by the failure of the positioning processing, the server device 102 notifies an error to the client device 101 through the response transmission function unit 125. Additionally, if the positioning processing has resulted in success in positioning of the mobile station 103 which is a positioning target to obtain the positioning results of the mobile station 103, the server device 102 executes the processing shown in FIG. 4, determines whether the obtained positioning results satisfy the request condition of the client device 101, and notifies a response tailored to the determined results to the client device 101.

(2) Embodiment in which to Generate a Response Based on the Positioning Freshness The server device 102 ensures that the positioning request from the client device 101 may respond the past positioning results through the positioning response generation function unit 126, checks to see that the past positioning results of the mobile station 103 which is a positioning target are held in the storage function unit 123, if the past positioning results are acceptable, and determines whether positioning results which satisfy the request condition of the client device 101 exist in the past positioning results, if the past positioning results are held.

Figure 5:
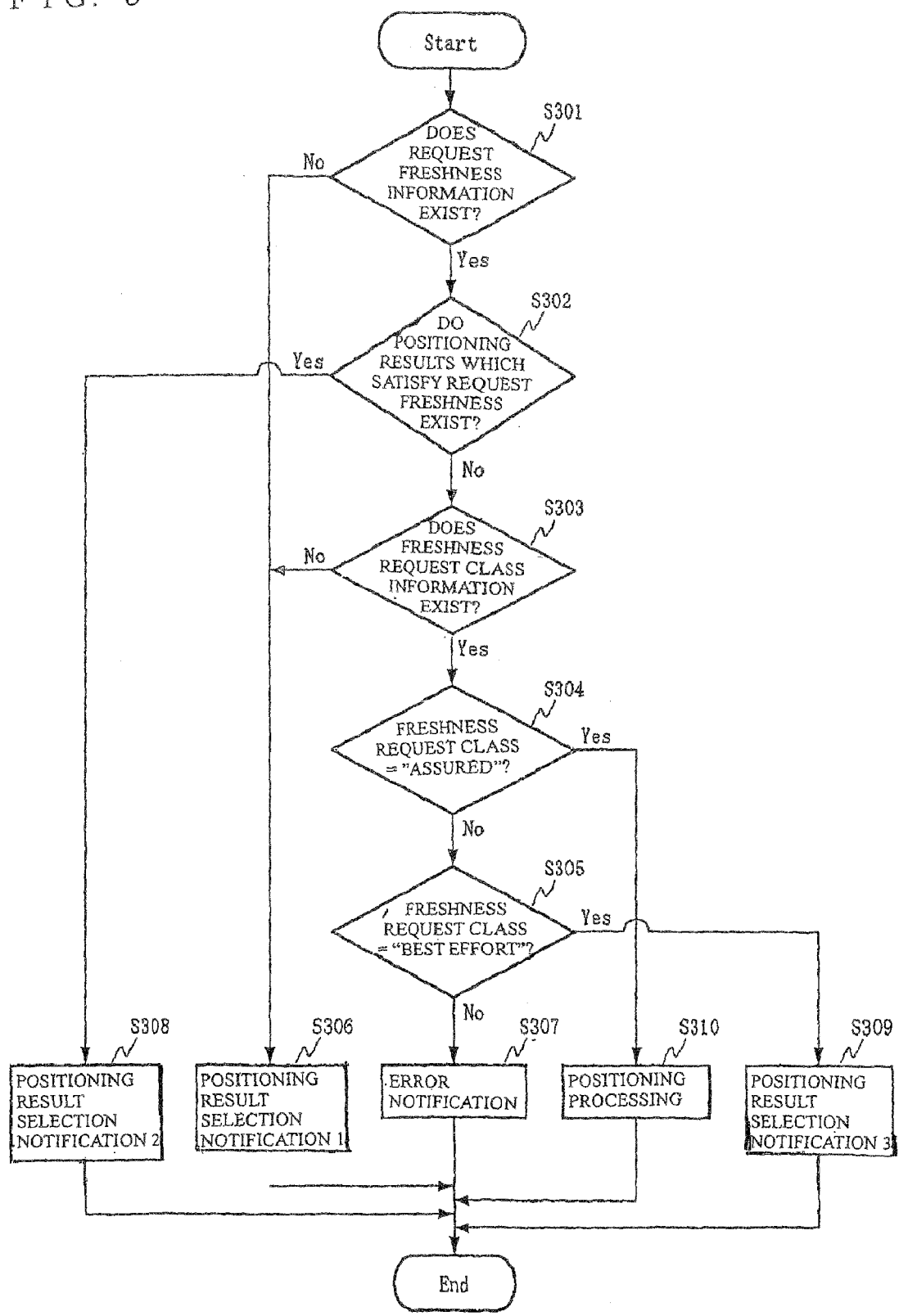
FIG. 5 is a flowchart showing a processing flow for the case of using past positioning results to select positioning results based on positioning freshness.

On the existence of the past positioning results of the mobile station 103 which is a positioning target, a processing example in which to generate a response based on the positioning freshness is shown in FIG. 5. The server device 102 first ensures that the request freshness information exists in the positioning request from the client device 101 through the positioning response generation function unit 126 (Step S301). If the request freshness information does not exist (No in Step S301), the server device 102 selects the past positioning results of the mobile station 103 stored in the storage function unit 123, and responds to the client device 101 through the response transmission function unit 125 (Step S306). It is considered that a method of selecting the positioning results in Step S306 includes a method of selecting the positioning results with the highest accuracy, and a method of selecting the most up-to-date positioning results.

If the request freshness information exists (Yes in Step S301), the server device 102 ensures that positioning results which are capable of satisfying the request freshness information exist in the past positioning results through the positioning response generation function unit 126 (Step S302). If the positioning results which satisfy the request freshness information exist (Yes in Step S302), the server device 102 selects the positioning results which satisfy the request freshness information from the past positioning results, and responds to the client device 101 through the response transmission function unit 125 (Step S308). It is considered that a method of selecting the positioning results in Step S308 includes a method of selecting the positioning results with the highest accuracy, and a method of selecting the most up-to-date positioning results, from the positioning results which satisfy the request freshness information.

If the positioning results which satisfy the request freshness information do not exist (No in Step S302), the server device 102 ensures that the freshness request class information exists through the positioning response generation function unit 126 (Step S303). If the freshness request class information does not exist (No in Step S303), the server device 102 selects positioning results to be responded from the past positioning results to respond to the client device 101 (Step S306). It is considered that a method of selecting the positioning results in Step S306 includes a method of selecting the positioning results with the highest freshness, and a method of selecting the most up-to-date positioning results.

If the freshness request class information exists (Yes in Step S303), the server device 102 checks the freshness request class (Step S304). If the freshness request class is the third class ("Assured"), (Yes in Step S304), the server device 102 activates the positioning processing of the positioning function unit 121 in order to obtain the positioning results through the positioning response generation function unit 126 (Step S310). The positioning function unit 121 measures the position of the mobile station 103 which is a positioning target, and notifies the results to the positioning response generation function unit 126, as well as stores them in the storage function unit 123 to utilize for later positioning requests to the same mobile stations 103. Note that positioning of the mobile station 103 is carried out using one or more positioning systems. If the positioning is carried out using a plurality of positioning systems, a plurality of positioning results may be obtained.

If the freshness request class is not the third class ("Assured"), (No in Step S304), the server device 102 ensures that the freshness request class is the fourth class ("Best Effort"), (Step S305). If the freshness request class is the fourth class ("Best Effort"), (Yes in Step 305), the server device 102 selects the positioning results with the newest freshness from the past positioning results through the positioning response generation function unit 126, and responds to the client device 101 through the response transmission function unit 125 (Step S309).

If the freshness request class is not even the fourth class ("Best Effort"), (No in Step S305), the positioning response generation function unit 126 notifies an error to the client device 101 through the response transmission function unit 125 (Step S307).

Here, if the freshness request class information does not exist (No in Step S303), or the freshness request class is not the third class ("Assured"), (No in Step S304), there is considered such an embodiment as that the freshness request class is determined as being the fourth class ("Best Effort"), and the positioning results with the newest freshness are selected from the past positioning results to carry out the processing of responding to the client device 1001 (Step S309).

If the processing shown in FIG. 5 has resulted in transmission of the past positioning results to the client device 101, the server device 102 transmits the selected past positioning results to the client device 101 to complete the processing. If the processing shown in FIG. 5 has resulted in notification of an error to the client device 101, the server device 102 notifies the error to the client device 101 to complete the processing.

On the other hand, if the processing shown in FIG. 5 has resulted in execution of positioning processing, the server device 102 carries out the positioning processing for obtaining the position of the mobile station 103 through the positioning function unit 121. If this positioning processing has resulted in failure to obtain the position of the mobile station 103 by the failure of the positioning processing, the server device 102 notifies an error to the client device 101 through the response transmission function unit 125. Additionally, if the positioning processing has resulted in success in positioning of the mobile station 103 which is a positioning target to obtain the positioning results of the mobile station 103, the server device 102 determines whether the obtained positioning results satisfy the request condition of the client device 101 through the positioning response generation function unit 126.

Figure 6:
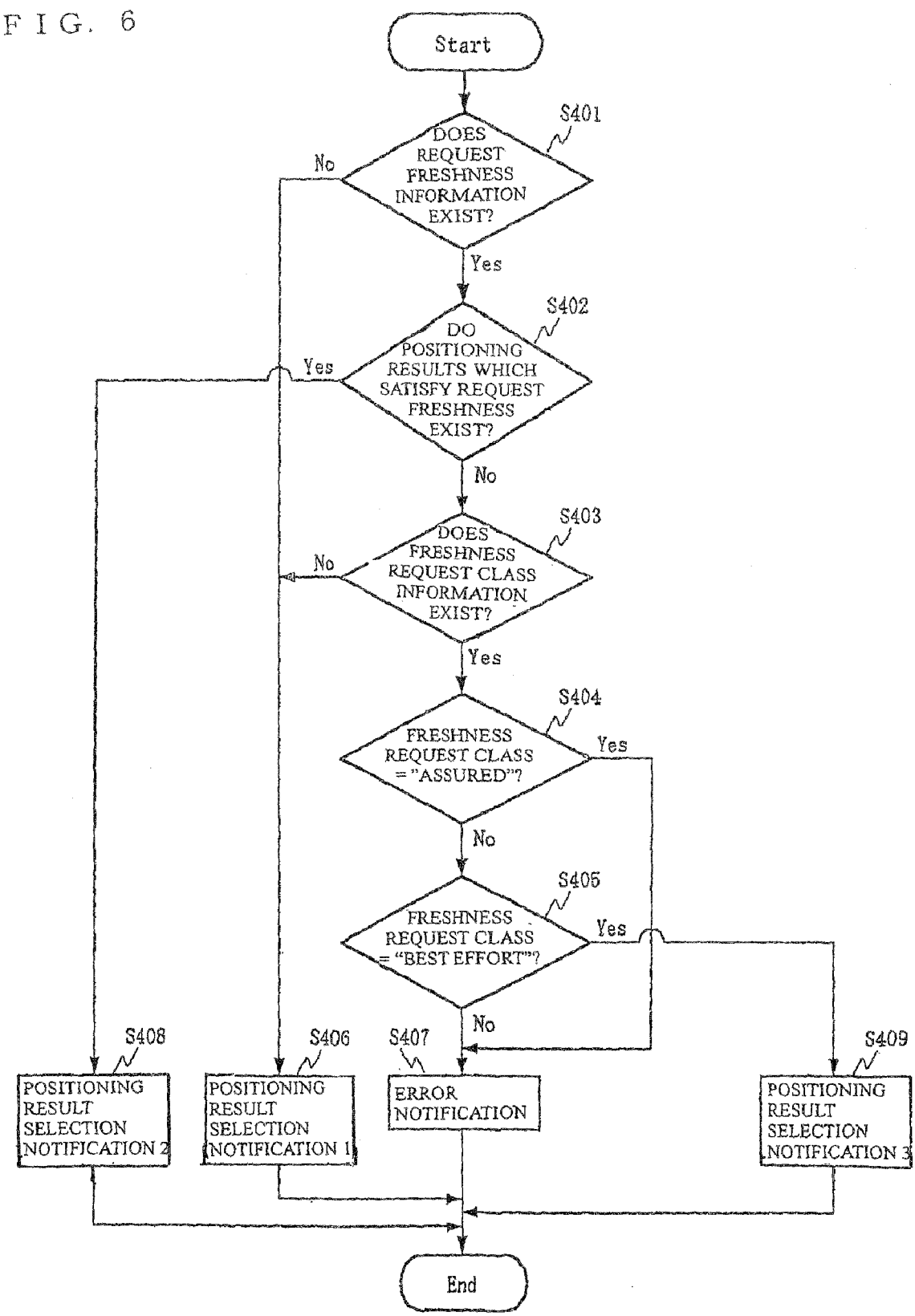
FIG. 6 is a flowchart showing a processing flow for the case of using positioning results obtained by newly measuring a position to select positioning results based on positioning freshness.

FIG. 6 shows an example of the flow of processing for determining whether positioning results obtained in new positioning processing satisfy the request condition of the client device 101, and selecting the positioning results based on the positioning freshness. Although this flow is almost the same as that of the processing of FIG. 5, it differs in detail in that selection targets are not the past positioning results, but the new positioning results obtained this time, and in that if the freshness request class is the third class, and freshness positioning results which satisfy the request freshness are not obtained, an error is notified to the client device 101. Hereinafter, the operation will be described along the flow of FIG. 6.

The server device 102 first ensures that the request freshness information exists in the positioning request from the client device 101 through the positioning response generation function unit 126 (Step S401). If the request freshness information does not exist (No in Step S401), the server device 102 selects positioning results from the positioning results obtained this time, and responds to the client device 101 through the response transmission function unit 125 (Step S406). It is considered that a method of selecting the positioning results in Step S406 includes a method of selecting the positioning results with the highest accuracy, and a method of selecting the most up-to-date positioning results.

If the request freshness information exists (Yes in Step S401), the server device 102 ensures that positioning results which are capable of satisfying the request freshness information exist through the positioning response generation function unit 126 (Step S402). If the positioning results which satisfy the request freshness information exist (Yes in Step S402), the server device 102 selects the positioning results which satisfy the request freshness information, and responds to the client device 101 through the response transmission function unit 125 (Step 408). It is considered that a method of selecting the positioning results in Step S408 includes a method of selecting the positioning results with the highest accuracy, and a method of selecting the most up-to-date positioning results, from the positioning results which satisfy the request freshness information.

If the positioning results which satisfy the request freshness information do not exist (No in Step S402), the server device 102 ensures that the freshness request class information exists through the positioning response generation function unit 126 (Step S403). If the freshness request class information does not exist (No in Step S403), the server device 102 selects the positioning results, and responds to the client device 101 through the response transmission function unit 125 (Step S406). It is considered that a method of selecting the positioning results in Step S406 includes a method of selecting the positioning results with the newest freshness, and a method of selecting the most up-to-date positioning results.

If the freshness request class information exists (Yes in Step S403), the server device 102 checks the freshness request class through the positioning response generation function unit 126 (Step 404). If the freshness request class is the third class ("Assured"), (Yes in Step S404), the positioning response generation function unit 126 notifies an error to the client device 101 through the response transmission function unit 125 (Step 407).

If the freshness request class is not the third class ("Assured"), (No in Step S404), the server device 102 ensures that the freshness request class is the fourth class ("Best Effort"), (Step S405). If the freshness request class is the fourth class ("Best Effort"), (Yes in Step 405), the server device 102 selects the positioning results with the newest freshness through the positioning response generation function unit 126, and responds to the client device 101 through the response transmission function unit 125 (Step 409).

If the freshness request class is not even the fourth class ("Best Effort"), (No in Step S405), the server device 102 notifies an error to the client device 101 through the response transmission function unit 125 (Step 407).

Here, if the freshness request class information does not exist (No in Step S403), or the freshness request class is not the third class ("Assured"), (No in Step S404), there is considered such an embodiment as that the freshness request class is determined as being the fourth class ("Best Effort"), and the positioning results with the newest freshness are selected to carry out the processing of responding to the client device 101 (Step S409).

The above operation is the operation when the positioning request from the client device 101 may respond the past positioning results. However, if the positioning request does not desire to respond the past positioning results, the server device 102 carries out no processing of FIG. 5, and rapidly activates the positioning processing of the positioning function unit 121 from the positioning response generation function unit 126. And, if this positioning processing has resulted in failure to obtain the position of the mobile station 103 by the failure of the positioning processing, the server device 102 notifies an error to the client device 101 through the response transmission function unit 125. Additionally, if the positioning processing has resulted in success in positioning of the mobile station 103 which is a positioning target to obtain the positioning results of the mobile station 103, the server device 102 carries out the processing shown in FIG. 6, determines whether the obtained positioning results satisfy the request condition of the client device 101, and notifies a response tailored to the determined results to the client device 101.

(3) Embodiment in which to Generate a Response Based on the Positioning Accuracy and Positioning Freshness The server device 102 ensures that the positioning request from the client device 101 may respond the past positioning results through the positioning response generation function unit 126, checks to see that the past positioning results of the mobile station 103 which is a positioning target are held in the storage function unit 123, if the past positioning results are acceptable, and determines whether positioning results which satisfy the request condition from the client device 101 exist in the past positioning results, if the past results are held.

Figure 7:
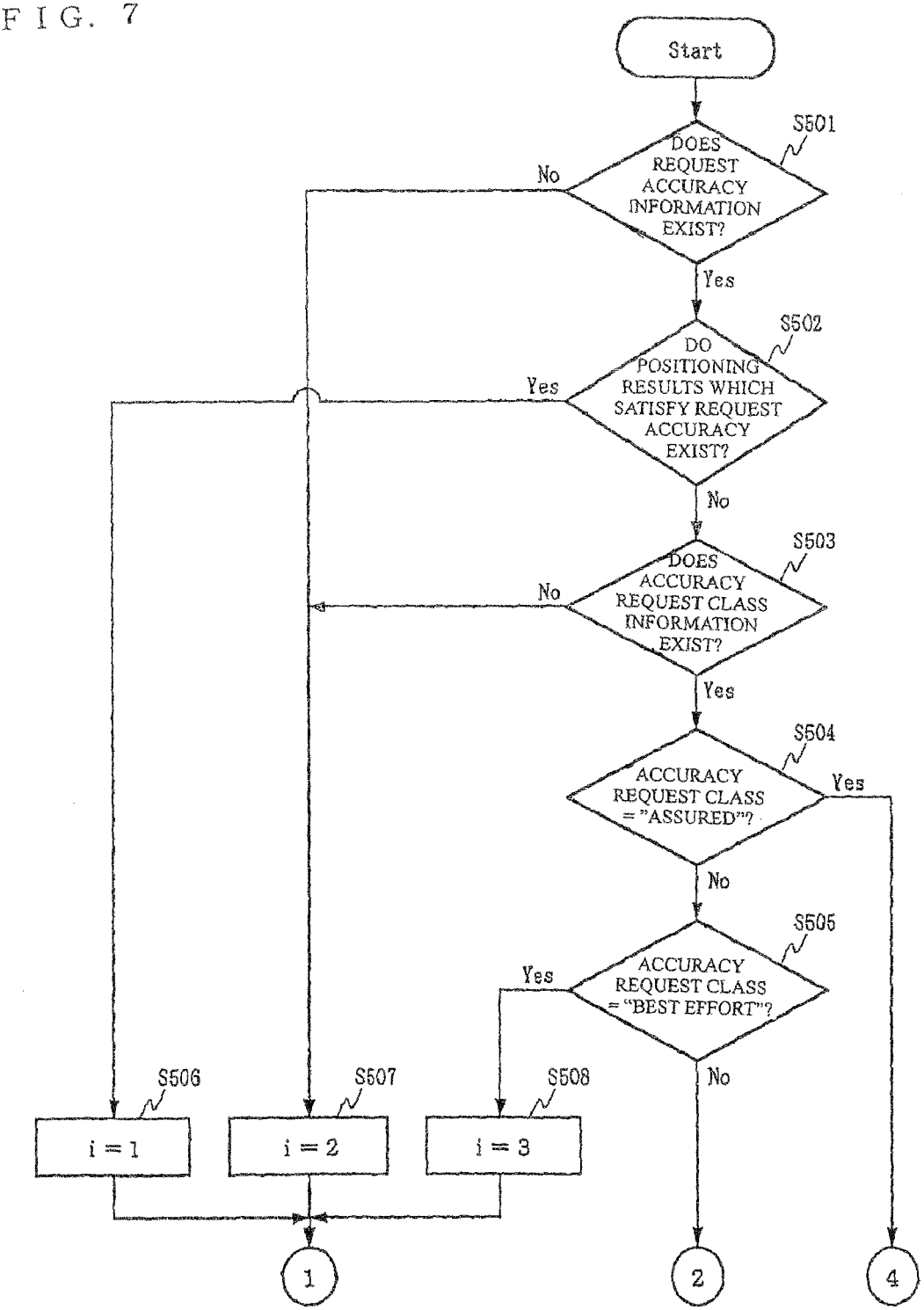
FIG. 7 is a flowchart showing a part of a processing flow for the case of using past positioning results to select positioning results based on positioning accuracy and positioning freshness.
Figure 8:
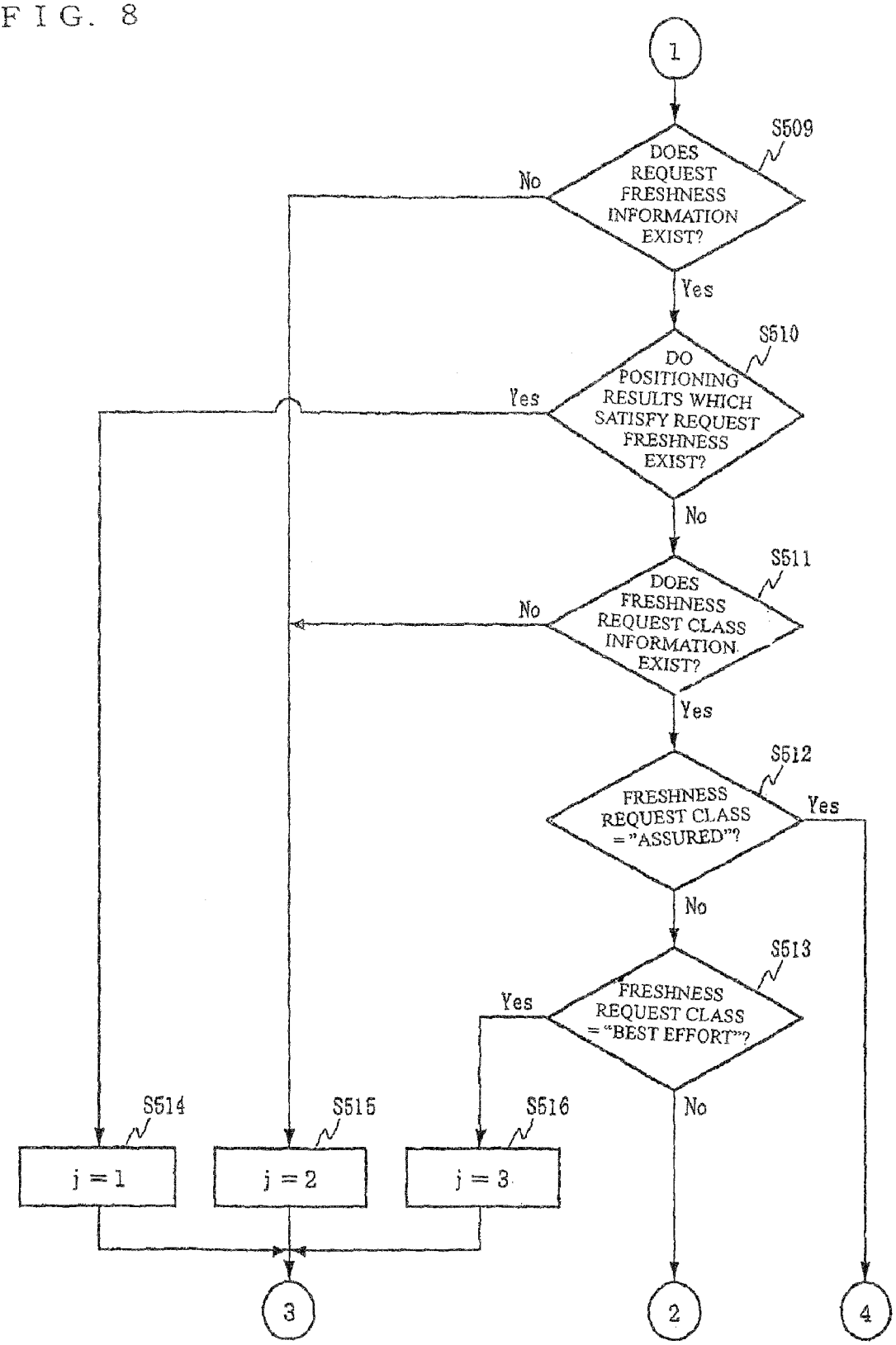
FIG. 8 is a flowchart showing a part of a processing flow for the case of using past positioning results to select positioning results based on positioning accuracy and positioning freshness.
Figure 9:
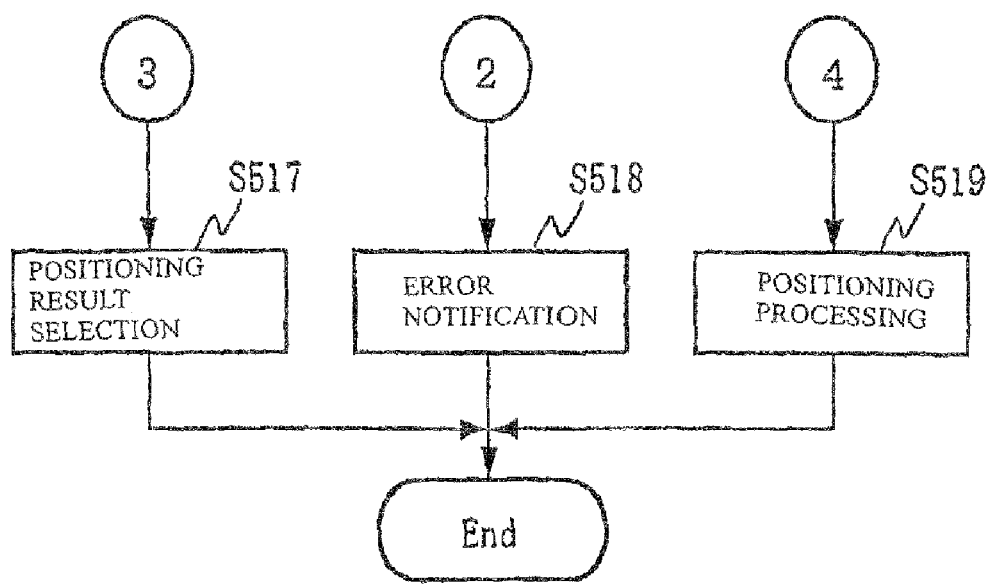
FIG. 9 is a flowchart showing a part of a processing flow for the case of using past positioning results to select positioning results based on positioning accuracy and positioning freshness.

On the existence of the past positioning results of the mobile station 103 which is a positioning target, a processing example in which to generate a response based on the positioning accuracy and the positioning freshness is shown in FIG. 7 to FIG. 9. The server device 102 first ensures that the request accuracy information exists in the positioning request from the client device 101 through the positioning response generation function unit 126 (Step S501). If the request accuracy information does not exist (No in Step S501), the server device 102 sets a value of 2 to a variable of i (Step S507), and then proceeds to the processing of FIG. 8.

If the request accuracy information exists (Yes in Step S501), the server device 102 ensures that positioning results which are capable of satisfying the request accuracy information exist in the past positioning results through the positioning response generation function unit 126 (Step S502). If the positioning results which satisfy the request accuracy information exist (Yes in Step S502), the server device 102 sets a value of 1 to a variable of i (Step S506), and then proceeds to the processing of FIG. 8.

If the positioning results which satisfy the request accuracy information do not exist (No in Step S502), the server device 102 ensures that the accuracy request class information exists through the positioning response generation function unit 126 (Step S503). If the accuracy request class information does not exist (No in Step S503), the server device 102 sets a value of 2 to a variable of i (Step S507), and then proceeds to the processing of FIG. 8.

If the accuracy request class information exists (Yes in Step S503), the server device 102 checks the accuracy request class (Step S504). If the accuracy request class is the first class ("Assured") (Yes in Step S504), the server device 102 activates the positioning processing of the positioning function unit 121 in order to obtain the positioning results through the positioning response generation function unit 126 (Step S519). The positioning function unit 121 measures the position of the mobile station 103 which is a positioning target, and notifies the results to the positioning response generation function unit 126, as well as stores them in the storage function unit 123 to utilize for later positioning requests to the same mobile stations 103. Note that positioning of the mobile station 103 is carried out using one or more positioning systems. If the positioning is carried out using a plurality of positioning systems, a plurality of positioning results may be obtained.

If the accuracy request class is not the first class ("Assured"), (No in Step S504), the server device 102 ensures that the accuracy request class is the second class ("Best Effort"), (Step S505). If the accuracy request class is the second class ("Best Effort"), (Yes in Step S505), the server device 102 sets a value of 3 to a variable of i (Step S508), and then proceeds to the processing of FIG. 8.

If the accuracy request class is not even the second class ("Best Effort"), (No in Step S505), the positioning response generation function unit 126 notifies an error to the client device 101 through the response transmission function unit 125 (Step S518) to complete the processing.

Here, if the accuracy request class information does not exist (No in Step S503), or the accuracy request class is not the first class ("Assured"), (No in Step S504), there is considered such an embodiment as that the accuracy request class is determined as being the second class ("Best Effort"), and processing of setting a value of 3 to a variable of i is carried out (Step S508).

When proceeding to the processing of FIG. 8, the following operation is performed. The server device 102 ensures that the request freshness information exists in the positioning request from the client device 101 through the positioning response generation function unit 126 (Step S509). If the request freshness information does not exist (No in Step S509), the server device 102 sets a value of 2 to a variable of j (Step S515), and proceeds to positioning result selection processing S517.

If the request freshness information exists (Yes in Step S509), the server device 102 ensures that positioning results which are capable of satisfying the request freshness information exist in the past positioning results through the positioning response generation function unit 126 (Step S510). If the positioning results which satisfy the request freshness information exist (Yes in Step S510), the server device sets a value of 1 to a variable of j (Step S514), and proceeds to the positioning result selection processing S517.

If the positioning results which satisfy the request freshness information do not exist (No in Step S510), the server device 102 ensures that the freshness request class information exists through the positioning response generation function unit 126 (Step S511). If the freshness request class information does not exist (No in Step S511), the server device 102 sets a value of 2 to a variable of j (Step S515), and proceeds to the positioning result selection processing S517.

If the freshness request class information exists (Yes in Step S511), the server device 102 checks the freshness request class (Step S512). If the freshness request class is the third class ("Assured"), (Yes in Step S512), the server device 102 activates the positioning processing of the positioning function unit 121 in order to obtain the positioning results through the positioning response generation function unit 126 (Step S519). The positioning function unit 121 measures the position of the mobile station 103 which is a positioning target, and notifies the results to the positioning response generation function unit 126, as well as stores them in the storage function unit 123 to utilize for later positioning requests to the same mobile stations 103. Note that positioning of the mobile station 103 is carried out using one or more positioning systems. If the positioning is carried out using a plurality of positioning systems, a plurality of positioning results may be obtained.

If the freshness request class is not the third class ("Assured"), (No in Step S512), the server device 102 ensures that the freshness request class is the fourth class ("Best Effort"), (Step S513). If the freshness request class is the fourth class ("Best Effort"), (Yes in Step 513), the server device 102 sets a value of 3 to a variable of j (Step S516), and proceeds to the positioning result selection processing S517.

If the freshness request class is not even the fourth class ("Best Effort"), (No in Step S513), the positioning response generation function unit 126 notifies an error to the client device 101 through the response transmission function unit 125 (Step S307) to complete the processing.

Here, if the freshness request class information does not exist (No in Step S511), or the freshness request class is not the third class ("Assured"), (No in Step S512), there is considered such an embodiment as that the freshness request class is determined as being the fourth class ("Best Effort"), and the processing of setting a value of 3 to a variable of j is carried out (Step S516).

In the positioning result selection processing S517, the server device 102 selects positioning results based on a combination of the variable of i and the variable of j which are the results of the processing as shown hereinbefore, and transmits them to the client device 101.

While in the processing of FIG. 7 to FIG. 9, an embodiment in which the processing based on the positioning accuracy (Step S501 to Step S508) is carried out prior to the processing based on the positioning freshness (Step 509 to Step 516) has been shown, there are considered an embodiment in which the processing based on the positioning freshness is first carried out, and an embodiment in which both of the processing are concurrently processed.

Next, the positioning result selection processing in Step S517 of FIG. 9 will be described in detail. FIG. 10 shows an example of a control table referred in the positioning result selection processing S517. The positioning response generation function unit 126 of the server device is provided with such a control table, and refers to the control table based on a combination of settings of the variable i and the variable j to determine the positioning result selection processing. Hereinafter, a description will be given of what positioning result selection processing is carried out in accordance with the combination of settings of the variable i and the variable j.

If the variable i is 1, and the variable j is 1, the server device 102 selects positioning results which satisfy both of the requested accuracy and the requested freshness from the past positioning results of the mobile station 103 which is a positioning target stored in the storage function unit 123 to notify to the client device 101 (Number 5-1).

If the variable i is 1, and the variable j is 2, the server device 102 selects positioning results which satisfy the requested accuracy from the past positioning results of the mobile station 103 which is a positioning target stored in the storage function unit 123 to notify to the client device 101 (Number 5-2).

If the variable i is 1, and the variable j is 3, the server device 102 selects positioning results which are as close to the requested freshness in positioning results which satisfy the requested accuracy as possible, from the past positioning results of the mobile station 103 which is a positioning target stored in the storage function unit 123 to notify to the client device 101 (Number 5-3).

If the variable i is 2, and the variable j is 1, the server device 102 selects positioning results which satisfy the requested freshness from the past positioning results of the mobile station 103 which is a positioning target stored in the storage function unit 123 to notify to the client device 101 (Number 5-4).

If the variable i is 2, and the variable j is 2, the server device 102 selects arbitrary positioning results from the past positioning results of the mobile station 103 which is a positioning target stored in the storage function unit 123 to notify to the client device 101 (Number 5-5).

If the variable i is 2, and the variable j is 3, the server device 102 selects positioning results which are as close to the requested freshness as possible from the past positioning results of the mobile station 103 which is a positioning target stored in the storage function unit 123 to notify to the client device 101 (Number 5-6).

If the variable i is 3, and the variable j is 1, the server device 102 selects positioning results which are as close to the requested accuracy in positioning results which satisfy the requested freshness as possible, from the past positioning results of the mobile station 103 which is a positioning target stored in the storage function unit 123 to notify to the client device 101 (Number 5-7).

If the variable i is 3, and the variable j is 2, the server device 102 selects positioning results which are close to the requested accuracy from the past positioning results of the mobile station 103 which is a positioning target stored in the storage function unit 123 to notify to the client device 101 (Number 5-8).

If the variable i is 3, and the variable j is 3, the server device 102 selects positioning results which are as close to the requested accuracy and the requested freshness as possible from the past positioning results of the mobile station 103 which is a positioning target stored in the storage function unit 123 to notify to the client device 101 (Number 5-9).

Here, when there is a plurality of positioning results which satisfy each condition ranging from number 5-1 to number 5-9, considered are a method of selecting arbitrary positioning results, a method of selecting positioning results with new positioning freshness, a method of selecting positioning results with high positioning accuracy, and a method of selecting in favor of information with higher priority based on priority information showing whether positioning accuracy or positioning freshness is prioritized. Here, the priority information employs the one transmitted by a client device 601 together with a positioning request.

If the processing shown in FIG. 7 to FIG. 9 has resulted in transmission of the past positioning results to the client device 101, the server device 102 transmits the selected past positioning results to the client device 101 to complete the processing. If the processing shown in FIG. 7 to FIG. 9 has resulted in notification of an error to the client device 101, the server device 102 notifies the error to the client device 101 to complete the processing.

In the meantime, if the processing shown in FIG. 7 to FIG. 9 has resulted in execution of positioning processing, the server device 102 executes the positioning processing for obtaining the position of the mobile station 103 which is a positioning target through the positioning function unit 121. If this positioning processing has resulted in failure to obtain the position of the mobile station 103 by the failure of the positioning processing, the server device 102 notifies an error to the client device 101 through the response transmission function unit 125. Additionally, if this positioning processing has resulted in success in positioning of the mobile station 103 which is a positioning target to obtain the positioning results of the mobile station 103, the server device 102 determines whether the obtained positioning results satisfy the request condition of the client device 101 through the positioning response generation function unit 126.

Figure 11:
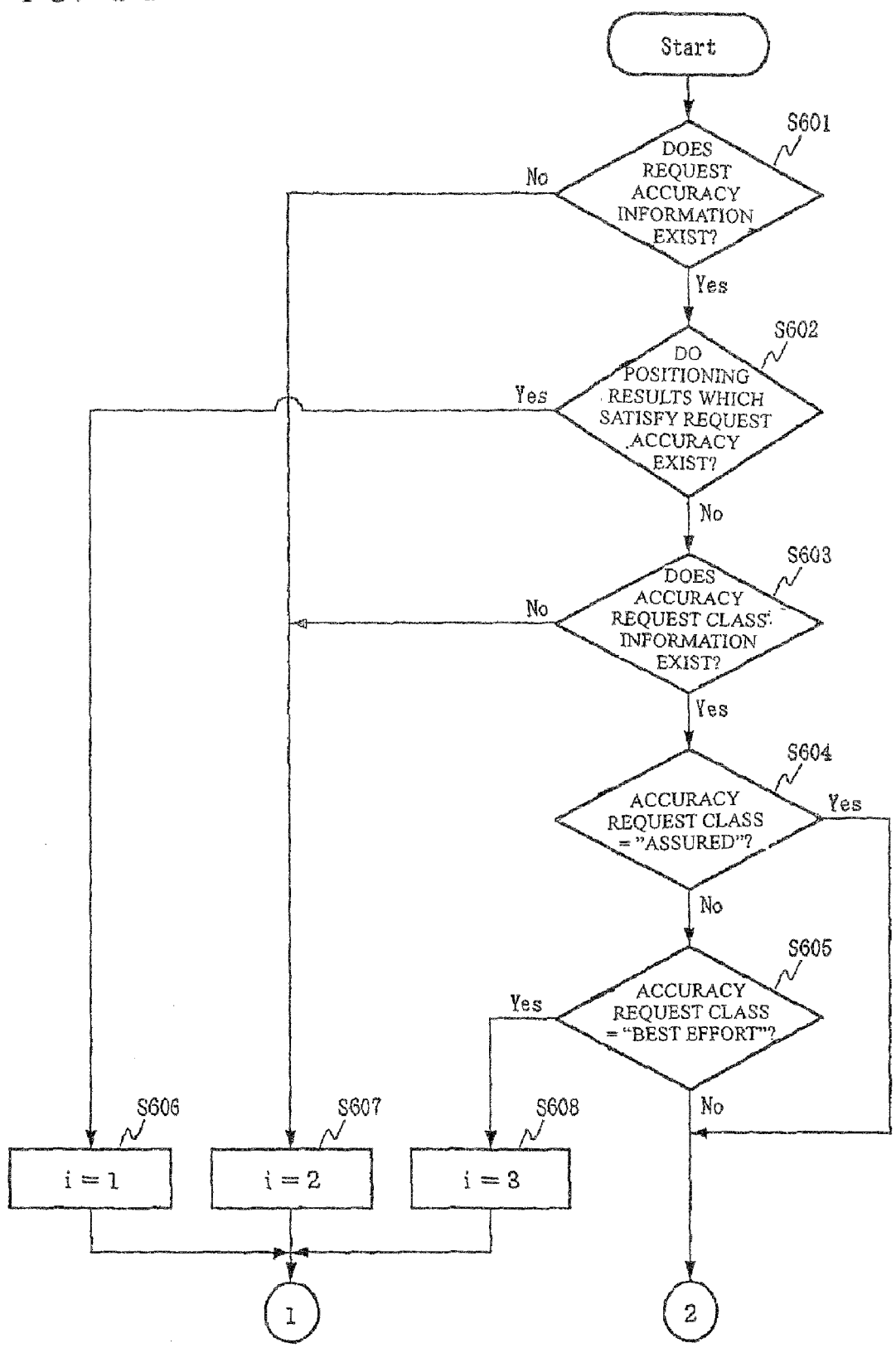
FIG. 11 is a flowchart showing a part of a processing flow for the case of using positioning results obtained by newly measuring a position to select positioning results based on positioning accuracy and positioning freshness.
Figure 12:
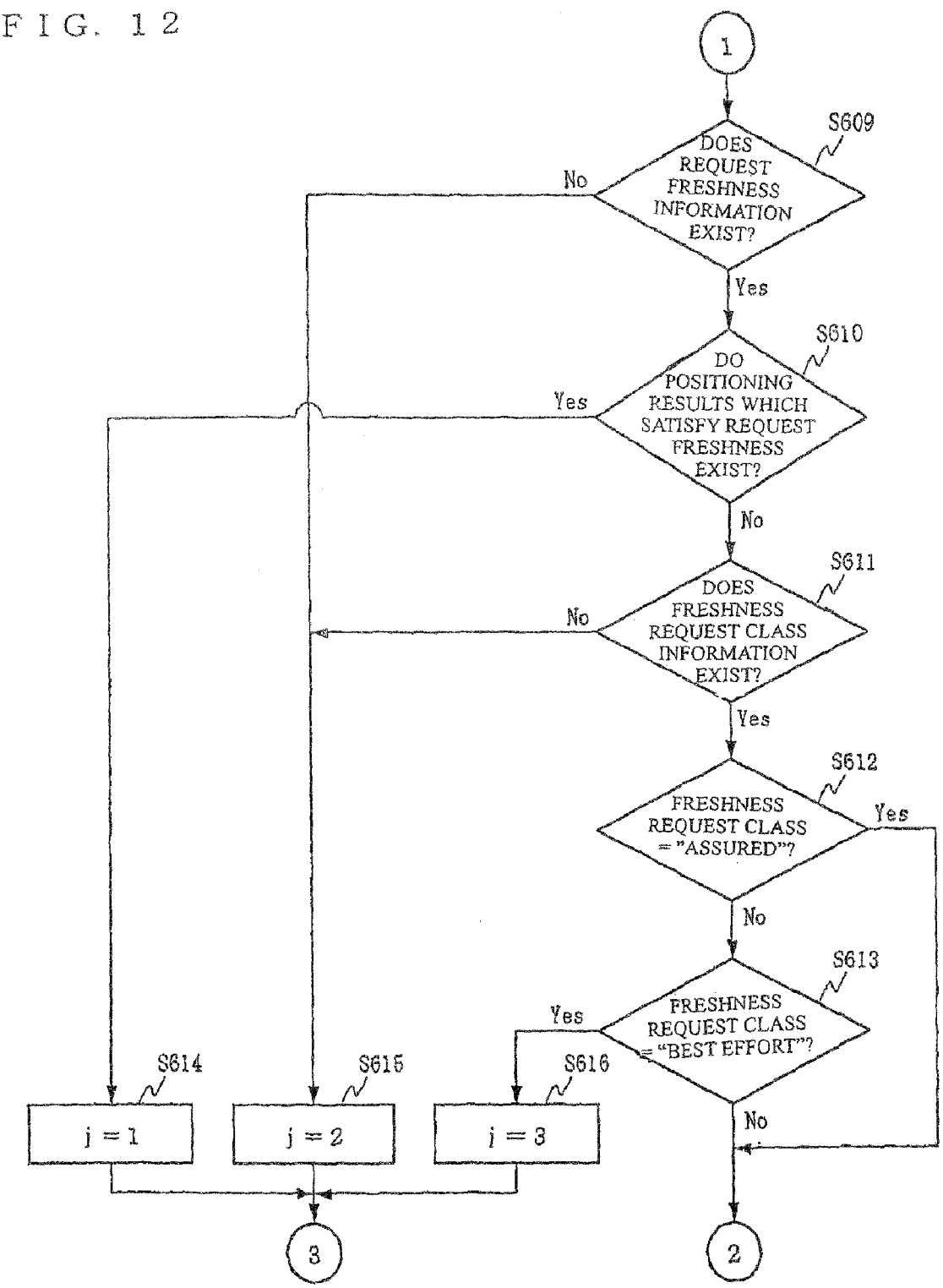
FIG. 12 is a flowchart showing a part of a processing flow for the case of using positioning results obtained by newly measuring a position to select positioning results based on positioning accuracy and positioning freshness.
Figure 13:
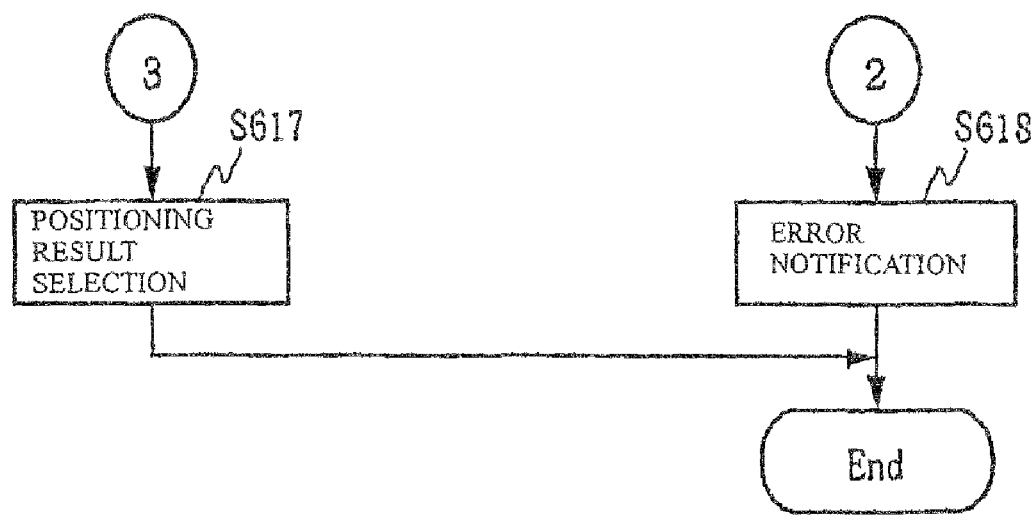
FIG. 13 is a flowchart showing a part of a processing flow for the case of using positioning results obtained by newly measuring a position to select positioning results based on positioning accuracy and positioning freshness.

FIG. 11 to FIG. 13 show examples of the flows of processing for determining whether positioning results obtained in new positioning processing satisfy the request condition of the client device 101, and selecting the positioning results based on the positioning accuracy and the positioning freshness. Although these flows are almost the same as those of the processing in FIG. 7 to FIG. 9, they differ in detail in that selection targets are not the past positioning results, but the new positioning results obtained this time, and in that if the accuracy request class is the first class, and accuracy positioning results which satisfy the request accuracy are not obtained, or if the accuracy request class is the third class, and freshness positioning results which satisfy the request freshness are not obtained, an error is notified to the client device 101. Hereinafter, the operation will be described along the flows of FIG. 11 to FIG. 13.

The server device 102 first ensures that the request accuracy information exists in the positioning request from the client device 101 through the positioning response generation function unit 126 (Step S601). If the request accuracy information does not exist (No in Step S601), the server device 102 sets a value of 2 to a variable of i (Step S607), and then proceeds to the processing of FIG. 12.

If the request accuracy information exists (Yes in Step S601), the server device 102 ensures that positioning results which are capable of satisfying the request accuracy information exist in the positioning results in question through the positioning response generation function unit 126 (Step S602). If the positioning results which satisfy the request accuracy information exist (Yes in Step S602), the server device 102 sets a value of 1 to a variable of i (Step S606), and proceeds to the processing of FIG. 12.

If the positioning results which satisfy the request accuracy information do not exist (No in Step S602), the server device 102 ensures that the accuracy request class information exists through the positioning response generation function unit 126 (Step S603). If the accuracy request class information does not exist (No in Step S603), the server device 102 sets a value of 2 to a variable of i (Step S607), and proceeds to the processing of FIG. 12.

If the accuracy request class information exists (Yes in Step S603), the server device 102 checks the accuracy request class (Step S604). If the accuracy request class is the first class ("Assured"), (Yes, in Step S604), the positioning response generation function unit 126 notifies an error to the client device 101 through the response transmission function unit 125 (Step S618) to complete the processing.

If the accuracy request class is not the first class ("Assured"), (No in Step S604), the server device 102 ensures that the accuracy request class is the second class ("Best Effort"), (Yes in Step S605). If the accuracy request class is the second class ("Best Effort"), (Yes in Step S605), the server device 102 sets a value of 3 to a variable of i (Step S608), and then proceeds to the processing of FIG. 12.

If the accuracy request class is not even the second class ("Best Effort"), (No in Step S605), the positioning response generation function unit 126 notifies an error to the client device 101 through the response transmission function unit 125 (Step S618) to complete the processing.

Here, if the accuracy request class information does not exist (No in Step S603), or the accuracy request class is not the first class ("Assured"), (No in Step S604), there is considered such an embodiment as that the accuracy request class is determined as being the second class ("Best Effort"), and the processing of setting a value of 3 to a variable of i is carried out (Step S608).

When proceeding to the processing of FIG. 12, the following operation is performed. The server device 102 ensures that the request freshness information exists in the positioning request from the client device 101 through the positioning response generation function unit 126 (Step S609). If the request freshness information does not exist (No in Step S609), the server device 102 sets a value of 2 to a variable of (Step S615), and proceeds to positioning result selection processing S617.

If the request freshness information exists (Yes in Step S609), the server device 102 ensures that positioning results which are capable of satisfying the request freshness information exist (Step S610). If the positioning results which satisfy the request freshness information exist (Yes in Step S610), the server device 102 sets a value of 1 to a variable of j (Step S614), and proceeds to the positioning result selection processing S617.

If the positioning results which satisfy the request freshness information do not exist (No in Step S610), the server device 102 ensures that the freshness request class information exists through the positioning response generation function unit 126 (Step S611). If the freshness request class information does not exist (No in Step S611), the server device 102 sets a value of 2 to a variable of j (Step S615), and proceeds to the positioning result selection processing S617.

If the freshness request class information exists (Yes in Step S611), the server device 102 checks the freshness request class (Step S612). If the freshness request class is the third class ("Assured"), (Yes in Step S612), the positioning response generation function unit 126 notifies an error to the client device 101 through the response transmission function unit 125 (Step S618) to complete the processing.

If the freshness request class is not the third class ("Assured"), (No in Step S612), the server device 102 ensures that the freshness request class is the fourth class ("Best Effort"), (Step S613). If the freshness request class is the fourth class ("Best Effort"), (Yes in Step 613), the server device 102 sets a value of 3 to a variable of j (Step S616), and proceeds to the positioning result selection processing S617.

If the freshness request class is not even the fourth class ("Best Effort"), (No in Step S613), the positioning response generation function unit 126 notifies an error to the client device 101 through the response transmission function unit 125 (Step S618) to complete the processing.

Here, if the freshness request class information does not exist (No in Step S611), or the freshness request class is not the third class ("Assured"), (No in Step S612), there is considered such an embodiment as that the freshness request class is determined as being the fourth class ("Best Effort"), and the processing of setting a value of 3 to a variable of j is carried out (Step S616).

In the positioning result selection processing S617, the server device 102 selects positioning results based on a combination of the variable of i and the variable of j which are the results of the processing as shown in FIG. 11 and FIG. 12, and transmits them to the client device 101.

While in the processing of FIG. 11 to FIG. 13, an embodiment in which the processing based on the positioning accuracy (Step S601 to Step S608) is carried out prior to the processing based on the positioning freshness (Step 609 to Step 616) has been shown, there are considered an embodiment in which the processing based on the positioning freshness is first carried out, and an embodiment in which both of the processing are concurrently processed.

The positioning result selection processing in Step S617 of FIG. 13 refers to the same control table as that shown in FIG. 10 to determine the positioning result selection processing. Hereinafter, a description will be given of what positioning result selection processing is carried out according to the combination of settings of the variable i and the variable j.

If the variable i is 1, and the variable j is 1, the server device 102 selects positioning results which satisfy both of the requested accuracy and the requested freshness from the positioning results of the mobile station 103 which is a positioning target, obtained in this positioning processing to notify to the client device 101 (Number 5-1).

If the variable i is 1, and the variable j is 2, the server device 102 selects positioning results which satisfy the requested accuracy from the positioning results of the mobile station 103 which is a positioning target, obtained in this positioning processing to notify to the client device 101 (Number 5-2).

If the variable i is 1, and the variable j is 3, the server device 102 selects positioning results which are as close to the requested freshness in positioning results which satisfy the requested accuracy as possible from the positioning results of the mobile station 103 which is a positioning target, obtained in this positioning processing to notify to the client device 101 (Number 5-3).

If the variable i is 2, and the variable j is 1, the server device 102 selects positioning results which satisfy the requested freshness from the positioning results of the mobile station 103 which is a positioning target, obtained in this positioning processing to notify to the client device 101 (Number 5-4).

If the variable i is 2, and the variable j is 2, the server device 102 selects arbitrary positioning results from the positioning results of the mobile station 103 which is a positioning target, obtained in this positioning processing to notify to the client device 101 (Number 5-5).

If the variable i is 2, and the variable j is 3, the server device 102 selects positioning results which are as close to the requested freshness as possible from the positioning results of the mobile station 103 which is a positioning target, obtained in this positioning processing to notify to the client device 101 (Number 5-6).

If the variable i is 3, and the variable j is 1, the server device 102 selects positioning results which are as close to the requested accuracy in positioning results which satisfy the requested freshness as possible, from the positioning results of the mobile station 103 which is a positioning target, obtained in this positioning processing to notify to the client device 101 (Number 5-7).

If the variable i is 3, and the variable j is 2, the server device 102 selects positioning results which are close to the requested accuracy from the positioning results of the mobile station 103 which is a positioning target, obtained in this positioning processing to notify to the client device 101 (Number 5-8).

If the variable i is 3, and the variable j is 3, the server device 102 selects positioning results which are as close to the requested accuracy and the requested freshness as possible from the positioning results of the mobile station 103 which is a positioning target, obtained in this positioning processing to notify to the client device 101 (Number 5-9).

Here, when there is a plurality of positioning results which satisfy each condition ranging from number 5-1 to number 5-9, considered are a method of selecting arbitrary positioning results, a method of selecting positioning results with new positioning freshness, a method of selecting positioning results with high positioning accuracy, and a method of selecting in favor of information with higher priority based on priority information showing whether positioning accuracy or positioning freshness is prioritized, as described in the positioning result selection processing S517 of FIG. 9.

The above operation is the operation when the positioning request from the client device 101 may respond the past positioning results. However, if the positioning request does not desire to respond the past positioning results, the server device 102 carries out no processing of FIG. 7 to FIG. 9, and rapidly activates the positioning processing of the positioning function unit 121 from the positioning response generation function unit 126. And, if this positioning processing has resulted in failure to obtain the position of the mobile station 103 by the failure of the positioning processing, the server device 102 notifies an error to the client device 101 through the response transmission function unit 125. Additionally, if the positioning processing has resulted in success in positioning of the mobile station 103 which is a positioning target, the server device 102 executes the processing shown in FIG. 11 to FIG. 13, determines whether the obtained positioning results satisfy the request condition of the client device 101, and notify a response tailored to the determined results to the client device 101.

Second Embodiment of the Present Invention

A second embodiment of the present invention differs from the above-described first embodiment in the following descriptions, but otherwise is the same as the first embodiment. The difference will be described hereinafter.

Figure 14:
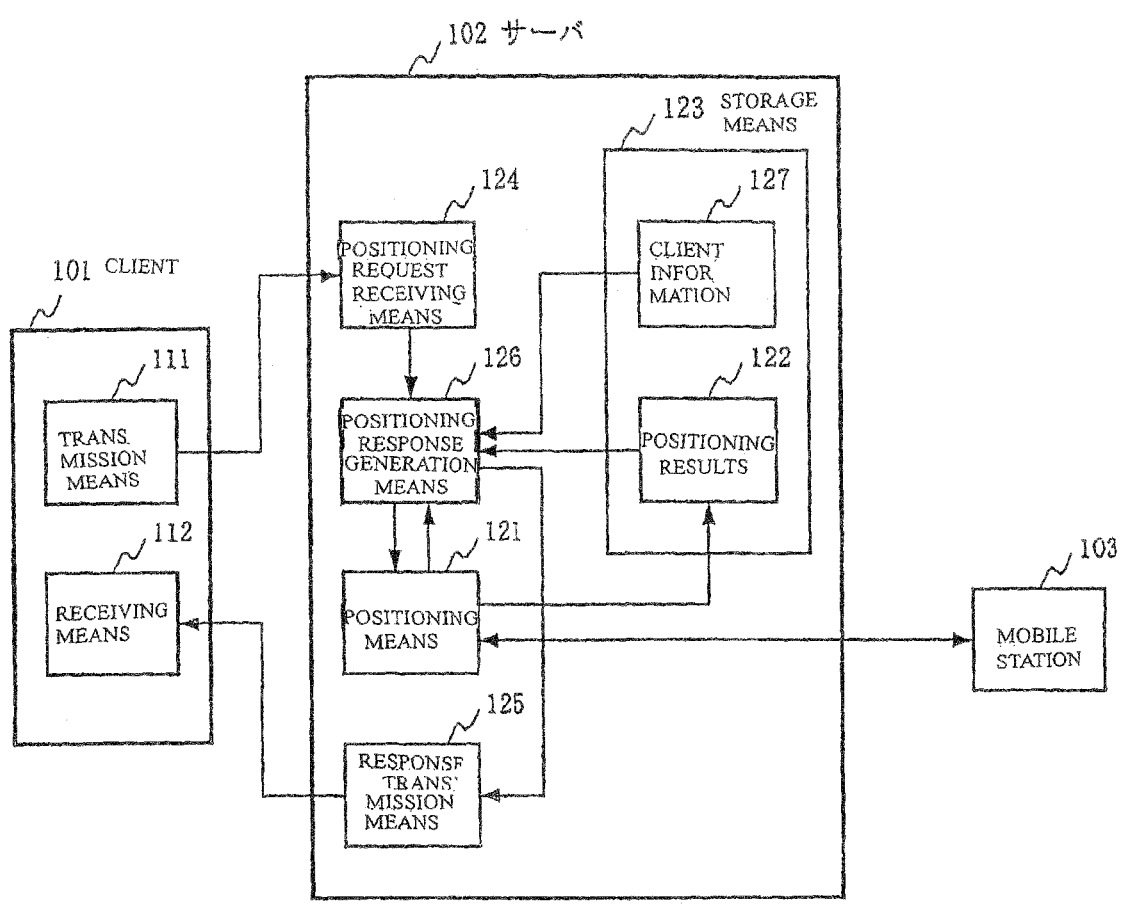
FIG. 14 is a block diagram showing a configuration of each node in a mobile communication network according to a second embodiment of the present invention.

Referring to FIG. 14, the server device 102 further has the storage function unit 123. The storage function unit 123 previously registers client information 127 containing each information of the request positioning accuracy information, the positioning accuracy request class information, the request positioning freshness information, the positioning freshness request class information, and the priority information showing whether the positioning accuracy or the positioning freshness is prioritized by associating with a client identifier of the client device 101. Upon generating a response of the positioning request received from the client device 101, the positioning response generation function unit 126 of the server device 102 is configured so as to search the client information 127 using the client identifier specified in the positioning request as a clue to use the request positioning accuracy information, the positioning accuracy request class information, the request positioning freshness information, the positioning freshness request class information, and the priority information that the client device 101 has previously registered.

Here, there is considered a modification in which part of information alone, such as the request positioning accuracy information and its request class information alone, or the request freshness information and its request class information alone, or the request positioning accuracy information alone, or the request positioning freshness information alone is registered, except that all of the request positioning accuracy information, the positioning accuracy request class information, the request positioning freshness information, the positioning freshness request class information, and the priority information are registered in the client information 127. In this case, unregistered parameters are determined as not being specified.

According to the present embodiment, the client device 101 eliminates the necessity of containing the request positioning accuracy information, the positioning accuracy request class information, the request positioning freshness information, the positioning freshness request class information and the priority information in a positioning request message.

Third Embodiment of the Present Embodiment

A third embodiment of the present invention differs from the above-described first embodiment in the following descriptions, but otherwise is the same as the first embodiment. The difference will be described below.

Figure 15:
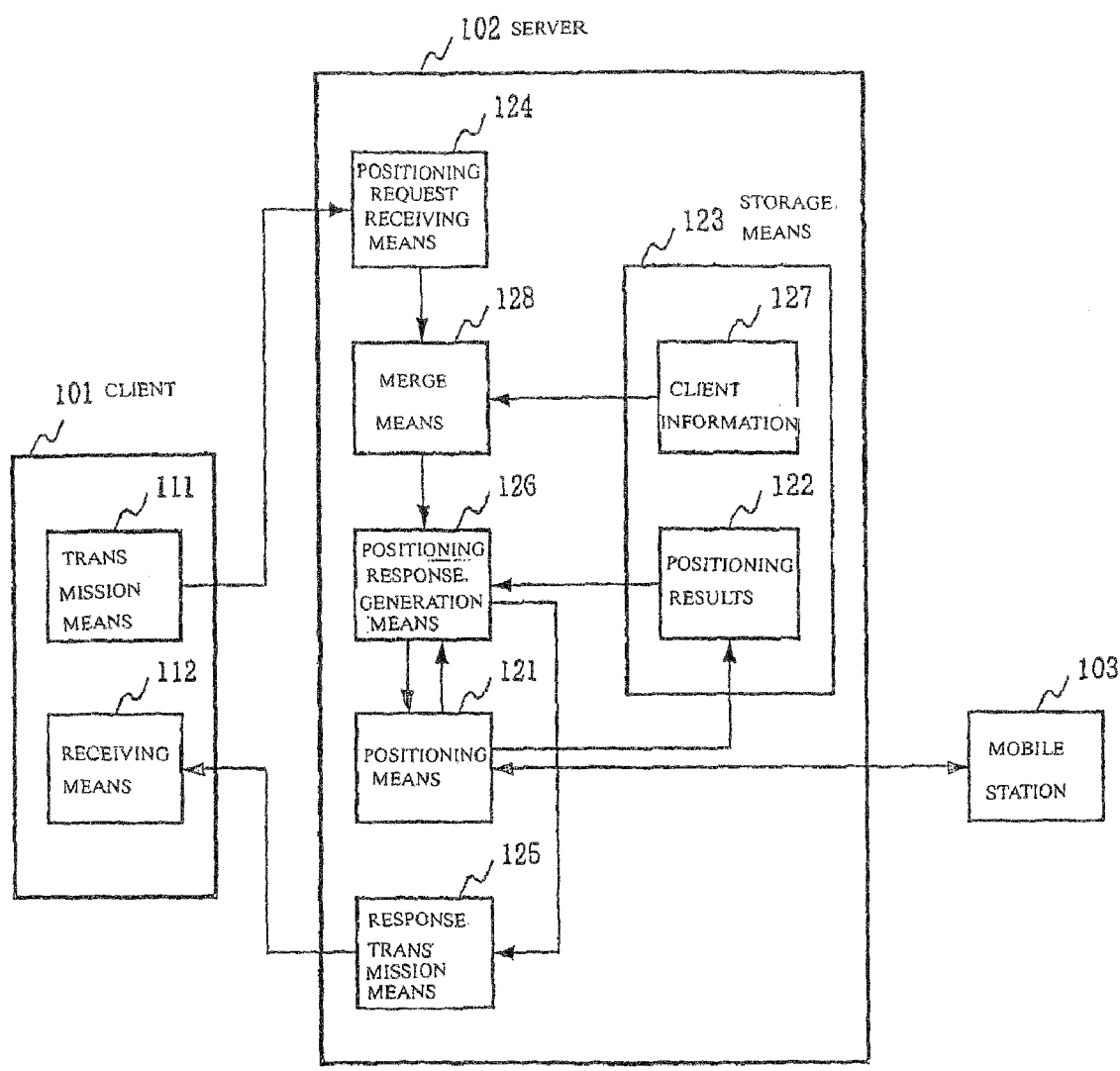
FIG. 15 is a block diagram showing a configuration of each node in a mobile communication network according to a third embodiment of the present invention.

Referring to FIG. 15, the server device 102 further has the storage function unit 123. The storage function unit 123 previously registers the client information 127 containing each information of the request positioning accuracy information, the positioning accuracy request class information, the request positioning freshness information, the positioning freshness request class information, and the priority information showing whether the positioning accuracy or the positioning freshness is prioritized by associating with the client identifier of the client device 101. Furthermore, a merge function unit 128 is provided between the positioning request receiving function unit 124 and the positioning response generation function unit 126.

When the merge function unit 128 receives the positioning request of the client device 101 from the positioning request receiving function unit 124, and the positioning request specifies all of the request positioning accuracy information, the positioning accuracy request class information, the request positioning freshness information, the positioning freshness request class information, and the priority information, the merge function unit 128 transfers the received positioning request directly to the positioning response generation function unit 126. If any of the information should not be specified, the merge function unit 128 searches the client information 127 using the client identifier specified in the positioning request as a clue, and adds the registered values of the parameters not specified in the positioning request among the request positioning accuracy information, the positioning accuracy request class information, the request positioning freshness information, the positioning freshness request class information, and the priority information that the client device 101 has previously registered to the positioning request to transfer to the positioning response generation function unit 126.

Here, there is considered a modification in which a part of parameters alone, such as the request positioning accuracy information and its request class information alone, or the request positioning freshness information and its request class information alone, or the request positioning accuracy information alone, or the request positioning freshness information alone is registered, in place of registering all parameters of the request positioning accuracy information, the positioning accuracy request class information, the request positioning freshness information, the positioning freshness request class information, and the priority information in the client information 127. If the parameters not registered in the client information 127 are not also specified in the positioning request, the parameters are processed as being nonexistent.

According to the present embodiment, if the client device 101 specifies the request positioning accuracy information, the positioning accuracy request class information, the request positioning freshness information, the positioning freshness request class information, and the priority information in a positioning request message, the specified one is used, and for the one not specified in the positioning request message, the one previously registered in the client information 127 is used. Thus, if using the same information as the request positioning accuracy information, the positioning accuracy request class information, the request positioning freshness information, the positioning freshness request class information, and the priority information that the client device 101 has previously registered, the client device 101 eliminates the necessity of containing the information in a positioning request message. In addition, if different parameters from those previously registered are specified in the positioning request, the parameters specified in the positioning request are prioritized, so that a positioning request using different parameters from the registered values is also made possible.

Fourth Embodiment of the Present Invention

Figure 16:
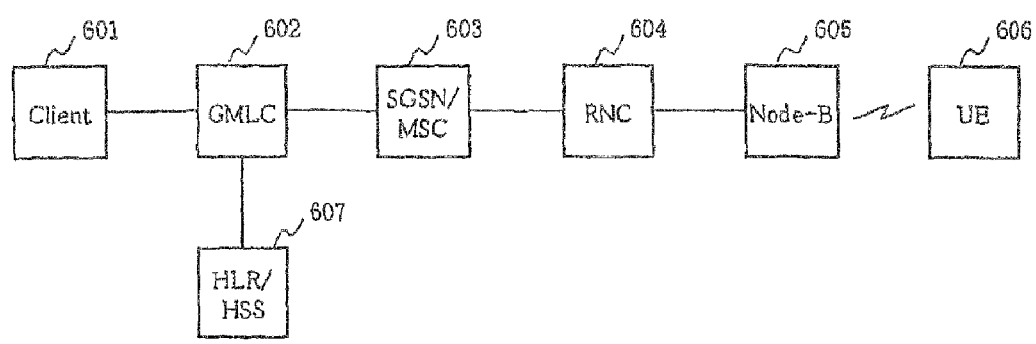
FIG. 16 is a configuration diagram of a mobile communication network according to a fourth embodiment of the present invention.

Referring to FIG. 16, a mobile communication network according to a fourth embodiment of the present invention includes a plurality of node devices, such as one or more client devices 601, one or more GMLC devices 602 which are gateway devices receiving positioning requests from the client devices 601 in the mobile communication network, one or more UE devices 606 which are mobile stations to become positioning targets, one or more Node-B devices (base station devices) 605 which are the base stations communicating with the UE devices by radio, one or more RNC devices 604 which manage one or more Node-B devices 605, one or more SGSN/MSC devices 603 which manage a Regional Area Network (RAN) comprised of one or more RNC devices 604 and Node-B devices 605, and one or more HLR/HSS devices 607 which are mobile station database holding information of the SGSN/MSC devices 603 which manage the Regional Area Network (RAN) to which each UE device 606 is connected.

Figure 17:
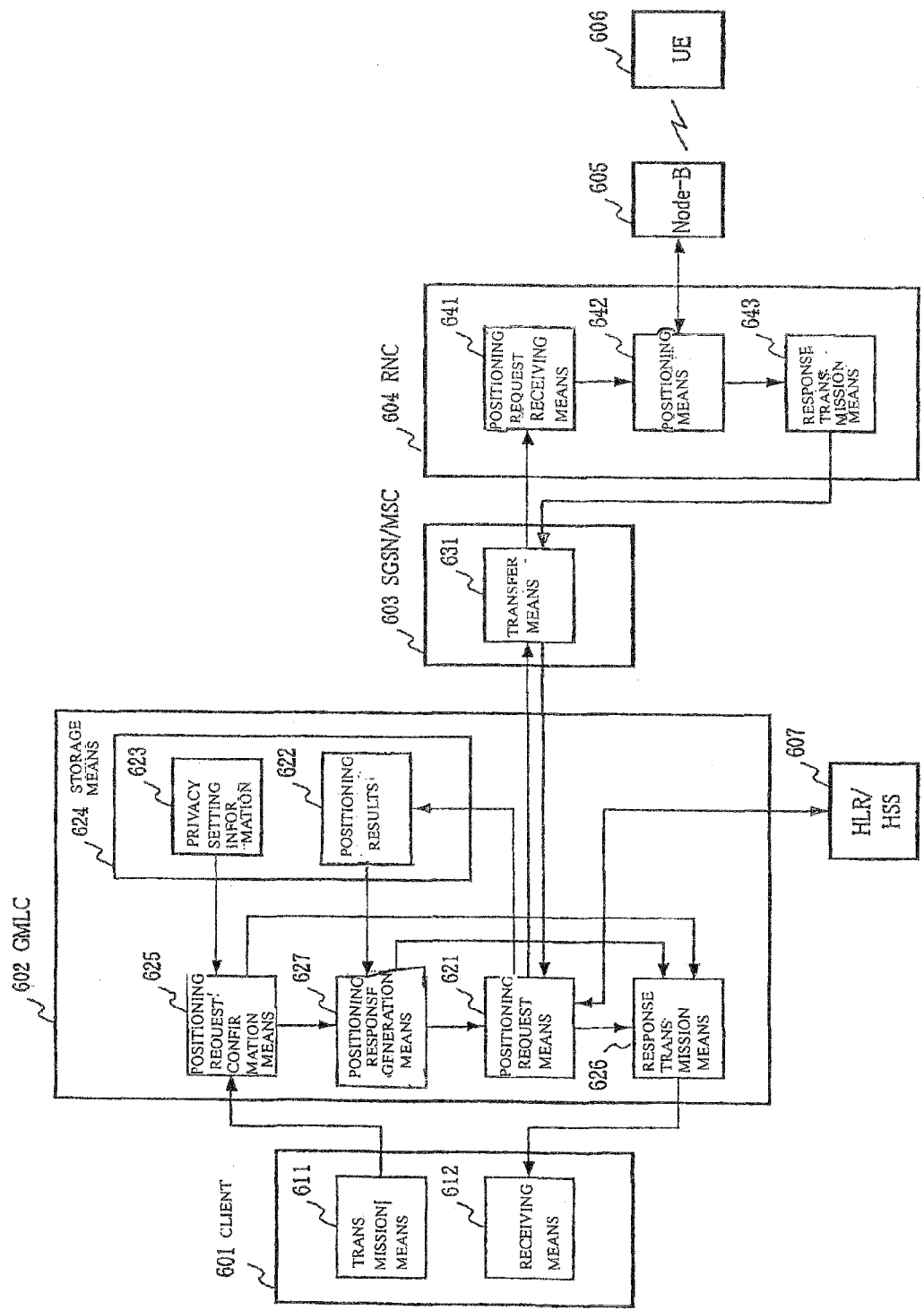
FIG. 17 is a block diagram showing a configuration of each node in a mobile communication network according to a fourth embodiment of the present invention.

Referring to FIG. 17, the client device 601 has a transmission function unit 611 which transmits a positioning request to the GMLC device 602, and a receiving function unit 612 which receives a response to the transmitted positioning request from the GMLC device 602.

The GMLC device 602 has a positioning request function unit 621 which transmits a positioning request to the UE device 606 which is a positioning target to the SGSN/MSC device 603, a storage function unit 624 which stores past positioning results 622 of the UE device 606 whose position has been measured and privacy setting information 623 of the UE device 606, a positioning request confirmation function unit 625 which receives the positioning request from the client device 101 to perform privacy-check, and the like, a response transmission function unit 626 which transmits a response to the positioning request to the client device 601, and a positioning response generation function unit 627 which generates the response to the positioning request accepted by the positioning request confirmation function unit 625.

The SGSN/MSC device 603 has a transfer function unit 631 which receives the positioning request from the GMLC 602 to transfer to the RNC device 604, and which receives a response to the transferred positioning request from the RNC device 604 to transfer to the GMLC device 602.

The RNC 604 has a positioning request receiving function unit 641 which receives the positioning request from the SGSN/MSC 603, a positioning function unit 642 which measures the position of the UE device 606, and a response transmission function unit 643 which transmits positioning results by the positioning function unit 642 to the SGSN/MSC 603.

The positioning function unit 642 of the RNC 604 measures the position of the UE device 606 in at least one positioning system. A typical example of the positioning systems includes Cell ID positioning, OTDOA positioning, assistant type positioning (A-GPS positioning), but is not necessarily limited to these.

A positioning request message transmitted from the transmission function unit 611 of the client device 601 contains a terminal identifier for identifying the UE device 606 which is a positioning target, such as a telephone number and a terminal ID, accuracy information of position information that the client device 601 requests (request positioning accuracy information), positioning accuracy request class information, freshness information of the position information that the client device 601 requests (request positioning freshness information), positioning freshness request class information, a positioning type showing whether past positioning positions may be used for a response, a client identifier which uniquely identifies its own client device 601, and other necessary information.

It is considered that the accuracy of the position information is defined as the radius of a circle which covers a region with the possibility of existence of the UE device centering around the point indicated by the position information getting as a response. It is considered that the freshness of the position information is expressed in absolute time notation such as being at what second of what minute of what hour of what day of what year, and expressed in relative time of the clock time when the current time such as being before what second of what minute of what hour, and positioning results have been obtained.

The positioning accuracy request class information is the information which shows the degree of request of the positioning accuracy specified in the request positioning accuracy information. In the present embodiment, there are two types of first class ("Assured") which notifies positioning results which do not fail to satisfy the requested positioning accuracy, and which requests to notify an error, if the positioning results which satisfy the request do not exist, and second class ("Best effort") which requests to notify the positioning results which are closest to the requested positioning accuracy, if the requested positioning accuracy is not satisfied. Note that the positioning accuracy request class information has only the first class ("Assured"), and that if the positioning accuracy request class information is not specified, an alternative method of interpreting as meaning that the second class ("Best effort") has been specified may be considered.

Similarly, the positioning freshness request class information is the information which shows the degree of request of the positioning freshness specified in the request positioning freshness information. In the present embodiment, there are two types of third class ("Assured") which notifies positioning results which do not fail to satisfy the requested positioning freshness, and which requests to notify an error, if the positioning results which satisfy the request do not exist, and fourth class ("Best effort") which requests to notify the positioning results which are closest to the requested positioning freshness, if the requested positioning freshness is not satisfied. Note that the positioning freshness request class information has only the third class ("Assured"), and that if the positioning freshness request class information is not specified, an alternative method of interpreting as meaning that the fourth class ("Best effort") has been specified may be considered.

The positioning results 622 stored in the storage function unit 624 of the GMLC device 602 contain each information of the terminal identifier of the UE device 606 having come into a positioning target, the position of the UE device 606 subjected to measurement, positioning time and day, and the positioning accuracy. The positioning response generation function unit 627 analyzes the positioning request accepted by the positioning request receiving function unit 625, and, in the case of a positioning type which approves any past positions, utilizes available past positioning results as long as they are stored in the storage function unit 624 to generate a response. If the available past positioning results do not exist, the positioning response generation function unit 627 transmits a positioning request from the positioning request function unit 621, and generates a response from positioning results to this positioning request. In addition, when a positioning request is in a positioning type not using the past positions, the positioning response generation function unit 627 transmits the positioning request from the positioning request function unit 621 to generate a response from positioning results to this positioning request. In each case, the positioning response generation function unit 627 generates a response in accordance with the request positioning accuracy information, the positioning accuracy request class information, the request positioning freshness information, and the positioning freshness request class information which are specified in the positioning request. The generated response is sent to the client device 601 which is a positioning request source through the response transmission function unit 626.

Figure 18:
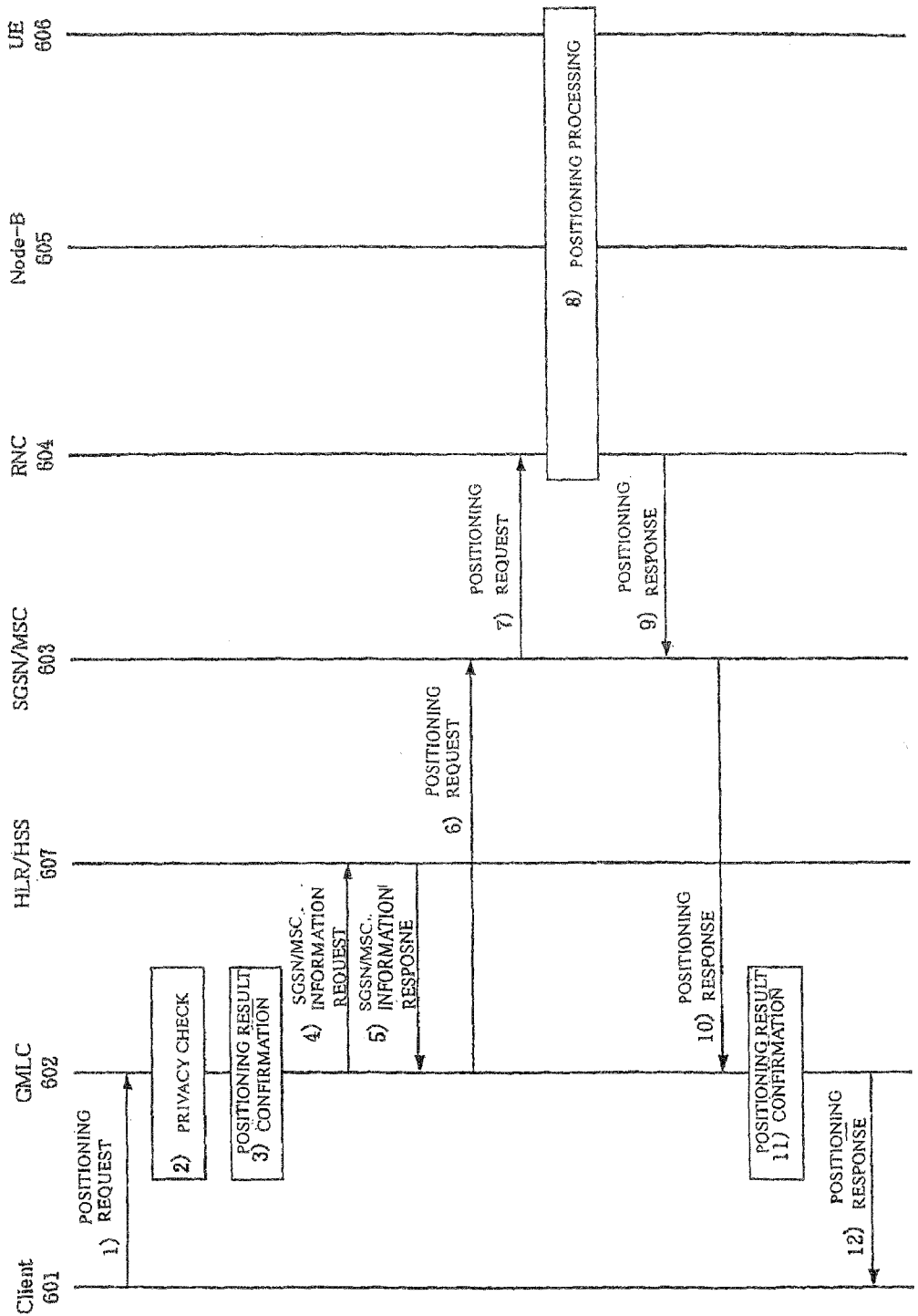
FIG. 18 is a signal flowchart showing a positioning processing procedure in a mobile communication network according to a fourth embodiment of the present invention.

FIG. 18 shows the flow of a message which is sent and received between processing in each node in the mobile communication network and each node therein according to the present embodiment. Referring to FIG. 18, the client device 601 transmits a positioning request to the GMLC device 602 through the transmission function unit 611 (Step 1 in FIG. 18). The GMLC device 602 which has received the positioning request from the client devices 601 performs an authentication, and the like of the client device 601 based on the client information held by its own nodes, as necessary, through the positioning request confirmation function unit 625 to determine whether to accept or not the positioning request from the client device 601. If the positioning request from the client device 601 is accepted, the GMLC device 602 refers to the privacy setting information 623 of the UE device 606 which is a positioning target from the storage function unit 624 through the positioning request confirmation function unit 625 to determine whether the UE device 606 should accept the positioning request (Step 2 in FIG. 18). The privacy setting information 623 referred here includes information showing whether the positioning request from the client device which is a request source should be accepted, whether the position information of the requested accuracy may be passed to the client device 601, and whether the position information of the requested freshness may be passed to the client device 601. If the GMLC device determines the positioning request unacceptable, the positioning request confirmation function unit 625 notifies an error to the client device 601 through the response transmission function unit 626.

On the other hand, if determining the positioning request acceptable, the GMLC device 602 ensures that the positioning request from the client device 601 may respond the past positioning results through the positioning response generation function unit 627, checks to see that the past positioning results of the UE device 606 which is a positioning target are held in the storage function unit 624, if the past positioning results are acceptable, and determines whether positioning results which satisfy a request condition of the client device 601 exist in the past positioning results, if the past positioning results are held (Step 3 in FIG. 18). The processing in Step 3 of FIG. 18 provides a wide variety of processing depending on a request condition of the client device 601 and the ability of the GMLC device 602. Hereinafter, the operation of the present embodiment will be described by dividing into an embodiment in which to generate a response based on the positioning accuracy, an embodiment in which to generate a response based on the positioning freshness, and an embodiment in which to generate a response based on the positioning accuracy and the positioning freshness.

(1) Embodiment in which to Generate a Response Based on the Positioning Accuracy The processing flow of FIG. 3 may be applied to the processing when the GMLC device 602 uses the past positioning results to generate a response based on the positioning accuracy. First, the GMLC device 602 ensures that the request accuracy information exists in the positioning request from the client device 601 through the positioning response generation function unit 627 (Step S101). If the request accuracy information does not exist (No in Step S101), the GMLC device 602 selects the past positioning results of the UE device 606 stored in the storage function unit 624, and responds to the client devices 601 through the response transmission function unit 626 (Step 106). It is considered that a method of selecting the positioning results in Step S106 includes a method of selecting the positioning results with the highest accuracy, and a method of selecting the most up-to-date positioning results.

If the request accuracy information exists (Yes in Step S101), the GMLC device 602 ensures that positioning results which are capable of satisfying the request accuracy information exist in the past positioning results through the positioning response generation function unit 627 (Step S102). If the positioning results which satisfy the request accuracy information exist (Yes in Step S102), the GMLC device 602 selects the positioning results which satisfy the request accuracy information from the past positioning results, and responds to the client device 601 through the response transmission function unit 626 (Step S108). It is considered that a method of selecting the positioning results in Step S108 includes a method of selecting the positioning results with the highest accuracy, and a method of selecting the most up-to-date positioning results, from the positioning results which satisfy the request accuracy information.

If the positioning results which satisfy the request accuracy information do not exist (No in Step S102), the GMLC device 602 ensures that the accuracy request class information exists through the positioning response generation function unit 627 (Step S103). If the accuracy request class information does not exist (No in Step S103), the GMLC device 602 selects positioning results to be responded from the past positioning results to respond to the client device 601 (Step S106). It is considered that a method of selecting the positioning results in Step S106 includes a method of selecting the positioning results with the highest accuracy, and a method of selecting the most up-to-date positioning results.

If the accuracy request class information exists (Yes in Step S103), the GMLC device 602 checks the accuracy request class (Step S104). If the accuracy request class is the first class ("Assured"), (Yes in Step S104), the GMLC device 602 activates the positioning processing in order to obtain the positioning results through the positioning response generation function unit 627 (Step S110).

If the accuracy request class is not the first class ("Assured"), (No in Step S104), the GMLC device 602 ensures that the accuracy request class is the second class ("Best Effort"), (Step S105). If the accuracy request class is the second class ("Best Effort"), (Yes in Step S105), the GMLC device 602 selects the positioning results with the highest positioning accuracy from the past positioning results through the positioning response generation function unit 627, and responds to the client device 601 through the response transmission function unit 626 (Step S109).

If the accuracy request class is not even the second class ("Best Effort"), (No in Step S105), the positioning response generation function unit 627 notifies an error to the client device 601 through the response transmission function unit 626 (Step S107).

Here, if the accuracy request class information does not exist (No in Step S103), or the accuracy request class is not the first class ("Assured"), (No in Step S104), there is considered such an embodiment as that the accuracy request class is determined as being the second class ("Best Effort"), and the positioning results with the highest positioning accuracy are selected from the past positioning results to carry out the processing of responding to the client device 601 (Step S109).

If the processing shown in FIG. 3 has resulted in transmission of the past positioning results to the client device 601, the GMLC device 602 transmits the selected past positioning results to the client device 601 through the response transmission function unit 626 to complete the processing. If the processing shown in FIG. 3 has resulted in notification of an error to the client device 601, the GMLC device 602 notifies the error to the client device 601 through the response transmission function unit 626 to complete the processing.

On the other hand, if the processing shown in FIG. 3 has resulted in execution of positioning processing, the GMLC device 602 performs the positioning processing for obtaining the position of the UE device 606 in cooperation with the HLR/HSS device 607, the SGSN/MSC device 603, the RNC device 604, the Node-B device 605, the UE device 606, and necessary communication devices in other networks (Step 4 to Step 10 in FIG. 18). In the process of this positioning processing, if the position of the UE device 606 is not obtained, the GMLC device 602 notifies an error to the client device 601. The GMLC device 602 which has obtained the positioning results in Step 10 of FIG. 18 stores the obtained positioning results in the storage function unit 624 through the positioning request function unit 621, as well as determines whether the obtained positioning results satisfy the request condition of the client device 601 through the positioning response generation function unit 627 (Step 11 in FIG. 18).

The processing flow shown in FIG. 4 may be applied to the processing for determining whether positioning results obtained in new positioning processing satisfy the request condition of the client device 601, and selecting the positioning results based on the positioning accuracy. The GMLC device 602 first ensures that the request accuracy information exists in the positioning request from the client device 601 through the positioning response generation function unit 627 (Step S201). If the request accuracy information does not exist (No in Step S201), the GMLC device 602 selects positioning results from the positioning results obtained this time, and responds to the client device 601 through the response transmission function unit 626 (Step S206). It is considered that a method of selecting the positioning results in Step S206 includes a method of selecting the positioning results with the highest accuracy, and a method of selecting the most up-to-date positioning results.

If the request accuracy information exists (Yes in Step S201), the GMLC device 602 ensures that positioning results which are capable of satisfying the request accuracy information exist through the positioning response generation function unit 627 (Step S202). If the positioning results which satisfy the request accuracy information exist (Yes in Step S202), the GMLC device 602 selects the positioning results which satisfy the request accuracy information, and responds to the client device 601 through the response transmission function unit 626 (Step 208). It is considered that a method of selecting the positioning results in Step S208 includes a method of selecting the positioning results with the highest accuracy, and a method of selecting the most up-to-date positioning results, from the positioning results which satisfy the request accuracy information.

If the positioning results which satisfy the request accuracy information do not exist (No in Step S202), the GMLC device 602 ensures that the accuracy request class information exists through the positioning response generation function unit 627 (Step S203). If the accuracy request class information does not exist (No in Step S203), the GMLC device 602 selects the positioning results, and responds to the client device 601 through the positioning response transmission function unit 626 (Step S206). It is considered that a method of selecting the positioning results in Step S206 includes a method of selecting the positioning results with the highest accuracy, and a method of selecting the most up-to-date positioning results.

If the accuracy request class information exists (Yes in Step S203), the GMLC device 602 checks the accuracy request class through the positioning response generation function unit 627 (Step 204). If the accuracy request class is the first class ("Assured"), (Yes in Step S204), the positioning response generation function unit 627 notifies an error to the client device 601 through the response transmission function unit 626 (Step S207). If the accuracy request class is not the first class ("Assured"), (No in Step S204), the GMLC device ensures that the accuracy request class is the second class ("Best Effort"), (Step S205). If the accuracy request class is the second class ("Best Effort"), (Yes in Step S205), the GMLC device 602 selects the positioning results with the highest positioning accuracy through the positioning response generation function unit 627, and responds to the client device 601 through the response transmission function unit 626 (Step 209).

If the accuracy request class is not even the second class ("Best Effort"), (No in Step S205), the GMLC device 602 notifies an error to the client device 601 through the response transmission function unit 626 (Step S207).

Here, if the accuracy request class information does not exist (No in Step S203), or the accuracy request class is not the first class ("Assured"), (No in Step S204), there is considered such a modification as that the accuracy request class is determined as being the second class ("Best Effort"), and the positioning results with the highest positioning accuracy are selected to carry out the processing of responding to the client device 601 (Step S209).

The above operation is the operation when the positioning request from the client device 601 may respond the past positioning results. However, if the positioning request does not desire to respond the past positioning results, the GMLC device 602 carries out no processing of FIG. 3, and activates the positioning request function unit 621 to rapidly start the positioning processing through the positioning response generation function unit 627. And, if this positioning processing has resulted in failure to obtain the position of the UE device 606 by the failure of the positioning processing, the GMLC device 602 notifies an error to the client device 601 through the response transmission function unit 626. Additionally, if the positioning processing has resulted in success in positioning of the UE device 606 which is a positioning target to obtain the positioning results of the UE device 606, the GMLC device 602 executes the processing shown in FIG. 4, determines whether the obtained positioning results satisfy the request condition of the client device 601, and notifies a response tailored to the determined results to the client device 601.

(2) Embodiment in which to Generate a Response Based on the Positioning Freshness The processing flow of FIG. 5 may be applied to the processing when the GMLC device 602 uses the past positioning results to generate a response based on the positioning freshness. First, the GMLC device 602 ensures that the request freshness information exists in the positioning request from the client device 601 through the positioning response generation function unit 627 (Step S301). If the request freshness information does not exist (No in Step S301), the GMLC device 602 selects the past positioning results of the UE device 606 stored in the storage function unit 624, and responds to the client device 601 through the response transmission function unit 626 (Step S306). It is considered that a method of selecting the positioning results in Step S306 includes a method of selecting the positioning results with the highest accuracy, and a method of selecting the most up-to-date positioning results.

If the request freshness information exists (Yes in Step S301), the GMLC device ensures that positioning results which are capable of satisfying the request freshness information exist in the past positioning results through the positioning response generation function unit 627 (Step S302). If the positioning results which satisfy the request freshness information exist (Yes in Step S302), the GMLC device 602 selects the positioning results which satisfy the request freshness information from the past positioning results, and responds to the client device 601 through the response transmission function unit 626 (Step S308). It is considered that a method of selecting the positioning results in Step S308 includes a method of selecting the positioning results with the highest accuracy, and a method of selecting the most up-to-date positioning results, from the positioning results which satisfy the request freshness information.

If the positioning results which satisfy the request freshness information do not exist (No in Step S302), the GMLC device 602 ensures that the freshness request class information exists through the positioning response generation function unit 627 (Step S303). If the freshness request class information does not exist (No in Step S303), the GMLC device selects positioning results to be responded from the past positioning results to respond to the client device 601 (Step S306). It is considered that a method of selecting the positioning results in Step S306 includes a method of selecting the positioning results with the highest freshness, and a method of selecting the most up-to-date positioning results.

If the freshness request class information exists (Yes in Step S303), the GMLC device 602 checks the freshness request class (Step S304). If the freshness request class is the third class ("Assured"), (Yes in Step S304), the GMLC device 602 activates the positioning processing in order to obtain the positioning results through the positioning response generation function unit 627 (Step S310).

If the freshness request class is not the third class ("Assured"), (No in Step S304), the GMLC device 602 ensures that the freshness request class is the fourth class ("Best Effort"), (Step S305). If the freshness request class is the fourth class ("Best Effort"), (Yes in Step 305), the GMLC device 602 selects the positioning results with the newest freshness from the past positioning results through the positioning response generation function unit 627, and responds to the client devices 601 through the response transmission function unit 626 (Step S309).

If the freshness request class is not even the fourth class ("Best Effort"), (No in Step S305), the positioning response generation function unit 627 notifies an error to the client device 601 through the response transmission function unit 626 (Step S307).

Here, if the freshness request class information does not exist (No in Step S303), or the freshness request class is not the third class ("Assured"), (No in Step S304), there is considered such a modification as that the freshness request class is determined as being the fourth class ("Best Effort"), and the positioning results with the newest freshness are selected from the past positioning results to carry out the processing of responding to the client device 601 (Step S309).

If the processing shown in FIG. 5 has resulted in transmission of the past positioning results to the client devices 601, the GMLC device 602 transmits the selected past positioning results to the client device 601 to complete the processing. If the processing shown in FIG. 5 has resulted in notification of an error to the client device 601, the GMLC device 602 notifies the error to the client device 601 to complete the processing.

On the other hand, if the processing shown in FIG. 5 has resulted in execution of positioning processing, the GMLC device 602 performs the positioning processing for obtaining the position of the UE device 606 in cooperation with the HLR/HSS device 607, the SGSN/MSC device 603, the RNC device 604, the Node-B device 605, the UE device 606, and necessary communication devices in other networks (Step 4 to Step 10 in FIG. 18). In the process of this positioning processing, if the position of the UE device 606 is not obtained, the GMLC device 602 notifies an error to the client device 601. The GMLC device 602 which has obtained the positioning results of the UE device 606 in Step 10 of FIG. 18 stores the obtained positioning results in the storage function unit 624 through the positioning request function unit 621, as well as determines whether the obtained positioning results satisfy the request condition of the client device 601 through the positioning response generation function unit 627 (Step 11 in FIG. 18).

The processing flow shown in FIG. 6 may be applied to the processing for determining whether positioning results obtained in new positioning processing satisfy the request condition of the client device 601, and selecting the positioning results based on the positioning freshness. The GMLC device 602 first ensures that the request freshness information exists in the positioning request from the client device 601 through the positioning response generation function unit 627 (Step S401). If the request freshness information does not exist (No in Step S401), the GMLC device 602 selects positioning results from the positioning results obtained this time, and responds to the client device 601 through the response transmission function unit 626 (Step S406). It is considered that a method of selecting the positioning results in Step S406 includes a method of selecting the positioning results with the highest accuracy, and a method of selecting the most up-to-date positioning results.

If the request freshness information exists (Yes in Step S401), the GMLC device 602 ensures that positioning results which are capable of satisfying the request freshness information exist through the positioning response generation function unit 627 (Step S402). If the positioning results which satisfy the request freshness information exist (Yes in Step S402), the GMLC device 602 selects the positioning results which satisfy the request freshness information, and responds to the client device 601 through the response transmission function unit 626 (Step 408). It is considered that a method of selecting the positioning results in Step S408 includes a method of selecting the positioning results with the highest accuracy, and a method of selecting the most up-to-date positioning results, from the positioning results which satisfy the request freshness information.

If the positioning results which satisfy the request freshness information do not exist (No in Step S402), the GMLC device 602 ensures that the freshness request class information exists through the positioning response generation function unit 627 (Step S403). If the freshness request class information does not exist (No in Step S403), the GMLC device 602 selects the positioning results, and responds to the client device 601 through the response transmission function unit 626 (Step S406). It is considered that a method of selecting the positioning results in Step S406 includes a method of selecting the positioning results with the newest freshness, and a method of selecting the most up-to-date positioning results.

If the freshness request class information exists (Yes in Step S403), the GMLC device 602 checks the freshness request class through the positioning response generation function unit 627 (Step 404). If the freshness request class is the third class ("Assured"), (Yes in Step S404), the positioning response generation function unit 627 notifies an error to the client device 601 through the response transmission function unit 626 (Step 407).

If the freshness request class is not the third class ("Assured"), (No in Step S404), the GMLC device ensures that the freshness request class is the fourth class ("Best Effort"), (Step S405). If the freshness request class is the fourth class ("Best Effort"), (Yes in Step S405), the GMLC device 602 selects the positioning results with the newest freshness through the positioning response generation function unit 627, and responds to the client device 601 through the response transmission function unit 626 (Step 409).

If the freshness request class is not even the fourth class ("Best Effort"), (No in Step S405), the GMLC device 602 notifies an error to the client device 601 through the response transmission function unit 626 (Step 407).

Here, if the freshness request class information does not exist (No in Step S403), or the freshness request class is not the third class ("Assured"), (No in Step S404), there is considered such an embodiment as that the freshness request class is determined as being the fourth class ("Best Effort"), and the positioning results with the newest freshness are selected to carry out the processing of responding to the client device 601 (Step S409).

The above operation is the operation when the positioning request from the client device 601 may respond the past positioning results. However, if the positioning request does not desire to respond the past positioning results, the GMLC device 602 carries out no processing of FIG. 5, and activates the positioning request function unit 621 to rapidly start the positioning processing through the positioning response generation function unit 627. And, if this positioning processing has resulted in failure to obtain the position of the UE device 606 by the failure of the positioning processing, the GMLC device 602 notifies an error to the client device 601 through the response transmission function unit 626. Additionally, if the positioning processing has resulted in success in positioning of the UE device 606 which is a positioning target to obtain the positioning results of the UE device 606, the GMLC device 602 executes the processing shown in FIG. 6, determines whether the obtained positioning results satisfy the request condition of the client device 601, and notifies a response tailored to the determined results to the client device 601.

(3) Embodiment in which to Generate a Response Based on the Positioning Accuracy and the Positioning Freshness The processing flows in FIG. 7 to FIG. 9 may be applied to the processing when the GMLC device 602 uses the past positioning results to generate a response based on the positioning accuracy and the positioning freshness. First, the GMLC device 602 ensures that the request accuracy information exists in the positioning request from the client device 601 through the positioning response generation function unit 627 (Step S501). If the request accuracy information does not exist (No in Step S501), the GMLC device 602 sets a value of 2 to a variable of i (Step S507), and proceeds to the processing of FIG. 8.

If the request accuracy information exists (Yes in Step S501), the GMLC device 602 ensures that positioning results which are capable of satisfying the request accuracy information exist in the past positioning results through the positioning response generation function unit 627 (Step S502). If the positioning results which satisfy the request accuracy information exist (Yes in Step S502), the GMLC device 602 sets a value of 1 to a variable of i (Step S506), and proceeds to the processing of FIG. 8.

If the positioning results which satisfy the request accuracy information do not exist (No in Step S502), the GMLC device 602 ensures that the accuracy request class information exists through the positioning response generation function unit 627 (Step S503). If the accuracy request class information does not exist (No in Step S503), the GMLC device 602 sets a value of 2 to a variable of i (Step S507), and proceeds to the processing of FIG. 8.

If the accuracy request class information exists (Yes in Step S503), the GMLC device 602 checks the accuracy request class (Step S504). If the accuracy request class is the first class ("Assured"), (Yes in Step S504), the GMLC device 602 activates the positioning request function unit 621 in order to obtain the positioning results to rapidly start the positioning processing through the positioning response generation function unit 627 (Step S519).

If the accuracy request class is not the first class ("Assured"), (No in Step S504), the GMLC device 602 ensures that the accuracy request class is the second class ("Best Effort"), (Step S505). If the accuracy request class is the second class ("Best Effort"), (Yes in Step S505), the GMLC device 602 sets a value of 3 to a variable of i (Step S508), and proceeds to the processing of FIG. 8.

If the accuracy request class is not even the second class ("Best Effort"), (No in Step S505), the positioning response generation function unit 627 notifies an error to the client device 601 through the response transmission function unit 626 (Step S518) to complete the processing.

Here, if the accuracy request class information does not exist (No in Step S503), or the accuracy request class is not the first class ("Assured"), (No in Step S504), there is considered such a modification as that the accuracy request class is determined as being the second class ("Best Effort"), and the processing of setting a value of 3 to a variable of i is carried out (Step S508).

When proceeding to the processing of FIG. 8, the GMLC device 602 ensures that the request freshness information exists in the positioning request from the client device 601 through the positioning response generation function unit 627 (Step S509). If the request freshness information does not exist (No in Step S509), the GMLC device 602 sets a value of 2 to a variable of j (Step S515), and proceeds to the positioning result selection processing S517.

If the request freshness information exists (Yes in Step S509), the GMLC device 602 ensures that positioning results which are capable of satisfying the request freshness information exist in the past positioning results through the positioning response generation function unit 627 (Step S510). If the positioning results which satisfy the request freshness information exist (Yes in Step S510), the GMLC device 602 sets a value of 1 to a variable of j (Step S514), and proceeds to the positioning result selection processing S517.

If the positioning results which satisfy the request freshness information do not exist (No in Step S510), the GMLC device 602 ensures that the freshness request class information exists through the positioning response generation function unit 627 (Step S511). If the freshness request class information does not exist (No in Step S511), the GMLC device 602 sets a value of 2 to a variable of j (Step S515), and proceeds to the positioning result selection processing S517.

If the freshness request class information exists (Yes in Step S511), the GMLC device 602 checks the freshness request class (Step S512). If the freshness request class is the third class ("Assured"), (Yes in Step S512), the GMLC device activates the positioning request function unit 621 in order to obtain the positioning results to rapidly start the positioning processing through the positioning response generation function unit 627 (Step S519).

If the freshness request class is not the third class ("Assured"), (No in Step S512), the GMLC device 602 ensures that the freshness request class is the fourth class ("Best Effort"), (Step S513). If the freshness request class is the fourth class ("Best Effort"), (Yes in Step S513), the GMLC device 602 sets a value of 3 to a variable of j (Step S516), and proceeds to the positioning result selection processing S517.

If the freshness request class is not even the fourth class ("Best Effort"), (No in Step S513), the positioning response generation function unit 627 notifies an error to the client device 601 through the response transmission function unit 626 (Step S518) to complete the processing.

Here, if the freshness request class information does not exist (No in Step S511), or the freshness request class is not the third class ("Assured"), (No in Step S512), there is considered such an embodiment as that the freshness request class is determined as being the fourth class ("Best Effort"), and the processing of setting a value of 3 to a variable of j is carried out (Step S516).

In the positioning result selection processing S517, the GMLC device 602 selects positioning results based on a combination of the variable of i and the variable of j which are the results of the processing as shown hereinbefore, and transmits them to the client device 601. The table shown in FIG. 10 is applied to the control table referred in the positioning result selection processing S517. The positioning response generation function unit 627 of the GMLC device 602 is provided with such a control table, and refers to the control table based on the combination of settings of the variable i and the variable j to determine the positioning result selection processing.

Note that when there is a plurality of positioning results which satisfy each condition ranging from number 5-1 to number 5-9 in FIG. 10, considered are a method of selecting arbitrary positioning results, a method of selecting positioning results with new positioning freshness, a method of selecting positioning results with high positioning accuracy, and a method of selecting in favor of information with higher priority based on priority information showing whether positioning accuracy or positioning freshness is prioritized. Here, the priority information employs the one transmitted by the client device 601 together with the positioning request.

If the processing shown in FIG. 7 to FIG. 9 has resulted in transmission of the past positioning results to the client device 601, the GMLC device 602 transmits the selected past positioning results to the client device 601 to complete the processing. If the processing shown in FIG. 7 to FIG. 9 has resulted in notification of an error to the client device 601, the GMLC device 602 notifies the error to the client device 601 to complete the processing.

On the other hand, if the processing shown in FIG. 7 to FIG. 9 has resulted in execution of positioning processing, the GMLC device 602 performs the positioning processing for obtaining the position of the UE device 606 in cooperation with the HLR/HSS device 607, the SGSN/MSC device 603, the RNC device 604, the Node-B device 605, the UE device 606, and necessary communication devices in other networks (Step 4 to Step 10 in FIG. 18). More specifically, the positioning request function unit 621 sends an inquiry to the HLR/HSS device 607 about information of the SGSN/MSC device to which the UE terminal 606 is connected (Step 4 in FIG. 18). The HLR/HSS device 607 replies the information of the SGSN/MSC device to which the UE device is connected to the inquiries from the GMLC device 602 (Step 5 in FIG. 18). If the GMLC device 602 has failed to receive the information of the SGSN/MSC device 603 from the HLR/HSS device 607, the GMLC device 602 notifies an error to the client device 601. The GMLC device 602 which has received the information of the SGSN/MSC device 603 from the HLR/HSS device 607 transmits a positioning request message to the SGSN/MSC device 603 (Step 6 in FIG. 18).

If this positioning processing has failed to obtain the position of the UE device 606, the GMLC device 602 notifies an error to the client device 601. The GMLC device 602 which has obtained the positioning results of the UE device 606 in Step 10 of FIG. 18 stores the obtained positioning results in the storage function unit 624 through the positioning request function unit 621, as well as determines whether the obtained positioning results satisfy the request condition of the client device 601 (Step 11 in FIG. 18).

The processing flows shown in FIG. 11 to FIG. 13 may be applied to the processing for determining whether positioning results obtained in new positioning processing satisfy the request condition of the client device 601, and selecting the positioning results based on the positioning accuracy and the positioning freshness. The GMLC device 602 first ensures that the request accuracy information exists in the positioning request from the client device 601 through the positioning response generation function unit 126 (Step S601). If the request accuracy information does not exist (No in Step S601), the GMLC device 602 sets a value of 2 to a variable of i (Step S607), and proceeds to the processing of FIG. 12.

If the request accuracy information exists (Yes in Step S601), the GMLC device 602 ensures that positioning results which are capable of satisfying the request accuracy information exist in the positioning results in question through the positioning response generation function unit 627 (Step S602). If the positioning results which satisfy the request accuracy information exist (Yes in Step S602), the GMLC device 602 sets a value of 1 to a variable of i (Step S606), and proceeds to the processing of FIG. 12.

If the positioning results which satisfy the request accuracy information do not exist (No in Step S602), the GMLC device 602 ensures that the accuracy request class information exists through the positioning response generation function unit 627 (Step S603). If the accuracy request class information does not exist (No in Step S603), the GMLC device 602 sets a value of 2 to a variable of i (Step S607), and proceeds to the processing of FIG. 12.

If the accuracy request class information exists (Yes in Step S603), the GMLC device 602 checks the accuracy request class (Step S604). If the accuracy request class is the first class ("Assured"), (Yes in Step S604), the positioning response generation function unit 627 notifies an error to the client device 601 through the response transmission function unit 626 (Step S618) to complete the processing.

If the accuracy request class is not the first class ("Assured"), (No in Step S604), the GMLC device 602 ensures that the accuracy request class is the second class ("Best Effort"), (Step S605). If the accuracy request class is the second class ("Best Effort"), (Yes in Step S605), the GMLC device 602 sets a value of 3 to a variable of i (Step S608), and then proceeds to the processing of FIG. 12.

If the accuracy request class is not even the second class ("Best Effort"), (No in Step S605), the positioning response generation function unit 627 notifies an error to the client device 601 through the response transmission function unit 626 (Step S618) to complete the processing.

Here, if the accuracy request class information does not exist (No in Step 603), or the accuracy request class is not the first class ("Assured"), (No in Step S604), there is considered such an embodiment as that the accuracy request class is determined as being the second class ("Best Effort"), and the processing of setting a value of 3 to a variable of i is carried out (Step S508).

When proceeding to the processing of FIG. 12, the GMLC device 602 ensures that the request freshness information exists in the positioning request from the client device 601 through the positioning response generation function unit 627 (Step S609). If the request freshness information does not exist (No in Step S609), the GMLC device 602 sets a value of 2 to a variable of j (Step S615), and proceeds to the positioning result selection processing S617.

If the request freshness information exists (Yes in Step S609), the GMLC device 602 ensures that positioning results which are capable of satisfying the request freshness information exist through the positioning response generation function unit 627 (Step S610). If the positioning results which satisfy the request freshness information exist (Yes in Step S610), the GMLC device 602 sets a value of 1 to a variable of j (Step S614), and proceeds to the positioning result selection processing S617.

If the positioning results which satisfy the request freshness information do not exist (No in Step S610), the GMLC device 602 ensures that the freshness request class information exists through the positioning response generation function unit 627 (Step S611). If the freshness request class information does not exist (No in Step S611), the GMLC device 602 sets a value 2 to a variable of j (Step S615), and proceeds to the positioning result selection processing S617.

If the freshness request class information exists (Yes in Step S611), the GMLC device checks the freshness request class (Step S612). If the freshness request class is the third class ("Assured"), (Yes in Step S612), the positioning response generation function unit 627 notifies an error to the client device 601 through the response transmission function unit 626 (Step S618) to complete the processing.

If the freshness request class is not the third class ("Assured"), (No in Step S612), the GMLC device 602 ensures that the freshness request class is the fourth class ("Best Effort"), (Step S613). If the freshness request class is the fourth class ("Best Effort"), (Yes in Step S613), the GMLC device 602 sets a value of 3 to a variable of j (Step S616), and proceeds to the positioning result selection processing S617.

If the freshness request class is not even the fourth class ("Best Effort"), (No in Step S613), the positioning response generation function unit 627 notifies an error to the client device 601 through the response transmission function unit 626 (Step S618) to complete the processing.

Here, if the freshness request class information does not exist (No in Step S611), or the freshness request class is not the third class ("Assured"), (No in Step S612), there is considered such an embodiment as that the freshness request class is determined as being the fourth class ("Best Effort"), and the processing of setting a value of 3 to a variable of j is carried out (Step S616).

In the positioning result selection processing S617, the server device 102 selects positioning results based on a combination of the variable of i and the variable of j which are the results of the processing shown in FIG. 11 and FIG. 12 to transmit to the client device 601. The table shown in FIG. 10 is applied to the control table referred in the positioning result selection processing S617. The positioning response generation function unit 627 of the GMLC device 602 refers to the control table based on the combination of settings of the variable i and the variable j to determine the positioning result selection processing.

Note that when there is a plurality of positioning results which satisfy each condition ranging from number 5-1 to number 5-9 in FIG. 10, considered are a method of selecting arbitrary positioning results, a method of selecting positioning results with new positioning freshness, a method of selecting positioning results with high positioning accuracy, and a method of selecting in favor of information with higher priority based on priority information showing whether positioning accuracy or positioning freshness is prioritized. Here, the priority information employs the one transmitted by the client device 601 together with the positioning request.

The above operation is the operation when the positioning request from the client device 601 may respond the past positioning results. However, if the positioning request does not desire to respond the past positioning results, the GMLC device 602 carries out no processing of FIG. 7 to FIG. 9, and activates the positioning request function unit 621 to rapidly start the positioning processing from the positioning response generation function unit 627. And, if this positioning processing has resulted in failure to obtain the position of the UE device 606 by the failure of the positioning processing, the GMLC device 602 notifies an error to the client device 601 through the response transmission function unit 626. Additionally, if the positioning processing has resulted in success in positioning of the UE device 606 which is a positioning target to obtain the positioning results of the UE device 606, the GMLC device 602 executes the processing shown in FIG. 11 to FIG. 13, determines whether the obtained positioning results satisfy the request condition of the client device 601, and notifies a response tailored to the determined results to the client device 601.

Fifth Embodiment of the Present Invention

A fifth embodiment of the present invention differs from the above-described fourth embodiment in the following descriptions, but otherwise is the same as the fourth embodiment. The difference will be described below.

Figure 19:
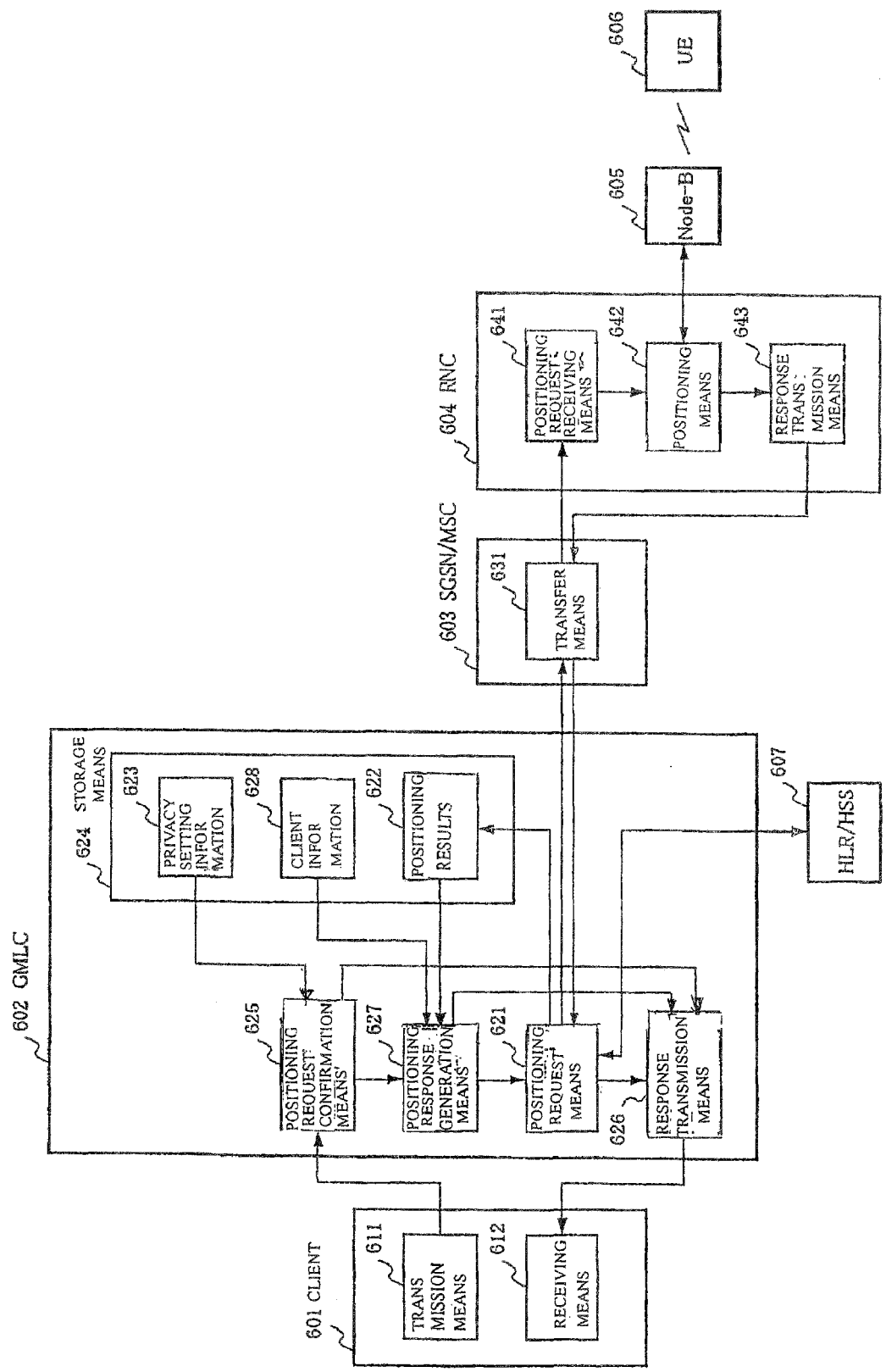
FIG. 19 is a block diagram showing a configuration of each node in a mobile communication network according to a fifth embodiment of the present invention.

Referring to FIG. 19, the GMLC device 602 according to the fifth embodiment of the present invention further includes the storage function unit 624. The storage function unit 624 previously registers the client information 628 containing each information of the request positioning accuracy information, the positioning accuracy request class information, the request positioning freshness information, the positioning freshness request class information, and the priority information showing whether the positioning accuracy or the positioning freshness is prioritized by associating with the client identifier of the client device 601. Upon generating a response of the positioning request received from the client device 601, the positioning response generation function unit 627 of the GMLC device 602 searches the client information 628 using the client identifier specified in the positioning request as a clue to use the request positioning accuracy information, the positioning accuracy request class information, the request positioning freshness information, the positioning freshness request class information, and the priority information that the client device 601 has previously registered. Here, there is considered a modification in which part of information alone, such as the request positioning accuracy information and its request class information alone, or the request positioning freshness information and its request class information alone, or the request positioning accuracy information alone, or the request positioning freshness information alone is registered, in place of registering all of the request positioning accuracy information, the positioning accuracy request class information, the request positioning freshness information, the positioning freshness request class information, and the priority information in the client information 628. In this case, unregistered parameters are determined as not being specified.

According to the present embodiment, the client device 601 eliminates the necessity of containing the request positioning accuracy information, the positioning accuracy request class information, the request positioning freshness information, the positioning freshness request class information, and the priority information in a positioning request message.

Sixth Embodiment of the Present Invention

A sixth embodiment of the present invention differs from the above-described fourth embodiment in the following descriptions, but otherwise is the same as the fourth embodiment. The difference will be described below.

Figure 20:
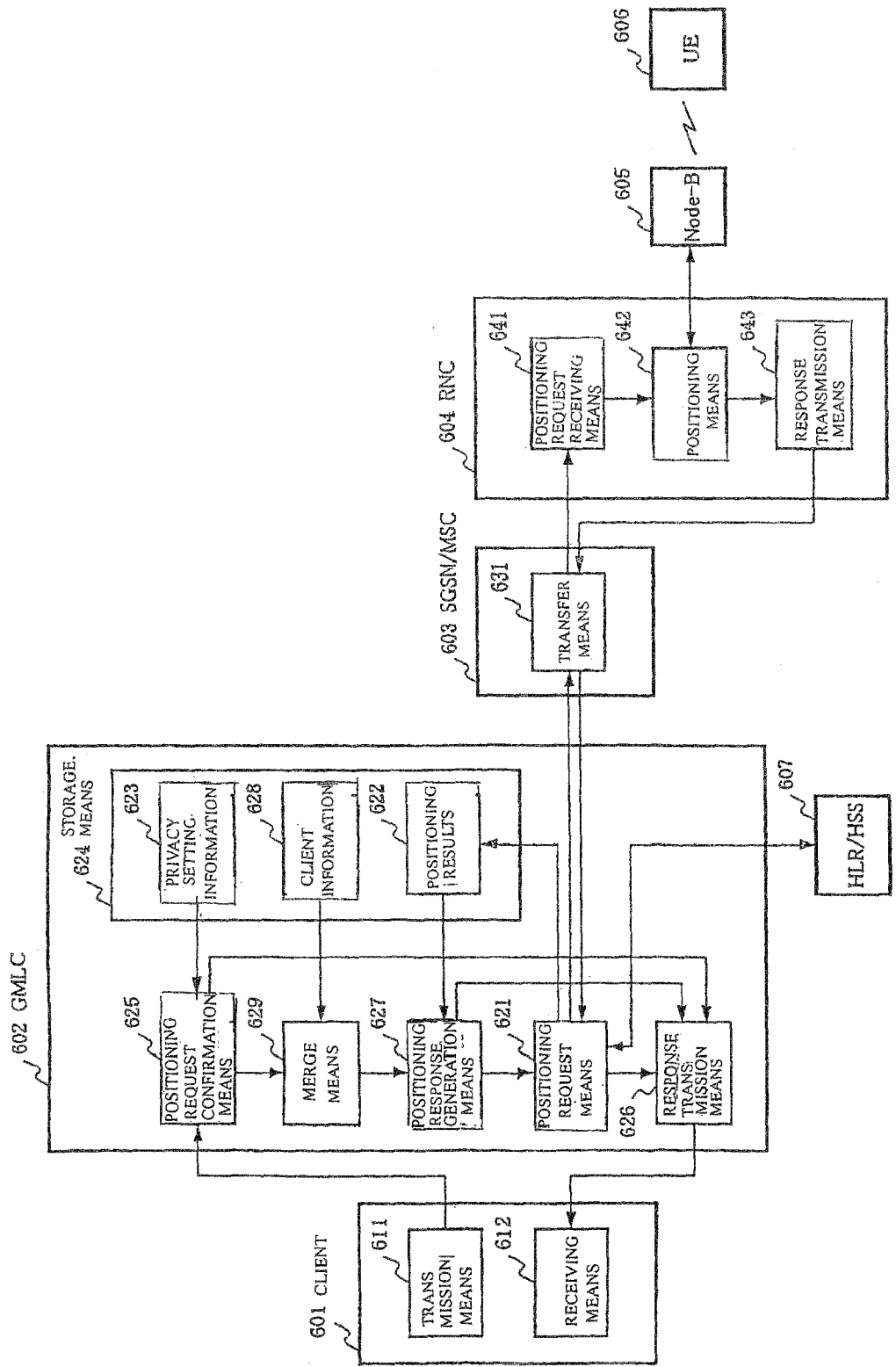
FIG. 20 is a block diagram showing a configuration of each node in a mobile communication network according to a sixth embodiment of the present invention.

Referring to FIG. 20, the GMLC device 602 according to the sixth embodiment of the present invention further includes the storage function unit 624 and a merge function unit 629. The storage function unit 624 previously registers the client information 628 containing each information of the request positioning accuracy information, the positioning accuracy request class information, the request positioning freshness information, the positioning freshness request class information, and the priority information showing whether the positioning accuracy or the positioning freshness is prioritized by associating with the client identifiers of the client device 601. On the other hand, the merge function unit 629 is provided between the positioning request confirmation function unit 625 and the positioning response generation function unit 626.

When the merge function unit 629 receives the positioning request of the client device 601 from the positioning request confirmation function unit 625, and the positioning request specifies all of the request positioning accuracy information, the positioning accuracy request class information, the request positioning freshness information, the positioning freshness request class information, and the priority information, the merge function unit 629 transfers the received positioning request directly to the positioning response generation function unit 627. If any of the information should not be specified, the merge function unit 629 searches the client information 628 using the client identifier specified in the positioning request as a clue, and adds the registered values of the parameters not specified in the positioning request among the request positioning accuracy information, the positioning accuracy request class information, the request positioning freshness information, the positioning freshness request class information, and the priority information that the client device 601 has previously registered to the positioning request to transfer to the positioning response generation function unit 627.

Here, there is considered a modification in which a part of parameters alone, such as the request positioning accuracy information and its request class information alone, or the request positioning freshness information and its request class information alone, or the request positioning accuracy information alone, or the request positioning freshness information alone is registered, in place of registering all parameters of the request positioning accuracy information, the positioning accuracy request class information, the request positioning freshness information, the positioning freshness request class information, and the priority information in the client information 628. If the parameters not registered in the client information 628 are not also specified in the positioning request, the parameters are processed as being nonexistent.

According to the present embodiment, if the client device 601 specifies the request positioning accuracy information, the positioning accuracy request class information, the request positioning freshness information, the positioning freshness request class information, and the priority information in a positioning request message, the specified one is used, and for the one not specified in the positioning request message, the one previously registered in the client information 628 is used. Thus, if using the same information as the request positioning accuracy information, the positioning accuracy request class information, the request positioning freshness information, the positioning freshness request class information, and the priority information that the client device 601 has previously registered, the client device 601 eliminates the necessity of containing the information in a positioning request message. Additionally, if different parameters from those previously registered are specified in the positioning request, the parameters specified in the positioning request are prioritized, so that a positioning request using different parameters from the registered values is also made possible.

Note that, in the fourth to sixth embodiments of the present invention, it is considered that another embodiment when the GMLC device selects positioning results includes an embodiment in which the processing of Step 3 in FIG. 18 (generated response utilizing the past positioning results) is omitted, and an embodiment in which the processing of Step 3 in FIG. 18 is omitted, and appropriate positioning results are selected from the past positioning results, and new positioning results obtained in Step 11.

Seventh Embodiment of the Present Invention

Figure 21:
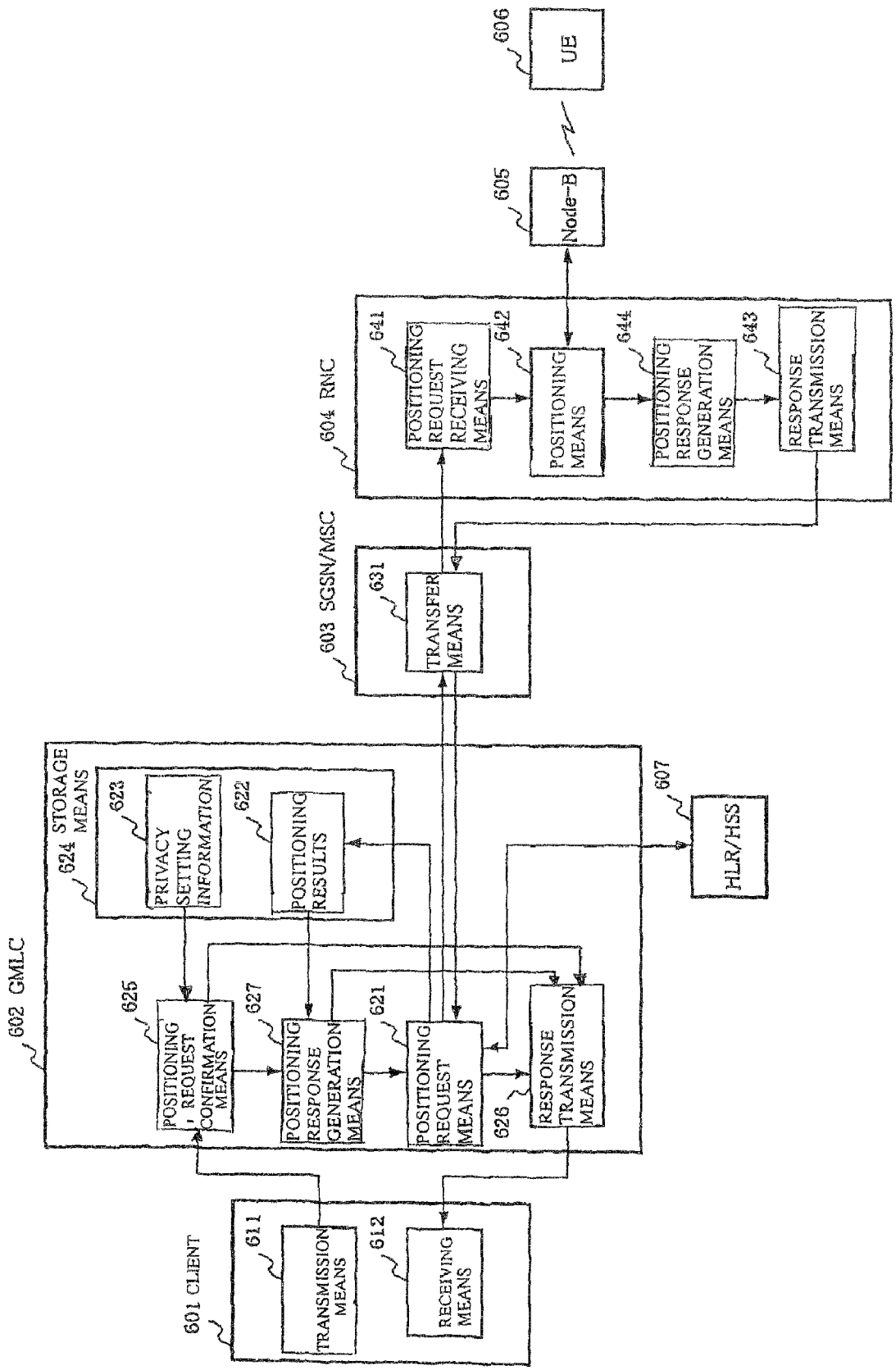
FIG. 21 is a block diagram showing a configuration of each node in a mobile communication network according to a seventh embodiment of the present invention.

Referring to FIG. 21, a seventh embodiment of the present invention differs from the fourth embodiment in that the positioning response generation function unit 627 of the GMLC device 602 provides generation of a response using the past positioning results, and a positioning response generation function unit 644 provides generation of a response based on new positioning results, but otherwise is the same as the fourth embodiment.

Figure 22:
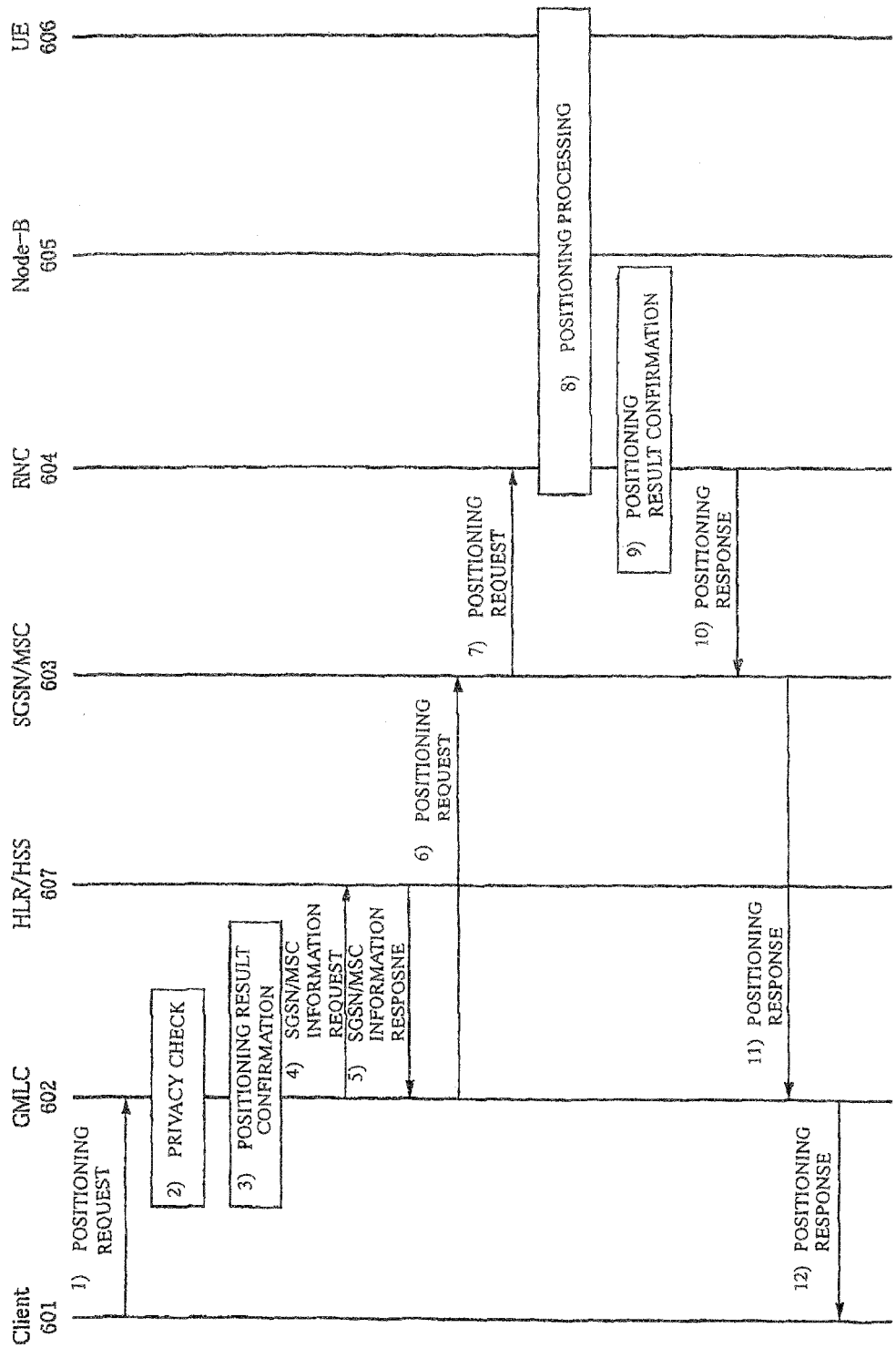
FIG. 22 is a signal flowchart showing a positioning processing procedure in a mobile communication network according to a seventh embodiment of the present invention.

FIG. 22 shows the flow of a message which is sent and received between processing in each node in the network and each node therein when the RNC device 604 selects positioning results. Referring to FIG. 22, the client device 601 transmits a positioning request to the GMLC device 602 through the transmission function unit 611 (Step 1 in FIG. 22). The GMLC device 602 which has received the positioning request from the client device 601 performs an authentication, and the like of the client device 601 based on the client information held by its own nodes, as necessary, through the positioning request confirmation function unit 625 to determine whether to accept or not the positioning request from the client device 601. If the positioning request from the client device 601 is accepted, the GMLC device 602 refers to privacy setting information 623 of the UE device 606 which is a positioning target from the storage function unit 624 through the positioning request confirmation function unit 625 to determine whether the UE device 606 should accept the positioning request (Step 2 in FIG. 22). The privacy setting information 623 referred here includes information showing whether the positioning request from the client device 601 which is a request source should be accepted, whether the position information of the requested accuracy may be passed to the client device 601, and whether the position information of the requested freshness may be passed to the client device 601. If the GMLC device determines the positioning request unacceptable, the positioning request confirmation function unit 625 notifies an error to the client device 601 through the response transmission function unit 626.

In the meantime, if determining the positioning request acceptable, the GMLC device 602 ensures that the positioning request from the client device 601 may respond the past positioning results through the positioning response generation function unit 627. If the past positioning results are acceptable, the GMLC device 602 checks to see that the past positioning results of the UE device 606 which is a positioning target are held in the storage function unit 624. If the past positioning results are held, the GMLC device 602 determines whether positioning results which satisfy the request condition of the client device 601 exist in the past positioning results (Step 3 in FIG. 22). This determination provides a wide variety of processing depending on the request condition of the client device 601 and the ability of the GMLC device 602, and is carried out in accordance with the processing flows of FIG. 3, FIG. 5, or FIG. 7 to FIG. 9 in a similar manner to the fourth embodiment.

If the processing shown in FIG. 3, FIG. 5, or FIG. 7 to FIG. 9 has resulted in transmission of the past positioning results to the client device 601, the GMLC device 602 transmits the past positioning results selected based on the content of the control table in FIG. 10 to the client device 601 through the response transmission function unit 626 to complete the processing. On the one hand, if the processing shown in FIG. 3, FIG. 5 or FIG. 7 to FIG. 9 has resulted in notification of an error to the client device 601, the GMLC device 602 notifies the error to the client device 601 through the response transmission function unit 626 to complete the processing.

On the other hand, if the processing shown in FIG. 3, FIG. 5 or FIG. 7 to FIG. 9 has resulted in execution of positioning processing, the GMLC device 602 transmits a positioning request message relating to the UE device 606 which is a positioning target to the SGSN/MSC 603 through the positioning request function unit 621. More specifically, the positioning request function unit 621 sends an inquiry to the HLR/HSS device 607 about the information of the SGSN/MSC device to which the UE terminal 606 is connected (Step 4 in FIG. 22). The HLR/HSS device 607 replies the information of the SGSN/MSC device 603 to which the UE device 606 is connected, to the inquiry from the GMLC device 602 (Step 5 in FIG. 22). If the GMLC device 602 has failed to receive the information of the SGSN/MSC device 603 from the HLR/HSS device 607, the GMLC device 602 notifies an error to the client device 601. The GMLC device 602 which has received the information of the SGSN/MSC device 603 from the HLR/HSS device 607 transmits the positioning request message to the SGSN/MSC device 603 (Step 6 in FIG. 2).

The positioning request message is sent inclusive of the terminal identifier of the UE device 606 such as a telephone number which is contained in the positioning request received from the client device 601, the client identifier of the client device 601, the positioning request accuracy information, the accuracy request class information, the positioning request freshness information, the freshness request class information, and other necessary information. The SGSN/MSC device 603 which has received the positioning request message from the GMLC device 602 transfers the positioning request message to the RNC device 604 through the transfer function unit 631 (Step 7 in FIG. 22).

The RNC device 604 which has received the positioning request message from the SGSN/MSC device 603 through the positioning request receiving function unit 641 executes the positioning processing in cooperation with the Node-B device 605 and the UE device 606 (Step 8 in FIG. 22). If the RNC device 604 has failed in positioning of the UE device 606 to obtain no position thereof, the RNC device 604 notifies an error to the GMLC device 602 by way of the SGSN/MSC device 603, and the GMLC device 602 notifies the error to the client device 601, through the response transmission function unit 643.

In the meantime, the RNC device 604 which has succeeded in positioning of the UE device 606 to obtain the positioning results determines whether the obtained positioning results satisfy the request condition of the client device 601 through the positioning response generation function unit 644 (Step 8 in FIG. 22). For the operation of the RNC device 604 in Step 9 of FIG. 22, the processing flow of FIG. 4 may be applied to the case where a determination is made based on the positioning accuracy, the processing flow of FIG. 6 may be applied to the case where a determination is made based on the positioning freshness, and the processing flows of FIG. 11 to FIG. 13 and the processing table of FIG. 10 may be applied to the case where a determination is made based on both of the positioning accuracy and the positioning freshness.

In Step 9 of FIG. 22, if the positioning results obtained in the positioning processing of Step 8 are determined as satisfying the request condition, the positioning response generation function unit 644 of the RNC device 604 transmits the obtained positioning results to the SGSN/MSC device 603 through the response transmission function unit 643 (Step 10 in FIG. 22), the SGSN/MSC device 603 transmits the positioning results to the GMLC device 602 through the transfer function unit 631 (Step 11 in FIG. 22), and the GMLC device 602 transmits the positioning results to the client device 601 through the response transmission function unit 626 to complete the processing (Step 12 in FIG. 22).

Additionally, in Step 9 of FIG. 22, if the positioning results obtained in the positioning processing of Step 8 are determined as not satisfying the request condition, and as an error being notified, the positioning response generation function unit 644 of the RNC device 604 notifies an error to the GMLC device 602 by way of the SGSN/MSC device 603 through the response transmission function unit 643, and the GMLC device 602 notifies the error to the client device 601 to complete the processing.

Eighth Embodiment of the Present Invention

An eighth embodiment of the present invention differs from the above-described seventh embodiment in the following descriptions, but otherwise is the same as the seventh embodiment. The difference will be described below.

Figure 23:
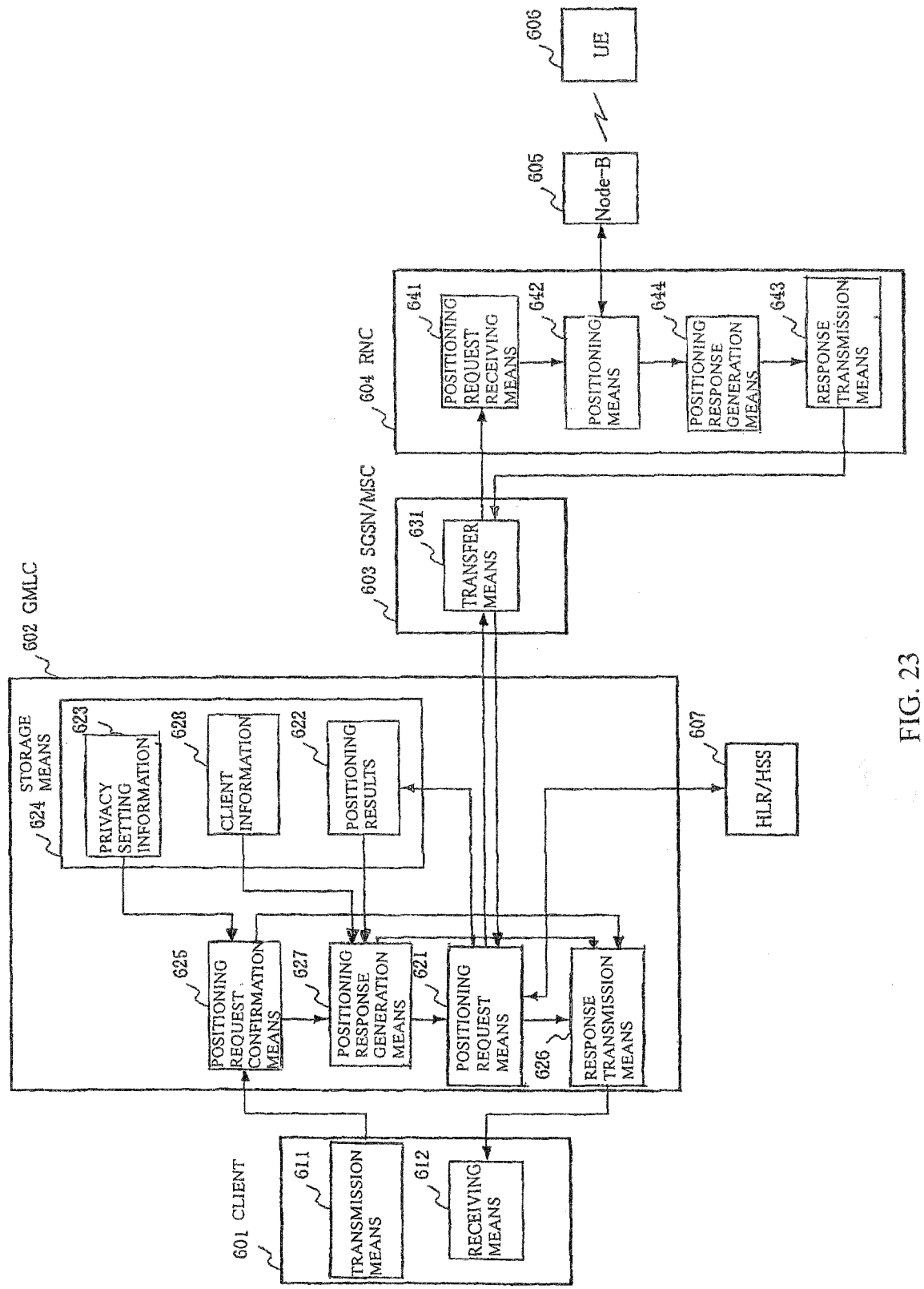
FIG. 23 is a block diagram showing a configuration of each node in a mobile communication network according to an eighth embodiment of the present invention.

Referring to FIG. 23, according to the eighth embodiment of the present invention, the storage function unit 624 of the GMLC device 602 previously registers the client information 628 containing each information of the request positioning accuracy information, the positioning accuracy request class information, the request positioning freshness information, the positioning freshness request class information, and the priority information showing whether the positioning accuracy or the positioning freshness is prioritized by associating with the client identifier of the client device 601. The positioning response generation function unit 627 of the GMLC device 602 is configured so as to search the client information 628 using the client identifier specified in the positioning request as a clue to use the request positioning accuracy information, the positioning accuracy request class information, the request positioning freshness information, the positioning freshness request class information, and the priority information that the client device 601 has previously registered, upon generating a response of the positioning request received from the client device 601, and is configured so as to add the request positioning accuracy information, the positioning accuracy request class information, the request positioning freshness information, the positioning freshness request class information, and the priority information that the client device 601 has previously registered to the positioning request message to pass from the positioning request function unit 621 to the SGSN/MSC device 603, upon activating the positioning processing.

Here, there is considered an embodiment in which part of information alone, such as the request positioning accuracy information and its request class information alone, or the request freshness information and its request class information alone, or the request positioning accuracy information alone, or the request positioning freshness information alone is registered, except that all of the request positioning accuracy information, the positioning accuracy request class information, the request positioning freshness information, the positioning freshness request class information, and the priority information are registered in the client information 628. Unregistered parameters are determined as not being specified.

According to the present embodiment, the client device 601 eliminates the necessity of containing the request positioning accuracy information, the positioning accuracy request class information, the request positioning freshness information, the positioning freshness request class information and the priority information in a positioning request message.

Ninth Embodiment of the Present Invention

A ninth embodiment of the present invention differs from the above-described seventh embodiment in the following descriptions, but otherwise is the same as the seventh embodiment. The difference will be described below.

Figure 24:
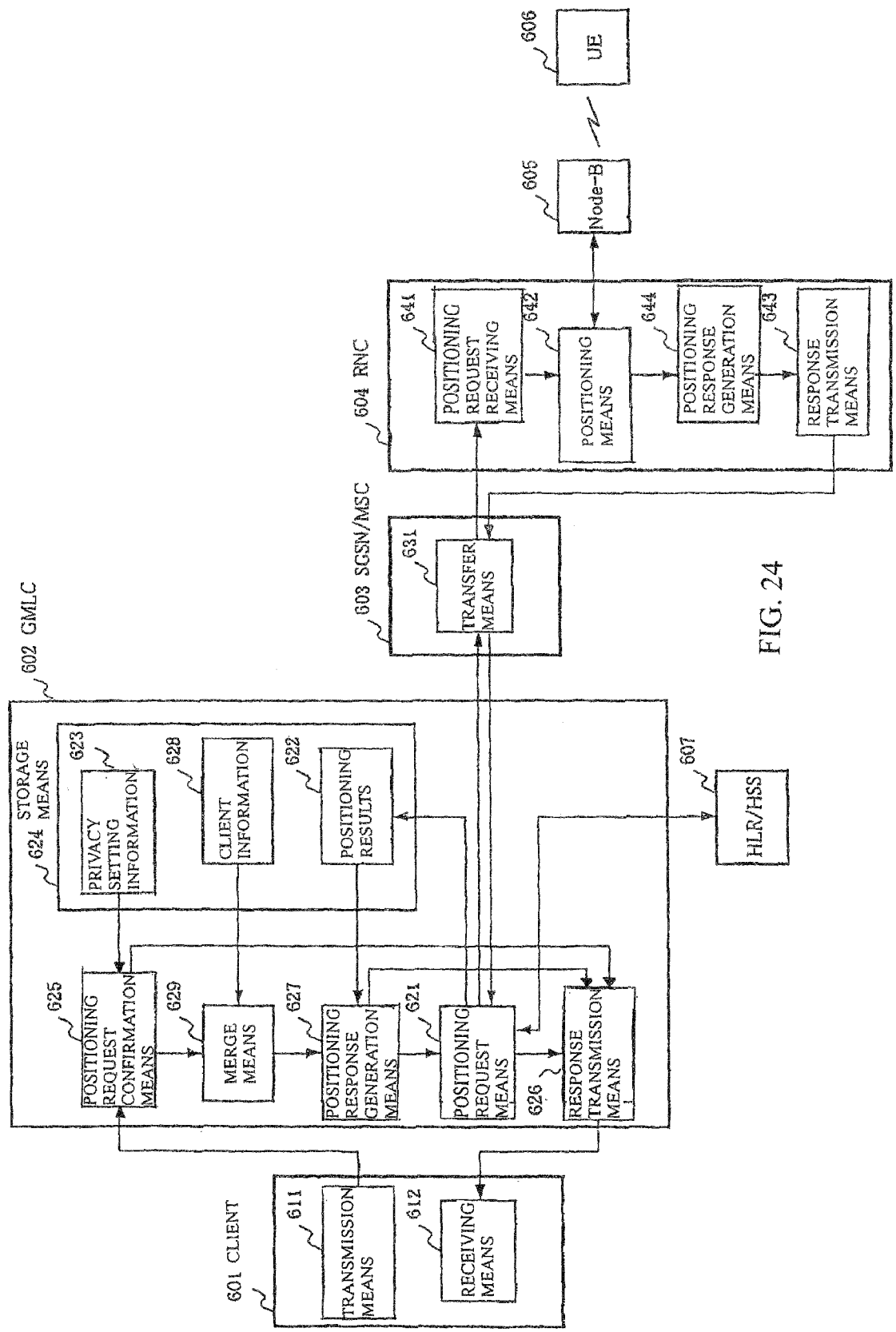
FIG. 24 is a block diagram showing a configuration of each node in a mobile communication network according to a ninth embodiment of the present invention.

Referring to FIG. 24, the GMLC device 602 according to the ninth embodiment of the present invention further includes the storage function unit 624 and the merge function unit 629. The storage function unit 624 previously registers the client information 628 containing each information of the request positioning accuracy information, the positioning accuracy request class information, the request positioning freshness information, the positioning freshness request class information, and the priority information showing whether the positioning accuracy or the positioning freshness is prioritized by associating with the client identifier of the client device 601. The merge function unit 629 is provided between the positioning request confirmation function unit 625 and the positioning response generation function unit 626.

When the merge function unit 629 receives the positioning request of the client device 601 from the positioning request confirmation function unit 625, and the positioning request specifies all of the request positioning accuracy information, the positioning accuracy request class information, the request positioning freshness information, the positioning freshness request class information, and the priority information, the merge function unit 629 transfers the received positioning request directly to the positioning response generation function unit 627. If any of the information should not be specified, the merge function unit 629 searches the client information 628 using the client identifier specified in the positioning request as a clue, and adds the registered values of the parameters not specified in the positioning request among the request positioning accuracy information, the positioning accuracy request class information, the request positioning freshness information, the positioning freshness request class information, and the priority information that the client device 601 has previously registered to the positioning request to transfer to the positioning response generation function unit 627.

Here, there is considered a modification in which a part of parameters alone, such as the request positioning accuracy information and its request class information alone, or the request positioning freshness information and its request class information alone, or the request positioning accuracy information alone, or the request positioning freshness information alone is registered, in place of registering all parameters of the request positioning accuracy information, the positioning accuracy request class information, the request positioning freshness information, the positioning freshness request class information, and the priority information in the client information 628. If the parameters not registered in the client information 628 are not also specified in the positioning request, the parameters are processed as being nonexistent.

In addition, the positioning response generation function unit 627 sends out the positioning request message passed from the merge function unit 629, from the positioning request function unit 621 to the SGSN/MSC device 603, upon activating the positioning processing.

According to the present embodiment, if the client device 601 specifies the request positioning accuracy information, the positioning accuracy request class information, the request positioning freshness information, the positioning freshness request class information, and the priority information in a positioning request message, the specified one is used, and for the one not specified in the positioning request message, the one previously registered in the client information 628 is used. Thus, if using the same one as the request positioning accuracy information, the positioning accuracy request class information, the request positioning freshness information, the positioning freshness request class information, and the priority information that the client device 601 has previously registered, the client device 601 eliminates the necessity of containing the information in a positioning request message. Furthermore, if different parameters from those previously registered are specified in the positioning request, the parameters specified in the positioning request are prioritized, so that a positioning request using different parameters from the registered values is also made possible.

Tenth Embodiment of the Present Invention

A tenth embodiment of the present invention differs from the above-described eighth embodiment in the following descriptions, but otherwise is the same as the eighth embodiment. The difference will be described below.

Figure 25:
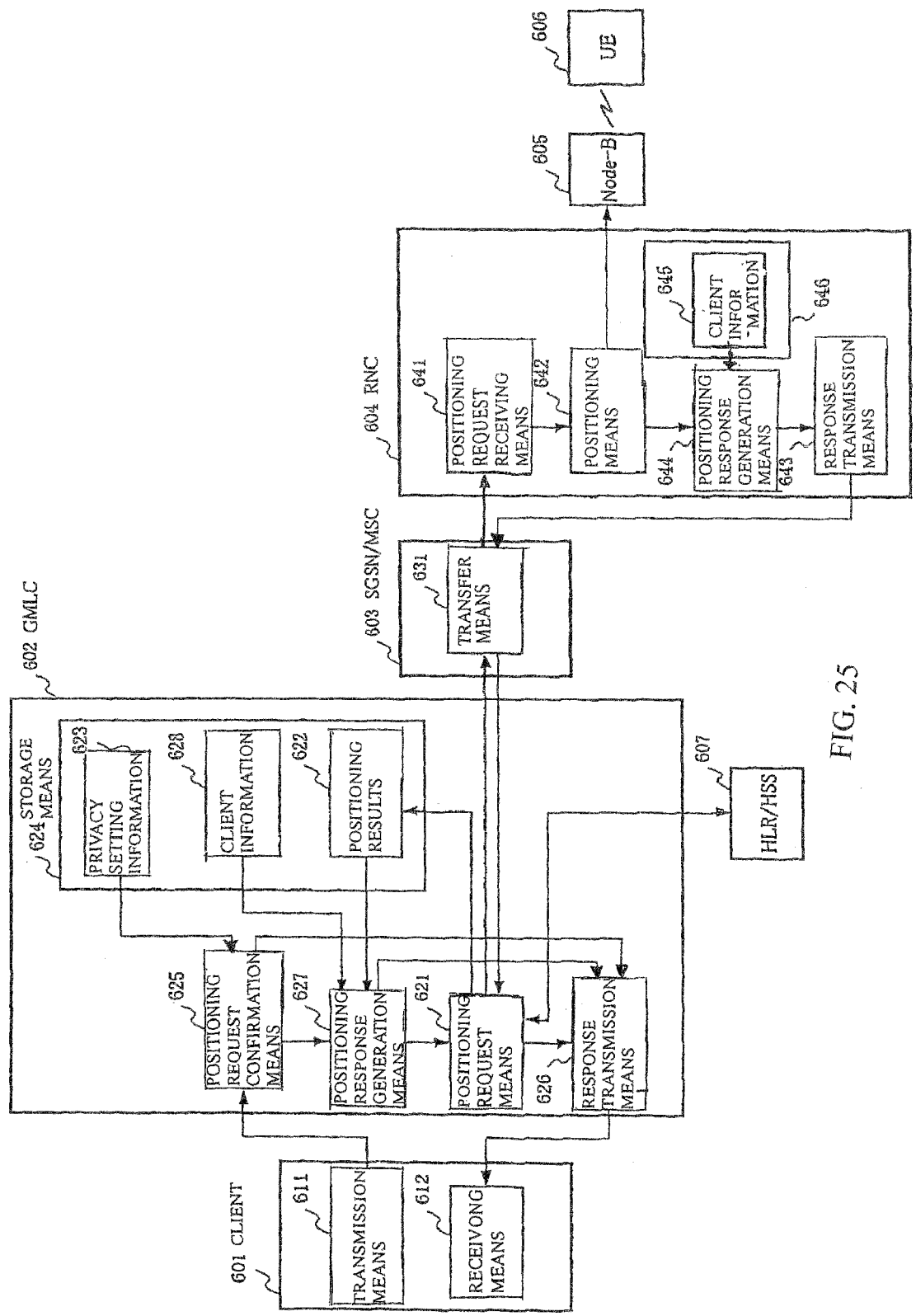
FIG. 25 is a block diagram showing a configuration of each node in a mobile communication network according to a tenth embodiment of the present invention.

Referring to FIG. 25, according to the tenth embodiment of the present invention, the storage function unit 646 which stores client information 645 similar to the client information 628 previously registered in the storage function unit 624 of the GMLC device 602 is provided in the RNC device 604.

The positioning response generation function unit 644 of the RNC device 604 searches the client information 645 using the client identifier contained in the positioning request received by the positioning request receiving function unit 641 as a clue to use the request positioning accuracy information, the positioning accuracy request class information, the request positioning freshness information, the positioning freshness request class information, and the priority information that the client device 601 has previously registered, when determining whether the positioning results obtained in the positioning function unit 642 satisfy the request condition.

According to the present embodiment, the client device 601 eliminates the necessity of containing the request positioning accuracy information, the positioning accuracy request class information, the request positioning freshness information, the positioning freshness request class information and the priority information in a positioning request message. And, upon activating the positioning processing, the GMLC device 602 eliminates the necessity of adding and transmitting the request positioning accuracy information, and the like to the positioning request message.

Eleventh Embodiment of the Present Invention

An eleventh embodiment of the present invention differs from the above-described ninth embodiment in the following descriptions, but otherwise is the same as the ninth embodiment. The difference will be described below.

Figure 26:
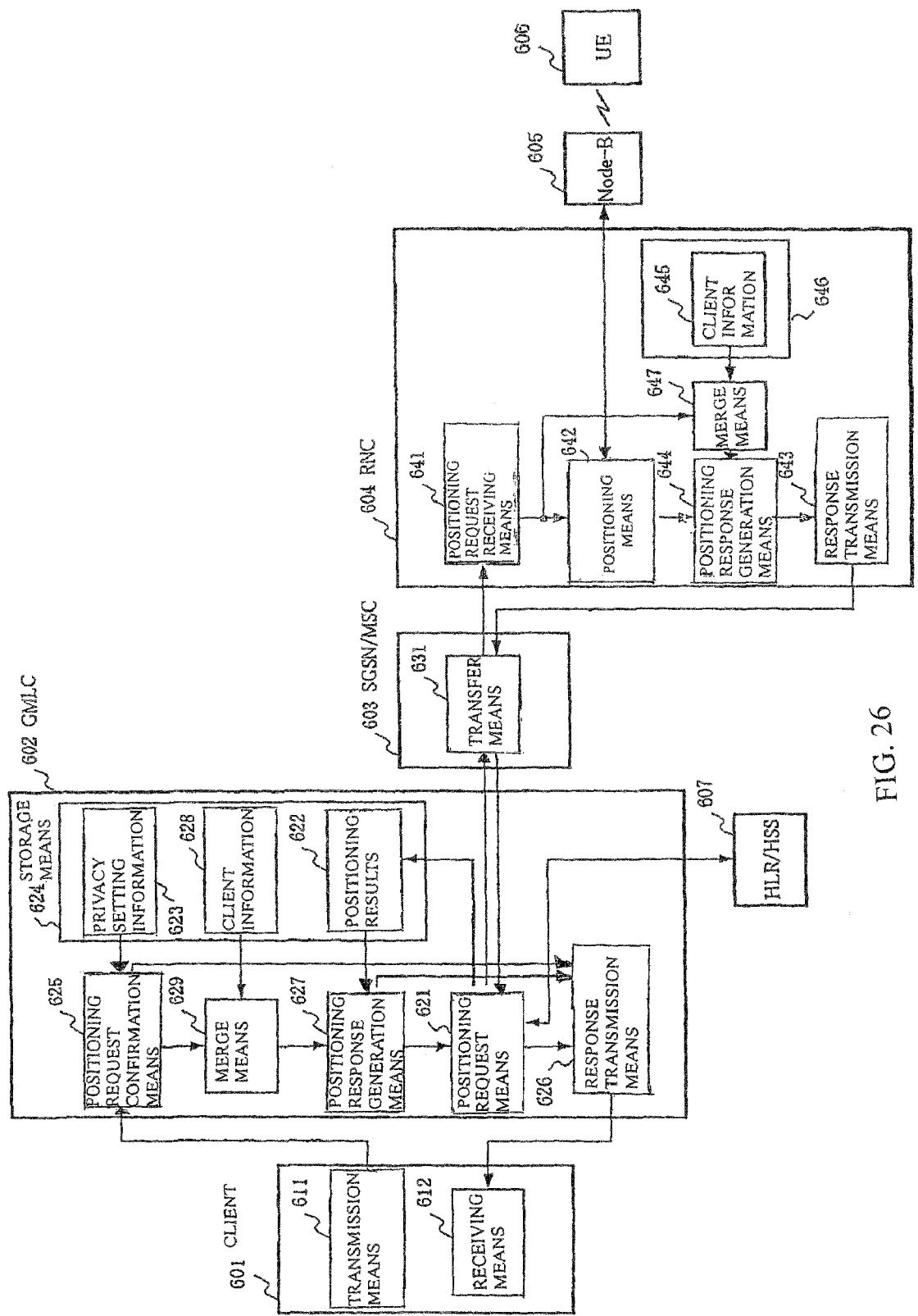
FIG. 26 is a block diagram showing a configuration of each node in a mobile communication network according to an eleventh embodiment of the present invention.

Referring to FIG. 26, according to the eleventh embodiment of the present invention, the storage function unit 646 which stores the client information 645 similar to the client information 628 previously registered in the storage function unit 624 of the GMLC device 602 is provided in the RNC device 604.

When all of the request positioning accuracy information, the positioning accuracy request class information, the request positioning freshness information, the positioning freshness request class information, and the priority information are specified in the positioning request received by the positioning request receiving function unit 641, the merge function unit 647 transfers the positioning request directly to the positioning response generation function unit 644. If any of the information should not be specified, the merge function unit 647 searches the client information 645 using the client identifier specified in the positioning request as a clue to notify the registered values of the parameters not specified in the positioning request among the request positioning accuracy information, the positioning accuracy request class information, the request positioning freshness information, the positioning freshness request class information and the priority information that the client device 601 has previously registered to the positioning response generation function unit 644. The positioning response generation function unit 644 uses the request positioning accuracy information, the positioning accuracy request class information, the request positioning freshness information, the positioning freshness request class information, and the priority information which have been notified from the merge function unit 647, when determining whether the positioning results obtained in the positioning function unit 642 satisfy the request condition.

According to the present embodiment, if the client device 601 specifies the request positioning accuracy information, the positioning accuracy request class information, the request positioning freshness information, the positioning freshness request class information, and the priority information in a positioning request message, the specified one is used, and for the one not specified in the positioning request message, the one previously registered in the client information 628 is used. Thus, if using the same one as the request positioning accuracy information, the positioning accuracy request class information, the request positioning freshness information, the positioning freshness request class information, and the priority information that the client device 601 has previously registered, the client device 601 eliminates the necessity of containing the information in a positioning request message. Additionally, if different parameters from those previously registered are specified in the positioning request, the parameter values specified in the positioning request are prioritized, so that a positioning request using different parameters from the registered values is also made possible. Moreover, upon activating the positioning processing, the GMLC device 602 eliminates the necessity of adding and transmitting the request positioning accuracy information, and the like to the positioning request message, thereby requiring only direct transfer of the positioning request message received from the client device 601.

Note that, in the seventh to the eleventh embodiments of the present invention, a modification in which the processing of Step 3 in FIG. 22, namely, generation of a response utilizing past positioning results, is omitted may be considered.

While the embodiments of the present invention have been described hereinbefore, it is to be understood that the present invention is not limited to the above-described embodiments, and a wide variety of other addition and modifications may be made. Furthermore, each node of the mobile communication network according to the present invention may realize the functions that it incorporates not only in a manner of hardware, but also in a computer and a program. The program is recorded in a computer-readable recording medium, such as a magnetic disk and a semiconductor memory, connected to the computer, and read by the computer, for example, upon start-up of the computer to control the action of the computer, thereby allowing the computer in question to function as each node in each above-described embodiment.

More specifically, it is possible to allow computers comprising the server device 102 of FIG. 2 to function as the positioning function unit 121, the positioning request receiving function unit 124, the response transmission function unit 125, and the positioning response generation function unit 126.

In addition, it is possible to allow computers comprising the server device 102 of FIG. 14 to function as the positioning function unit 121, the positioning request receiving function unit 124, the response transmission function unit 125, and the positioning response generation function unit 126.

In more addition, it is possible to allow computers comprising the server device 102 of FIG. 15 to function as the positioning function unit 121, the positioning request receiving function unit 124, the response transmission function unit 125, the positioning response generation function unit 126, and the merge function unit 128.

In another addition, it is possible to allow computers comprising the GMLC device 602 of FIG. 17 to function as the positioning request function unit 621, the positioning request confirmation function unit 625, the response transmission function unit 626, and the positioning response generation function unit 627.

In still another addition, it is possible to allow computers comprising the RNC device 604 of FIG. 17 to function as the positioning request receiving function unit 641, the positioning function unit 642, and the response transmission function unit 643.

In yet another addition, it is possible to allow computers comprising the GMLC device 602 of FIG. 19 to function as the positioning request function unit 621, the positioning request confirmation function unit 625, the response transmission function unit 626, and the positioning response generation function unit 627.

In further addition, it is possible to allow computers comprising the RNC device 604 of FIG. 19 to function as the positioning request receiving function unit 641, the positioning function unit 642, and the response transmission function unit 643.

In still further addition, it is possible to allow computers comprising the GMLC device 602 of FIG. 20 to function as the positioning request function unit 621, the positioning request confirmation function unit 625, the response transmission function unit 626, the positioning response generation function unit 627, and the merge function unit 629.

In yet further addition, it is possible to allow computers comprising the RNC device 604 of FIG. 20 to function as the positioning request receiving function unit 641, the positioning function unit 642, and the response transmission function unit 643.

In first addition, it is possible to allow computers comprising the GMLC device 602 of FIG. 21 to function as the positioning request function unit 621, the positioning request confirmation function unit 625, the response transmission function unit 626, and the positioning response generation function unit 627.

In second addition, it is possible to allow computers comprising the RNC device 604 of FIG. 21 to function as the positioning request receiving function unit 641, the positioning function unit 642, the positioning response generation function unit 644, and the response transmission function unit 643.

In third addition, it is possible to allow computers comprising the GMLC device 602 of FIG. 23 to function as the positioning request function unit 621, the positioning request confirmation function unit 625, the response transmission function unit 626, and the positioning response generation function unit 627.

In fourth addition, it is possible to allow computers comprising the RNC device 604 of FIG. 23 to function as the positioning request receiving function unit 641, the positioning function unit 642, the positioning response generation function unit 644, and the response transmission function unit 643.

In fifth addition, it is possible to allow computers comprising the GMLC device 602 of FIG. 24 to function as the positioning request function unit 621, the positioning request confirmation function unit 625, the response transmission function unit 626, the positioning response generation function unit 627, and the merge function unit 639.

In sixth addition, it is possible to allow computers comprising the RNC device 604 of FIG. 24 to function as the positioning request receiving function unit 641, the positioning function unit 642, the positioning response generation function unit 644, and the response transmission function unit 643.

In seventh addition, it is possible to allow computers comprising the GMLC device 602 of FIG. 25 to function as the positioning request function unit 621, the positioning request confirmation function unit 625, the response transmission function unit 626, and the positioning response generation function unit 627.

In eighth addition, it is possible to allow computers comprising the RNC device 604 of FIG. 25 to function as the positioning request receiving function unit 641, the positioning function unit 642, the positioning response generation function unit 644, and the response transmission function unit 643.

In ninth addition, it is possible to allow computers comprising the GMLC device 602 of FIG. 26 to function as the positioning request function unit 621, the positioning request confirmation function unit 625, the response transmission function unit 626, the positioning response generation function unit 627, and the merge function unit 639.

In tenth addition, it is possible to allow computers comprising the RNC device 604 of FIG. 26 to function as the positioning request receiving function unit 641, the positioning function unit 642, the positioning response generation function unit 644, the response transmission function unit 643, and the merge function unit 647.

INDUSTRIAL APPLICABILITY

The present invention may be applied to everything, and is to be considered as no restrictive in the applicability thereof, as far as being a positioning system and a positioning method providing position information which is a positioning target.

While the present invention has been described by associating with some preferred embodiments and examples, it is to be understood that these embodiments and examples are merely for illustrative of the invention by an example, and not restrictive. While it will be obvious to those skilled in the art that various changes and substitutions by equivalent components and techniques are eased upon reading the specification, it is believed obvious that such changes and substitutions fit into the true scope and spirit of the accompanying claims.

The invention claimed is:

1. A server of a mobile communication system including a mobile station, comprising:
   a positioning request processing means for receiving a positioning request which requests position information of said mobile station; and
   a transmission means for transmitting one of said position information and error notification in accordance with a requested positioning accuracy and a requested positioning accuracy level that designates a level of treatment when the available position information does not fulfill the requested accuracy, in which a first level of treatment specifies that an error is to be sent and a second level of treatment specifies that the available position information is to be sent as a response to said positioning request.

2. The server according to claim 1,
   wherein said transmission means transmits said error notification, if accuracy of said position information does not satisfy said requested positioning accuracy, and said requested positioning accuracy level is a first level, and transmits said position information, if the accuracy of said position information does not satisfy said requested positioning accuracy, and said requested positioning accuracy level is a second level.

3. The server according to claim 1,
   wherein said mobile communication system comprises a regional area network and a management device which communicates with said regional area network, and
   wherein said positioning request processing means carries out positioning processing for obtaining said position information of said mobile station in cooperation with said management device.

4. The server according to claim 3,
   wherein said positioning request processing means receives said position information from said management device.

5. The server according to claim 3,
   wherein said positioning processing is any one of A-GPS positioning processing, Cell-ID positioning processing, and OTDOA positioning processing.

6. The server according to claim 3,
   wherein said transmission means transmits said error notification, if said positioning request processing means has failed in obtaining said position information.

7. The server according to claim 1, wherein said mobile communication system comprises a client device, and
   wherein said positioning request processing means receives said positioning request from said client device, and transmits one of said position information and the error notification to said client device.

8. The server according to claim 7,
   wherein said positioning request processing means receives at least one of said requested positioning accuracy and said requested positioning accuracy level from said client device.

9. A client device of a mobile communication system comprised of a mobile station and a server, the client device comprising:
   a transmission means which transmits a positioning request which requests position information of said mobile station; and
   a receiving means which receives one of the position information of said mobile station and error notification from said server in accordance with requested positioning accuracy and a requested positioning accuracy level as a response to said positioning request.

10. The client device according to claim 9,
    wherein said receiving means receives said error notification, if position information in said server does not satisfy said requested positioning accuracy, and said requested level is a first level, and receives position information stored by said server, if the position information in said server does not satisfy said requested positioning accuracy, and said requested level is a second level.

11. The client device according to claim 9,
    wherein said mobile communication system comprises a regional area network and a management device which communicates with said regional area network, and
    wherein the position information in said server is obtained by positioning processing carried out through cooperation of said server and said management device.

12. The client device according to claim 11,
    wherein the position information in said server is received by said server from said management device.

13. The client device according to claim 11,
    wherein said positioning processing is any one of A-GPS positioning processing, Cell-ID positioning processing, and OTDOA positioning processing.

14. The client device according to claim 11, comprising:
    receiving said error notification, if said server and said management device have failed in obtaining said position information.

15. The client device according to claim 9,
    wherein said transmission means transmits at least one of said requested positioning accuracy and said requested level to said server.

16. A mobile station of a mobile communication system comprised of a server, a regional area network, and a management device which communicates with said regional area network, the mobile station comprising:
    a radio communication means which communicates with said regional area network; and
    a positioning processing means which carries out positioning processing for obtaining position information of said mobile station in cooperation with said regional area network, said management device, and said server in response to a positioning request from said server,
    wherein one of said position information and error notification is transmitted from said server in accordance with requested positioning accuracy and a requested positioning accuracy level.

17. The mobile station according to claim 16,
    wherein said error notification is transmitted from said server, if accuracy of said position information does not satisfy said requested positioning accuracy, and said requested level is a first level, and
    wherein said position information is transmitted from said server, if the accuracy of said position information does not satisfy said requested positioning accuracy, and said requested level is a second level.

18. The mobile station according to claim 16,
    wherein said positioning processing is any one of A-GPS positioning processing, Cell-ID positioning processing, and OTDOA positioning processing.

19. The mobile station according to claim 16,
    wherein said error notification is transmitted from said server if obtaining said position information has failed.

20. The mobile station according to claim 16,
    wherein said mobile communication system comprises a client device which communicates with said server device, and
    wherein one of said position information and the error notification transmitted from said server to said client device.

* * * * *